US006789166B2

(12) United States Patent
Kamise et al.

(10) Patent No.: US 6,789,166 B2
(45) Date of Patent: Sep. 7, 2004

(54) METHODS AND APPARATUS FOR FACILITATING DATA COMMUNICATIONS BETWEEN A DATA STORAGE DEVICE AND AN INFORMATION-PROCESSING APPARATUS

(75) Inventors: Yojiro Kamise, Hyogo-ken (JP); Yasuo Fujita, Hyogo-ken (JP); Kazumasa Miyazawa, Tokyo (JP); Makoto Yamada, Kanagawa (JP); Shintaro Hayatani, Tokyo (JP)

(73) Assignee: Sony Corporation (JP)

( * ) Notice: Subject to any disclaimer, the term of this patent is extended or adjusted under 35 U.S.C. 154(b) by 185 days.

(21) Appl. No.: 09/858,988

(22) Filed: May 16, 2001

(65) Prior Publication Data

US 2002/0064074 A1 May 30, 2002

(30) Foreign Application Priority Data

May 16, 2000 (JP) ...................................... P2000-143119

(51) Int. Cl.$^7$ .............................................. G06F 12/00
(52) U.S. Cl. ....................... 711/115; 711/100; 713/176; 713/200; 713/161
(58) Field of Search ................................. 711/115, 100; 713/200, 182, 176, 168, 161, 155, 157, 164, 166, 171

(56) References Cited

U.S. PATENT DOCUMENTS 4,849,614 A  7/1989 Watanabe et al.
2002/0090117 A1 * 7/2002 Kramer ...................... 382/124

FOREIGN PATENT DOCUMENTS

| EP | 0 416 916 A2 | 3/1991 |
| EP | 0 583 006 A2 | 2/1994 |
| EP | 0 775 990 A2 | 5/1997 |
| EP | 0 973 136 A2 | 1/2000 |
| JP | 2000-036021 | 2/2000 |
| WO | WO 99/00774 A1 | 1/1999 |

OTHER PUBLICATIONS

U.S. patent application Ser. No. 09/353,714, Kusakabe, et al.

\* cited by examiner

*Primary Examiner*—Kimberly McLean-Mayo
(74) *Attorney, Agent, or Firm*—Lerner, David, Littenberg, Krumholz & Mentlik, LLP

(57) ABSTRACT

A specific-accessible service and a commonly accessible service can co-exist while ensuring the security thereof. It is assumed that a common area of a company A's issued IC card has registered therein an electronic value (corresponding to 1000 yen and a specific area thereof has registered therein a specific-accessible service point of 50 (corresponding to 50 yen). With respect to the commonly accessible electronic value and specific-accessible service point that are registered in the enterprise A's issued IC card, addition and subtraction can both be executed using a specific key A registered in the company A's terminal apparatus. However, in each of the respective cooperating companies' terminal apparatus, with respect to the commonly accessible electronic value, only subtraction processing is possible using a common key registered therein. But, to the processing that is executed with respect to the specific-accessible service point registered in the specific area, that terminal apparatus has no access right.

32 Claims, 29 Drawing Sheets

METHODS AND APPARATUS FOR FACILITATING DATA COMMUNICATIONS BETWEEN A DATA STORAGE DEVICE AND AN INFORMATION-PROCESSING APPARATUS

CROSS-REFERENCE TO RELATED APPLICATIONS

The present application claims priority of Japanese Application No. P2000-143119 filed May 16, 2000, the disclosure of which is hereby incorporated by reference herein.

BACKGROUND OF THE INVENTION

The present invention relates to a data storage device and data storage method, an information processing apparatus and information processing method, and a program.

In an electronic money system or a security system, the use of an IC (Integrated Circuit) card has more widely been increased. The "IC card" means a card-shaped device having embedded therein an IC chip. It has built therein, for example, an operation processing part such as a CPU (Central Processing Unit) for executing various kinds of processes, a memory for storing therein data necessary for executing these processes, etc. It operates with a prescribed reader/writer that has been utilized with respect thereto. Reading and writing of data with respect to the IC card are thereby executed in a state where the IC card is in electric contact with the reader/writer or in a state of non-contact therewith that uses electromagnetic waves.

For example, in ISO (International Organization for Standardization) 7816, there is defined a standard for a contact type of IC card. According to this standard, there can be managed data with use of, for example, an EF (Elementary File) (corresponding to the so-called "file") for storing therein a file and a DF for storing therein the EF and DF (Dedicated File) (corresponding to the so-called "directory (folder)"). Accordingly, if setting a certain piece of DF as a parent hierarchy and providing a DF that constitutes a said-parent's child hierarchy, it becomes possible to manage data in the form of a hierarchical structure.

By the way, in cases using the IC card for the purpose of providing service by a plurality of managers, there can be considered as being available therefor a method of allotting the DF, serving as a hierarchy, to each of a plurality of the managers and storing with respect to this DF the EF having therein data regarding the provision of service by each manager.

Also, in cases utilizing the IC card in connection with an electronic money system or a security system, ensuring security for the concealment of data, for the prevention of forgery of the IC card, etc. is important. To this end, it is necessary to perform resources management for storage of data or to perform access control that, with respect to data, is highly flexible and yet has a high level of security.

As the technique for performing access control that, with respect to data, is highly flexible and yet has a high level of security, there is, for example, a technique that is described in an official gazette of Japanese Patent Application No. 2000-36021. According to this cited invention, there are area-definition areas corresponding to the directories of the IC cards.

Those area-definition areas store therein the ranges of codes that are the ranges of usable identification codes (each corresponding to a filename or directory name). Said area-definition areas constitute a hierarchical structure in which, according to those ranges of codes, the data in one area-definition area is used as that corresponding to a parent hierarchy and the data in another is used as that corresponding to a child hierarchy. Further, in the area-definition areas, there are also stored the capacities (empty capacities). By these empty capacities and ranges of codes, in the hierarchy that falls upon a certain area-definition area, the usable capacity and identification code therein are respectively limited.

Further, according to that cited invention, two or more a hierarchical keys are used with respect to each hierarchy corresponding to the memory area having such data stored therein, or two or more data memory area keys are used with respect to the memory area having such data stored therein. Using those keys, there are produced authentication keys that are used for authentication. According to each of those authentication keys, authentication is performed. And, the authentication key that is used when utilizing the parent's hierarchy is made unknown to the user who uses the child's hierarchy. Further, a right to access, the exercise of which is permitted with respect to the child's hierarchy, is given with respect to the service-definition area that among the area-definition areas constitutes a child's hierarchy. Therefore, the manager who manages the parent's hierarchy becomes able to give each user the right to have access to a different service-definition area.

As electronic money becomes more diffused and as the service that uses an IC card becomes more diversified, there has been an increasing demand for the provision of more services through mutual use, by a plurality of service providers, of a single IC card.

To make mutual use of one IC card by a plurality of service providers, it must be arranged that the information or application regarding a specific service a certain service provider offers cannot be accessed when permission therefor is made by the other service providers that make mutual use of that IC card. With this security being maintained as is, it must be arranged that the information or application regarding the service that is mutually used can be possessed by each of the service providers that are performing their mutual use operation.

However, in the case data for realizing various kinds of services that are jointly use-operated or individually use-operated by a plurality of service providers has been defined within the IC card as physically specific or individual blocks, when part of the data that is being jointly use-operated has been reloaded, it becomes necessary to use, within the reader/writer and IC card, means for synchronizing the data contents in a specific block for providing its relevant service with those in another specific block for providing its relevant service. As a result of this, the cost of the reader/writer and that of the IC card have both been increased.

Further, when defining the data for realizing various kinds of services physically as specific blocks, owing to the physical blocks with respect to which a plurality of definitions have been made, the memory capacity inside the card is wasted. This has caused an impediment when supplying more points of service.

SUMMARY OF THE INVENTION

The present invention has been made in view of the above-described circumstances. That is, the present invention is intended, in an IC card by the use of which, for example, a plurality of enterprises provide a plurality of services, to cause a specific-usable service and a commonly usable service to co-exist while ensuring the security of the applications or data that are used to provide the respective enterprises' services.

A data storage device of the present invention includes a first memory that has a first recording area for recording first data and first authentication information with respect to the first data and a second recording area for recording second data and second authentication information with respect to the second data; a data input/output controller operable to control the input/output of data with respect to the information-processing apparatus; determination means that, based on the first and second authentication information, determines whether the transmission/reception of the first data and second data recorded in the first memory should be performed with respect to the information-processing apparatus; and calculation-process execution means that executes calculation processes based on the first data and second data where the determination means determines that the transmission/reception of the data should be performed by the data storage device with respect to the information-processing apparatus, whereby the first memory causes third data of the first data recorded in the first recording area to be stored therein in association with fourth data of the second data recorded in the second recording area, and the calculation-process execution means, in case it has been determined by the determination means that the information-processing apparatus performs data transmission/reception on the third data, executes a calculation process with respect to the fourth data.

Each of the first authentication information and second authentication information may include information indicating whether read-out, write-in, addition, or subtraction processes with respect to the first data and the second data can be executed, and the determination means may determine, according to the authentication information input from the information-processing apparatus and the first authentication and second authentication information, which one of the read-out, write-in, addition, or subtraction processes included in the calculation processes the calculation-process execution means executes can be executed.

Each of the first data and second data may include an application for providing a prescribed service, the application being defined by a corresponding different code information; the calculation-process execution means may execute the calculation process according to the application; and the determination means may determine, according to the code information contained in the authentication information input from the information-processing apparatus, according to which application the calculation-processing execution means should execute calculation process.

The data storage device may further include a second memory that, in case the data transmission/reception with respect to the information-processing apparatus has been performed, separately records the first authentication information or second authentication information, according to which one of the first authentication information or second authentication information has been used for the data transmission/reception.

A data storage method of the present invention includes providing a data storage device having a first recording area for recording first data and first authentication information with respect to the first data and a second recording area for recording second data and second authentication information with respect to the second data, mounting the data storage device in an information-processing apparatus, controlling the recording of data into the first and second recording areas of the data storage device, controlling the input/output of data with respect to the information-processing apparatus, according to the authentication information whose input from the information-processing apparatus is controlled by the data input/output control step and the first authentication information and second authentication information, determining whether the transmission/reception of the first data and second data the recording of which has been controlled by the recording control step should be performed with respect to the information-processing apparatus, and executing a calculation process according to the first data and second data of the first data recorded in the first recording area and the second data recorded in the second recording area when the determination step determines that the transmission/reception of the data should be performed by the data storage device with respect to the information-processing apparatus, wherein the recording control step causes third data of the first data recorded in the first recording area to be recorded therein in association with fourth data of the second data recorded in the second recording area, and the calculation-process execution step, in case it has been determined by the determination step that the information-processing apparatus performs data transmission/reception on the third data, executes a calculation process with respect to the fourth data.

A first information-processing apparatus of the present invention includes a data input/output controller operable to control the input/output of the data with respect to the data storage device, a first memory that records at least one authentication information used for performing the transmission/reception of a prescribed item of data that is included in the data recorded in the data storage device, and a second memory that, in case the data transmission/reception to/from the data storage device has been performed, separately records information indicating the contents of the data transmission/reception every authentication information used for the data transmission/reception.

The first information-processing apparatus may further include a selector that, among the information recorded in the second memory and indicating the contents of the data transmission/reception, selects information indicating the data transmission/reception that has been performed using a prescribed authentication information, and an output controller operable to control the output to another information-processing apparatus of the information indicating the contents of the data transmission/reception the data of which has been selected by the selector.

A first information-processing method of the present invention includes controlling the input/output of the data with respect to the data storage device, controlling the recording of at least one authentication information that is performed for performing the transmission/reception of a prescribed item of data that is included in the data recorded in the data storage device, and, in case the data transmission/reception to/from the data storage device has been performed, controlling the separate recording of information indicating the contents of the data transmission/reception for every authentication information used for the data transmission/reception.

A storage medium is recorded with a first computer readable program of the present invention. The program includes controlling the input/output of the data with respect to the data storage device, controlling the recording of at least one authentication information that is performed for performing the transmission/reception of a prescribed item of data that is included in the data recorded in the data storage device, and, in case the data transmission/reception to/from the data storage device has been performed, controlling the separate recording of information indicating the contents of the data transmission/reception for every authentication information used for the data transmission/reception.

A second information-processing apparatus of the present invention includes a memory that records first authentication and second authentication information that are used when the data storage device and a second information-processing apparatus perform data transmission/reception therebetween, and code information defining each of a plurality of data stored in the data storage device, an encoder operable to encode the first authentication information, and an output controller operable to control the output to the second information-processing apparatus of the first authentication information encoded by the encoder, the second authentication information, and a prescribed item of the code information.

A second information-processing method of the present invention includes controlling the recording of first authentication and second authentication information that are used when the data storage device and the second information-processing apparatus perform data transmission/reception therebetween, and the recording of code information defining each of a plurality of data stored in the data storage device, encoding the first authentication information, and controlling the output to the second information-processing apparatus of the first authentication information encoded by the encoding step, the second authentication information, and a prescribed item of the code information.

A storage medium is recorded with a second computer readable program of the present invention. The program includes controlling the recording of first authentication and second authentication information that are used when the data storage device and the second information-processing apparatus perform data transmission/reception therebetween, and the recording of code information defining each of a plurality of data stored in the data storage device, encoding the first authentication information, and controlling the output to the second information-processing apparatus of the first authentication information encoded by the encoding step, the second authentication information, and a prescribed item of the code information.

A third information-processing apparatus of the present invention includes an input controller operable to control the input of first information regarding the data transmission/reception executed by a corresponding one of the other information-processing apparatus with respect to the data storage device, a production unit operable to produce second information regarding the data transmission/reception that corresponds to a plurality of the other information-processing apparatus, according to the first information the input of which has been controlled by the input controller, and an output controller operable to control the output to the corresponding other information-processing apparatus of the second information produced by the production unit.

A third information-processing method of the present invention includes controlling the input of first information regarding the data transmission/reception executed by a corresponding one of the other information-processing apparatus with respect to the data storage device, producing second information regarding the data transmission/reception that corresponds to a plurality of the other information-processing apparatus according to the first information, the input of which has been controlled by the input control step, and controlling the output to the corresponding other information-processing apparatus of the second information produced by the production step.

A storage medium is recorded with a third computer readable program of the present invention. The program includes controlling the input of first information regarding the data transmission/reception executed by a corresponding one of the other information-processing apparatus with respect to the data storage device, producing second information regarding the data transmission/reception that corresponds to a plurality of the other information-processing apparatus according to the first information, the input of which has been controlled by the input control step, and controlling the output to the corresponding other information-processing apparatus of the second information produced by the production step.

In the data storage device and data storage method of the present invention, data is recorded in a first recording area for recording therein first data and first authentication information with respect to the first data and in a second recording area for recording therein second data and second authentication information with respect to the second data; the input/output of the data with respect to the information-processing apparatus is controlled; according to the authentication information that has been input from the information-processing apparatus and the first authentication information and second authentication information, it is determined whether the transmission/reception of the first data and second data should be performed with respect to the information-processing apparatus; of the first data and second data, according to the first data and second data with regard to which it has been determined that the transmission/reception of the data should be performed by the data storage device with respect to the information-processing apparatus, a calculation process is executed; third data of the first data recorded in the first recording area is recorded in association with fourth data of the second data recorded in the second recording area; and in case the information-processing apparatus performs data transmission/reception on the third data, a calculation process is executed with respect to the fourth data.

In a first information-processing apparatus, first information-processing method, and a first program recorded in a storage medium of the present invention, there is controlled the input/output of the data with respect to the data storage device; there is recorded at least one authentication information used for performing the transmission/reception of a prescribed item of data that is included in the data recorded in the data storage device; and in case the data transmission/reception of the data storage device with respect to the information-processing apparatus has been performed, there is separately recorded information indicating the contents of the data transmission/reception for every authentication information used for the data transmission/reception.

In a second information-processing apparatus, second information-processing method, and a second program recorded in a storage medium of the present invention, there are recorded first authentication and second authentication information that are used when the data storage device and a second information-processing apparatus perform data transmission/reception therebetween, and code information defining each of a plurality of data stored in the data storage device; there is encoded the first authentication information; and there are output to the second information-processing apparatus the encoded first authentication information, the second authentication information, and a prescribed item of the code information.

In a third information-processing apparatus, third information-processing method, and a third program recorded in a storage medium of the present invention, there is input first information regarding the data transmission/reception executed by a corresponding one of the other information-processing apparatus with respect to the data storage device; there is produced second information regarding the data transmission/reception that corresponds to a plurality of the other information-processing apparatus according to the first information that has been input; and there is output to the corresponding other information-processing apparatus the second information that has been produced.

DETAILED DESCRIPTION

An embodiment of the present invention will hereafter be explained with reference to the drawings.

Figure 1:
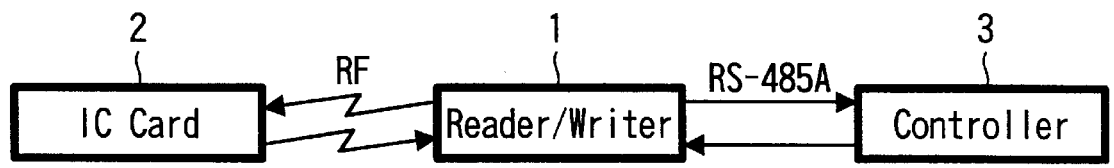
FIG. 1 is a block diagram illustrating the construction of a card system to which the present invention is applied.

FIG. 1 illustrates the construction of a non-contact type card system to which the present invention has been applied. This non-contact type of card system is constructed of a reader/writer 1, an IC card 2, and a controller 3. Between the reader/writer 1 and the IC card 2, non-contact type transmission and reception of data are performed using electromagnetic waves. Namely, the reader/writer 1 transmits a prescribed command to the IC card 2. The IC card 2 receives that command and thereby executes a piece of processing corresponding to that command. And, the IC card 2 transmits to the reader/writer 1 response data that responds to the processed result.

The reader/writer 1 is connected to the controller 3 via a prescribed interface (e.g., one that is prepared in accordance with an RS-485A standard). The controller 3 supplies a prescribed control signal to the reader/writer 1 to thereby cause it to execute its prescribed piece of processing.

Figure 2:
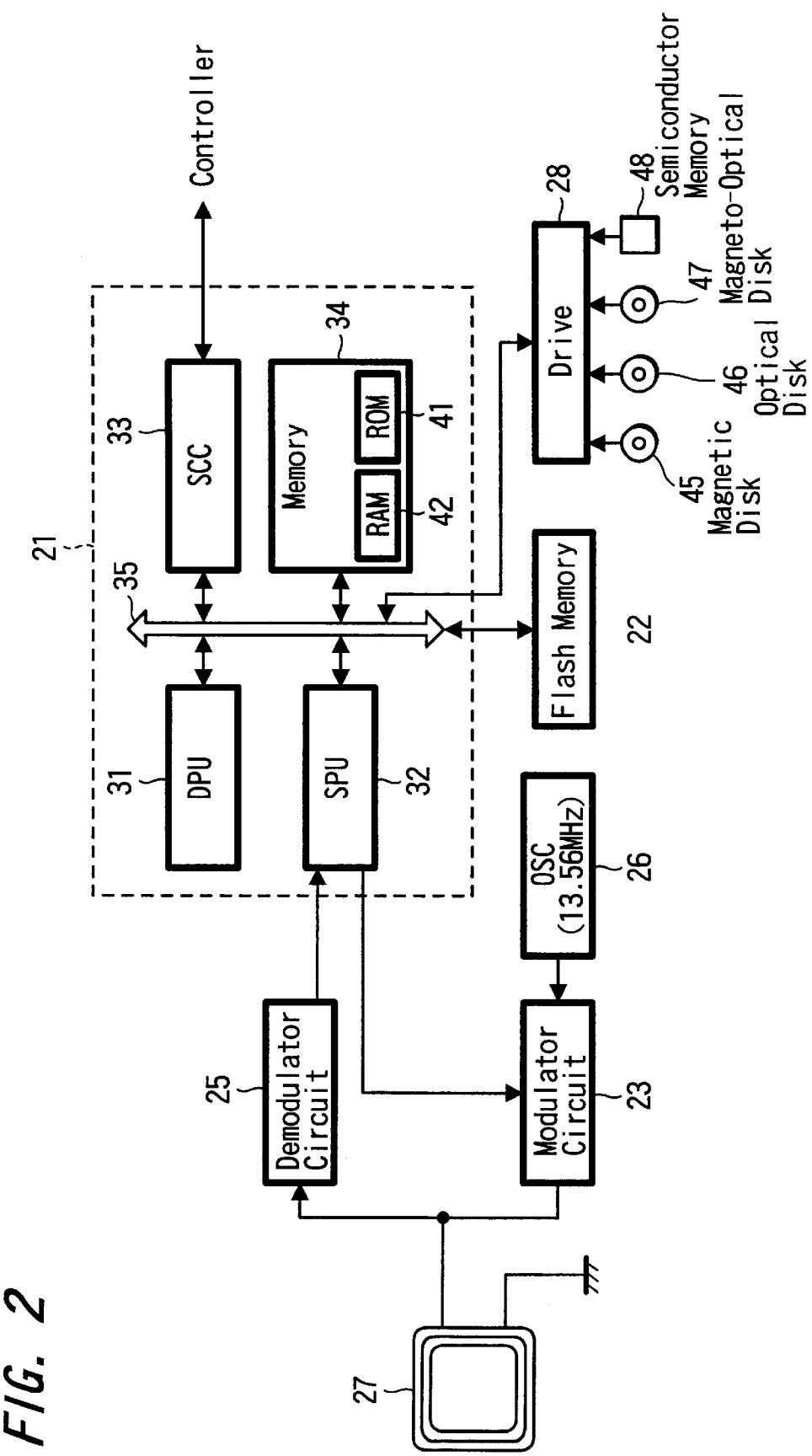
FIG. 2 is a block diagram illustrating the construction of a reader/writer of FIG. 1.

FIG. 2 is a block diagram illustrating the construction of the reader/writer 1 illustrated in FIG. 1. An IC 21 is constructed of a DPU (Data Processing Unit) 31 that executes processing of data, an SPU (Signal Processing Unit) 32 that executes processing of data which is transmitted to the IC card 2, and that executes processing of data which has been received from the IC card 2, an SCC (Serial Communication Controller) 33 that performs communication with the controller 3, and a memory 34 constructed of a ROM (Read Only Memory) 41 that stores therein beforehand information necessary for processing data and a RAM (Random Access Memory) 42 that temporarily stores therein data that is in the course of processing. All elements that are included from the DPU 31 to the memory 34 are connected to one another via a bus 35.

Also connected to this bus 35 are a flash memory 22 that stores therein prescribed data such as, for example, data necessary for authentication, and a drive 28. To the drive 28 may be mounted, as needed, a magnetic disk 45, an optical disk 46, a magneto-optical disk 47, and a semiconductor memory 48. Thereby, transmission and reception of data are performed between the both.

An antenna 27 monitors the state of load while radiating prescribed electromagnetic waves. By doing so, the antenna 27 detects whether the IC card 2 has been mounted with respect thereto. It thereby performs transmission and reception of data with respect to the IC card 2 that has been mounted thereto. The details on the transmission and reception of data with respect to the IC card 2 will be described later.

A demodulator circuit 25 demodulates a modulated wave (ASK (Amplitude Shift Keying) modulated wave) that it has received via the antenna 27, and outputs to the SPU 32 the data that has been demodulated.

The SPU 32 has input thereto via the demodulator 25 the response data that has been transmitted from the IC card 2. It executes a prescribed piece of processing (e.g., BPSK (Binary Phase Shift Keying) modulation (coding into the Manchester code), etc.) with respect to that response data. It simultaneously similarly executes a prescribed piece of processing with respect to the command that is to be transmitted to the IC card 2. It thereafter outputs the resulting signal to a modulator circuit 23.

The DPU 31 has input thereto via the SPU 32 and bus 35 the response data received from the IC card 2 and has input thereto via the SCC 33 and bus 35 the control signal input from the controller 3. It thereby executes processing that accords with the response data and control signal that has been input thereto. It outputs the command that is to be transmitted to the IC card 2 to the SPU 32 via the bus 35, or outputs the data that is to be transmitted to the controller to the SCC 33 via the bus 35.

The modulator circuit 23 performs ASK modulation of a carrier wave, the frequency of which is prescribed (e.g., 13.56 MHz), and that is supplied from an oscillator (OSC) 26, according to the data that is supplied from the SPU 32. It outputs the thus-produced modulation waves to the IC card 2 via the antenna 27 as electromagnetic waves. It is to be noted that, at this time, the modulator circuit 23 performs ASK modulation by making its modulation degree less than 1. Accordingly, even when the data has a low level, the maximum amplitude of the modulation waves are prevented from becoming zero.

The SCC 33 supplies the data that has been input from the controller 3 to the DPU 31 via the bus 35, or outputs the data that has been input from the DPU 31 via the bus 35 to the controller.

Figure 3:
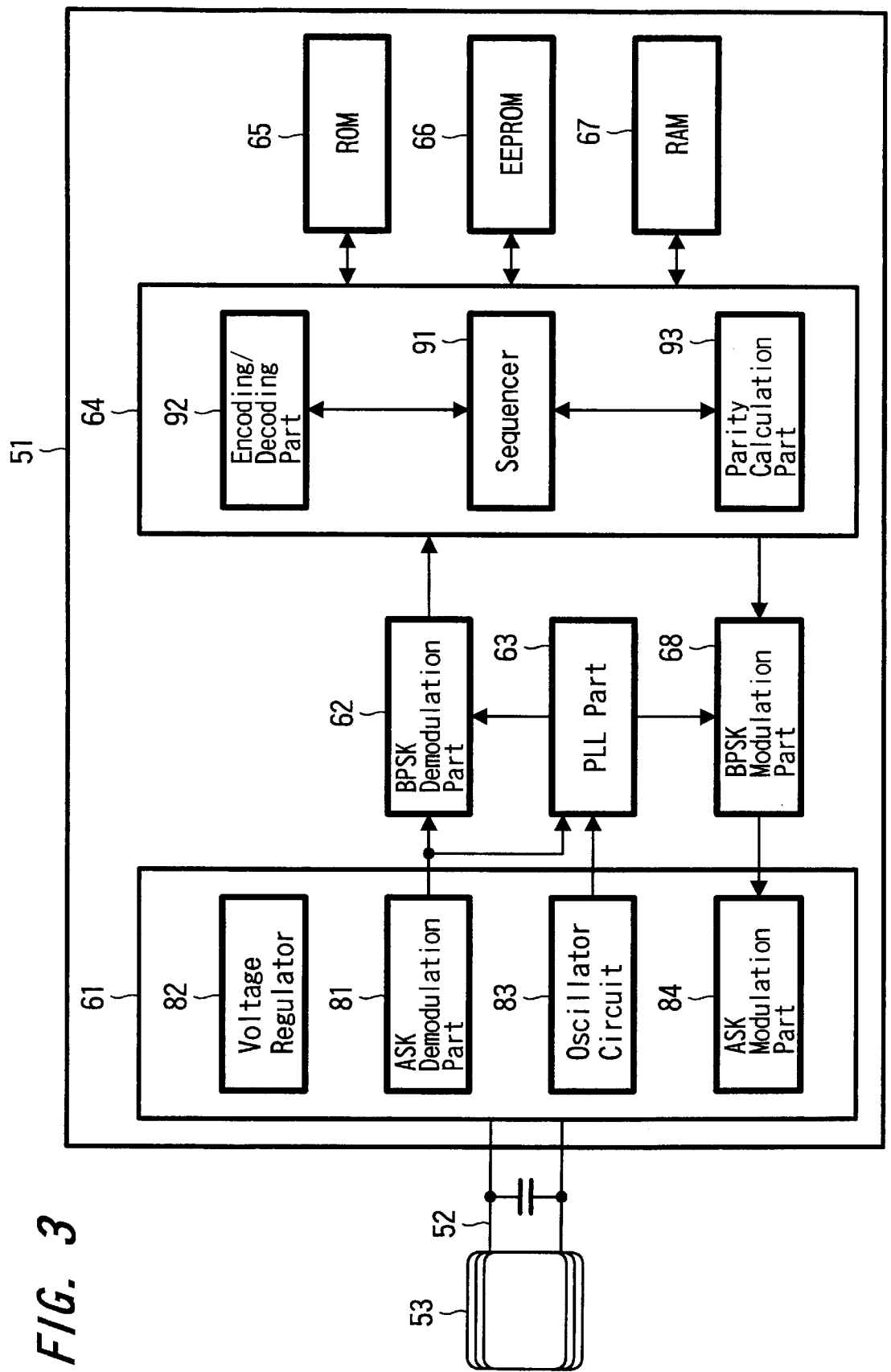
FIG. 3 is a block diagram illustrating the construction of an IC card of FIG. 1.

FIG. 3 is a block diagram illustrating the construction of the IC card 2 illustrated in FIG. 1. An IC 51 of the IC card 2 receives the modulation waves that have been transmitted from the reader/writer 1 through the antenna 53. A capacitor 52 constitutes an LC circuit jointly with the antenna 53 and the modulation waves thereof tune (resonate) with the electromagnetic waves having a prescribed frequency (carrier frequency).

An interface part 61 of the IC 51 has an ASK demodulation part 81 that wave-detects the modulation waves (ASK modulation waves) that it has received via the antenna 53, and demodulates them. The ASK demodulation part 81 then outputs the post-modulation data to a BPSK modulation part 62 and to a PLL (Phase Locked Loop) part 63. The interface part 61 also has a voltage regulator 82 that stabilizes the signal the ASK demodulation part 81 has wave-detected, and supplies it to each of its relevant circuits as a direct current power source. Further, the interface part 61 has an oscillator circuit 83 that provides a signal having the same frequency as the clock frequency of the data signal, and outputs that signal to the PLL part 63.

Data is transmitted from the IC card 2 to the reader/writer 1. In this case, an ASK modulation part 84 of the interface part 61 causes, for example, a prescribed switching element to go "on"/"off" in correspondence with the data that is supplied from a calculation part 64 via a BPSK modulation part 68. And, only when the switching element is in a state of being "on", the ASK modulation part 84 causes a prescribed magnitude of load to be connected to the antenna 53 in parallel therewith. By doing so, the ASK modulation part 84 causes a fluctuation in the load of the antenna 53 that serves as the power source for the IC card 2. According to the fluctuation in the load of the antenna 53, the ASK modulation part 84 performs ASK modulation of the modulation waves the IC card 2 is receiving via the antenna 53. (When receiving data from the IC card 2, namely, when transmitting data to the IC card 2, the reader/writer 1 keeps constant the maximum amplitude of the modulation waves it outputs. The ASK modulation part 84 performs ASK modulation of those modulation waves according to the fluctuation in the load of the antenna 53.) The ASK modulation part 84 transmits those modulation components to the reader/writer 1 via the antenna 53 (i.e., the ASK modulation part 84 causes a fluctuation in the terminal voltage of the antenna 27 of the reader/writer 1).

The PLL part 63 receives data from the ASK demodulation part 81 and, from this data, produces a clock signal that is synchronized with that data. That clock signal is output to the BPSK demodulation part 62 and to the BPSK modulation part 68. When the data that has been demodulated by the ASK demodulation part 81 is being BPSK-modulated, the BPSK demodulation part 62 demodulates that data (decoding of the Manchester code) according to the clock signal supplied from the PLL part 63, and outputs the thus-demodulated data to the calculation part 64.

While the data supplied from the BPSK demodulation part 62 has already been encoded, the calculation part 64 decodes that data by its encoding/decoding part 92. Thereafter, this data is processed in a sequencer 91. Where that data has not been encoded, the data supplied from the BPSK demodulation part 62 is directly supplied to the sequencer 91 without being passed through the encoding/decoding part 92.

The sequencer 91 executes various kinds of processes that accord with the commands that are input thereto. Namely, the sequencer 91 executes write-in or read-out of data with respect to, for example, an EEPROM (Electrically Erasable and Programmable Read Only Memory) 66, and in addition executes necessary calculations with respect to that data. Further, the sequencer 91 executes access control resulting from performance of authentication, the management of the EEPROM 66, etc.

A parity calculation part 93 of the calculation part 64 calculates, for example, a lead Solomon's code, as parity data, from the data stored in the EEPROM 66 or from the data stored in the EEPROM 66. Further, after having executed a prescribed step of processing in the sequencer 91, the calculation part 64 outputs to the BPSK modulation part 68 the response data corresponding to that prescribed step of processing (the data that is transmitted to the reader/writer 1). The BPSK modulation part 68 performs BPSK modulation of the data that has been supplied by the calculation part 64, and outputs the post-modulation data to the ASK modulation part 84 of the interface part 61.

The ROM 65 stores therein a program for executing processing by the sequencer 91 and stores therein data that is necessary for the execution of the program. The RAM 67 temporarily stores therein, for example, data that, when the sequencer 91 performs processing, occurs in the course of the processing. The EEPROM 66 is a non-volatile memory which, even after the IC card 2 terminates its communication with the reader/writer 1 and the supply of the power thereto has been stopped, continues to have its data kept stored therein.

Next, the data transmission/reception processing between the reader/writer 1 and the IC card 2 will be explained.

The reader/writer 1 that has been explained using FIG. 2 radiates prescribed electromagnetic waves from its antenna 27, and, in this state, monitors the state of load of the antenna 27. The reader/writer 1 thereby is kept on standby until it detects a variation in this state of load due to the approach thereto of the IC card 2. It is to be noted that it may be arranged to cause the reader/writer 1 to perform the following piece of processing (polling). Namely, the reader/writer 1 may radiate electromagnetic waves that have been ASK-modulated by data whose pattern is a prescribed short pattern and may thereby repeat a calling over the IC card 2 until a response from the IC card 2 is obtained within a prescribed length of time.

When in the approach of the IC card 2 is detected in the reader/writer 1, the SPU 32 thereof operates as follows. The SPU 32 uses a rectangular wave signal having a prescribed frequency (e.g., a frequency twice as high as the clock frequency of the data) as a carrier wave. The SPU 32 thereby causes BPSK modulation through the use of data transmitted to the IC card 2 (e.g., a command corresponding to a piece of processing that the IC card 2 is caused to execute or data that is written into the IC card 2 or the like). The thus-produced modulated wave (BPSK modulated signal) is output to the modulator circuit 23.

Incidentally, at the time of the BPSK modulation, it is possible to cause the data to correspond to a change in the phase of the modulated wave by utilizing a technique of differential conversion. In this case, even when the BPSK modulated signal is inverted, it is demodulated to the original data. Therefore, it becomes unnecessary to consider the conversion of the polarity of the modulated wave when performing demodulation.

The modulator circuit 23 performs ASK modulation of a prescribed carrier wave, with use of the BPSK modulation signal input thereto, at a degree of modulation (=the maximum amplitude of the data signal/the maximum amplitude of the carrier wave) the value of which is less than 1 (for example, 0.1). The modulator circuit 23 transmits the thus-produced modulated wave (ASK modulated wave) to the IC card 2 through the antenna 27.

Incidentally, when no transmission is performed, of the two levels (high level and low level) of the digital signal, it is arranged that the modulator circuit 23 produces a modulated wave through the use of, for example, a high-level digital signal.

The IC card 2 that has been explained using FIG. 3 has the LC circuit that is constructed of the antenna 53 and the capacitor 52, in which part of the electromagnetic waves radiated by the antenna 27 of the reader/writer 1 is converted to an electric signal. This electric signal (the modulated wave) is output to the interface part 61 of the IC 51. And, the ASK demodulation part 81 of the interface part 61 performs rectification and smoothing of that modulated wave and thereby performs envelope wave detection of it. The ASK demodulation part 81 supplies the signal that is thereby produced to the voltage regulator 82 and simultaneously suppresses the direct current components of that signal. It thereby extracts the data signal from that signal. It then outputs this signal to the BPSK demodulation part 62 and to the PLL part 63.

It is to be noted that at this time the terminal voltage $V_0$ of the antenna 53 is expressed in the form of, for example, the following equation (1).

$$V_0 = V_{10}(1 + k \times V_s(t))\cos(\omega t) \quad (1)$$

where $V_{10} \cos(\omega t)$ represents the carrier wave; k represents the degree of modulation; and $V_s(t)$ represents the data the SPU 32 outputs.

Also, the low-level value $V_{LR}$ of the voltage V1 after the rectification performed by the ASK demodulation part 81 is expressed in the form of, for example, the following equation (2).

$$V_{LR} = V_{10}(1 + k \times (-1)) - Vf \quad (2)$$

where Vf represents the voltage drop that occurs in the diode (not illustrated) constituting a rectifier circuit that in the ASK demodulation part 81 is intended to perform rectification and smoothing. Vf generally is 0.7 volts or so.

When the voltage regulator 82 receives the signal that has been rectified and smoothed by the ASK demodulation part 81, the voltage regulator 82 stabilizes this signal and supplies it to each of the respective relevant circuits, including the calculation part 64, as a direct current power source. It is to be noted that here, as stated above, since the degree of modulation k of the modulated wave is less than 1, the fluctuation in the voltage (the difference between the high level and the low level) after rectification is small. Accordingly, in the voltage regulator 82, it is possible to easily produce the direct current power source.

Here, for example, where a modulated wave is received, the degree of modulation k is 5% so that $V_{10}$ may become equal to or more than 3 volts, the post-rectification low-level voltage $V_{LR}$ becomes equal to or more than 2.15 (=3×(1−0.05)−0.7) volts. Therefore, the voltage regulator 82 can supply a voltage that is sufficiently high as the power source to each of the respective relevant circuits. Further, in this case, the amplitude $2 \times k \times V_{10}$ (the Peak-to-Peak value) of the alternating current component (data component) of the post-rectification voltage V1 becomes 0.3 (=2×0.05×3) volt or more. Therefore, the ASK demodulation part 81 can perform demodulation of the data at a sufficiently high S/N ratio. In this way, by utilizing the ASK modulated wave, the degree of modulation k of which is less than 1, communication is possible in a state where the error rate is low (i.e., the S/N ratio is high). Simultaneously, the direct current voltage that is sufficient as the power source is supplied to the IC card 2.

When receiving the data (BPSK modulated signal) from the ASK demodulation part 81, the BPSK demodulation part 62 demodulates that data according to the clock signal supplied from the PLL part 63, and outputs the demodulated data to the calculation part 64.

Where the data that has been supplied by the BPSK demodulation part 62 is encoded data, the calculation part 64 decodes the encoded data through the operation of the encoding/decoding part 92. This data is supplied to the sequencer 91 and is processed. It is to be noted that the reader/writer 1 is kept on standby in the state of going on to transmit data the value of which is 1 during that time period, i.e., the time period that lasts from the time when the reader/writer 1 has transmitted data to the IC card 2 to the time when the reader/writer 1 receives a response to that data. Accordingly, in that time period, the IC card 2 is receiving the modulated wave the maximum amplitude of which is fixed.

Upon completion of its processing, the sequencer 91 outputs to the BPSK modulation part 68 the response data (the data that it is to transmit to the reader/writer 1) that concerns the processed result, etc. The BPSK modulation part 68 performs BPSK modulation (encoding of the Manchester code) of the data that has been input thereto. It thereafter outputs the resulting signal to the ASK modulation part 84 of the interface part 61.

The ASK modulation part 84 causes the load connected to each end of the antenna 53 to fluctuate, utilizing the switching element or the like, in correspondence with the data from the BPSK modulation part 68. It thereby performs ASK modulation of the modulated wave it is receiving corresponding to the data it transmits (at the time of transmitting data from the IC card 2, as stated above, the maximum amplitude of the modulated wave the reader/writer 1 outputs is made fixed). By that ASK modulation, the ASK modulation part 84 causes fluctuation of the terminal voltage of the antenna 27 of the reader/writer 1, thereby transmitting the resulting data to the reader/writer 1.

On the other hand, at the time of receiving the data from the IC card 2, the modulator circuit 23 of the reader/writer 1 keeps transmitting the data the value of which is 1 (the high level). And, in the demodulation circuit 25, the data that has been transmitted from the IC card 2 is detected from a minute level of fluctuation (e.g., several tens of micro-bolts) in the terminal voltage of the antenna 27 electromagnetically coupled to the antenna 53 of the IC card 2.

Further, in the demodulator circuit 25, the signal it has detected (the ASK modulated wave) is demodulated by being amplified with a high-gain amplifier (not illustrated) And the digital data that is resultantly obtained is output to the SPU 32. The SPU 32 demodulates the data having been input thereto (the BPSK modulated signal) and outputs the resulting data to the DPU 31 via the bus 35. The DPU 31 processes the data that has been input from the SPU 32. According to the processed result, the DPU 31 determines whether to terminate communication. And, when it is determined that communication should again be made, the DPU 31 performs the communication between the reader/writer 1 and the IC card 2 in the same way as in the above-described case. On the other hand, when it is determined that the DPU 31 should terminate communication, communication processing between the reader/writer 1 and the IC card 2 is terminated.

As described above, the reader/writer 1 transmits data to the IC card 2 by utilizing the ASK modulation whose degree of modulation k is less than 1, while the IC card 2 receives that data and performs processing corresponding to it. The IC card 2 return-transmits data corresponding to this processed result to the reader/writer 1.

Figure 4:
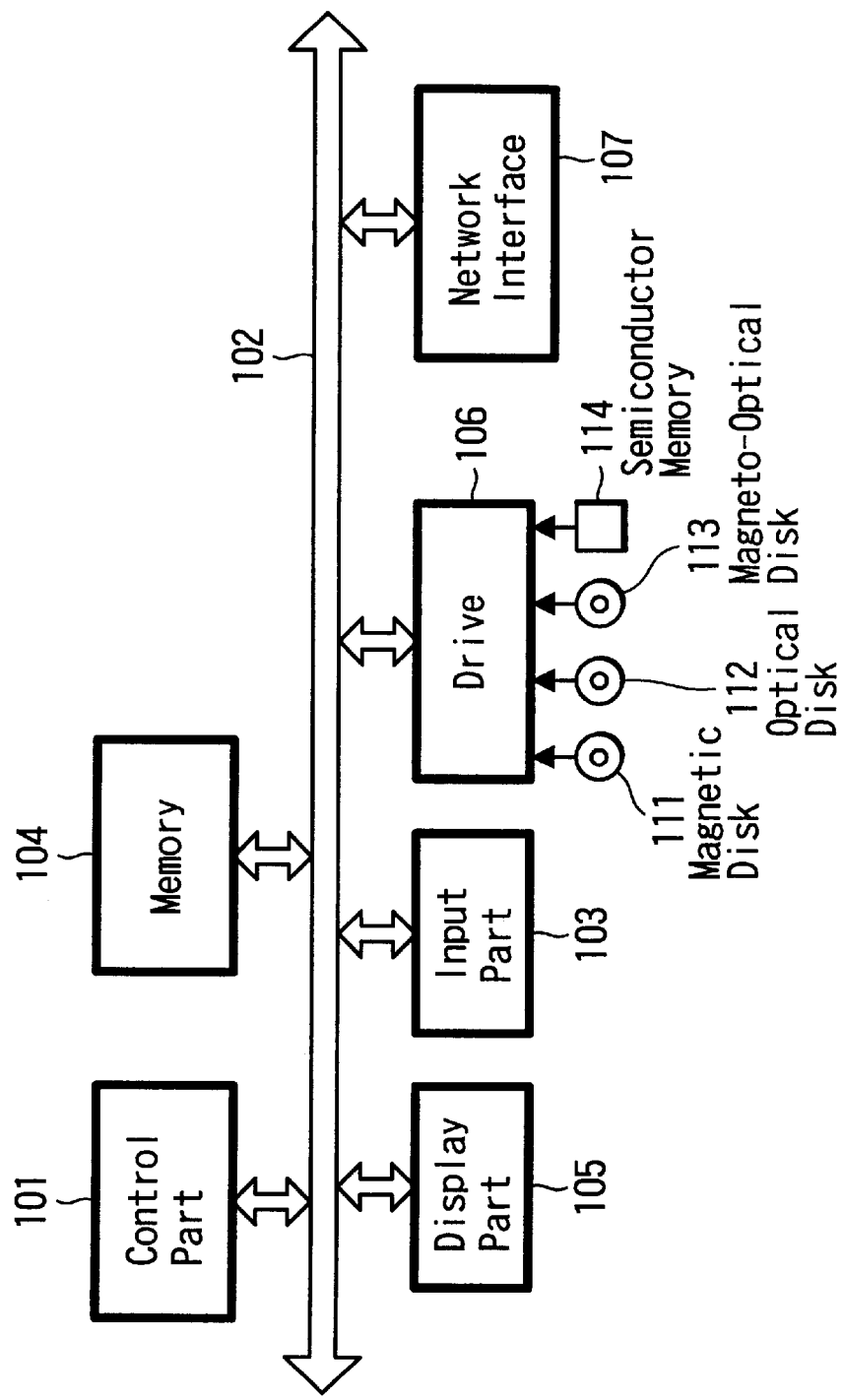
FIG. 4 is a block diagram illustrating the construction of a controller of FIG. 1.

Next, FIG. 4 is a block diagram illustrating the construction of the controller 3 illustrated in FIG. 1. A control part 101 has input thereto via an internal bus 102 a signal corresponding to each of various kinds of instructions the user has input using an input part 103, and executes various steps of processing that are based on the instructions that have been input thereto. A memory 104 stores therein a program the control part 101 uses, parameters used for calculation, parameters that suitably vary during the execution of the program, etc. The control part 101 and the memory 104 are connected to each other by the internal bus 102.

The internal bus 102 is also connected to the input part 103, a display part 105, a drive 106, and a network interface 107. The input part 103 consists of, for example, a keyboard, a mouse, or a bar-code reader and, when inputting various kinds of instructions or data to the control part 101, is operated by the user. The display part 105 consists of, for example, a CRT (Cathode Ray Tube) or the like, and displays various kinds of items of information by means of text or a picture image. To the drive 106 there is mounted, as needed, a magnetic disk 111, an optical disk 112, a magneto-optical disk 113, or a semiconductor memory 114. Each of these elements performs data transmission and reception between itself and the drive.

The network interface 107 is connected to the reader/writer 1 via an RS-485A for example. Or it is connected to a LAN (Local Area Network) by the use of a prescribed interface cable or the like. Or it is connected to a wide-band network such as, for example, an Internet communication network, via telephone lines (not illustrated).

Next, using FIG. 5, an explanation will be given of the logical format of the EEPROM 66 illustrated in FIG. 3. The EEPROM 66 is constructed in units of a block. For example, in FIG. 5, one block is constructed of 16 bytes. Further, in FIG. 5, by setting the logical address in the uppermost block to be #0000h (the h represents a hexadecimal number), the logical addresses are allocated in an ascending order. It is to be noted that, in FIG. 5, the addresses from #0000h to #FFFFh are allocated as the logical addresses. Accordingly, 65536 (=$2^{16}$) pieces of blocks are constructed.

It is arranged that the respective blocks be used as user blocks or system blocks. In the respective blocks of the [X EEPROM 66, they are allocated as user blocks in the ascending order of the logical addresses. Also, in the descending order thereof, they are allocated as system blocks. Namely, in FIG. 5, the logical addresses for the user blocks increase in the downward direction, while those for the system blocks increase in the upward direction.

And, when there are no more empty blocks, it is no longer possible to form user blocks or system blocks. Accordingly, the border between the user blocks and the system blocks is not made fixed. Also, the number of user blocks or the number of system blocks is not particularly limited (however, in the case of FIG. 5, the sum total of the user blocks and system blocks is limited to a value that is 65536 pieces or less).

As the system blocks there are five kinds of blocks that include a manufacture ID (Identification) block, issuance ID block, system-definition block, area-definition blocks, and service-definition blocks. Incidentally, in the case of FIG. 5, the blocks that are set to be area-definition blocks or service-definition blocks are illustrated as area/service-definition blocks.

Among the system blocks, three thereof, namely, the manufacture ID block, issuance ID block, and system-definition block, are fundamentally the ones already disposed at the time of the issuance of the IC card 2. Those three system blocks are disposed respectively in the logical address #FFFFh, #FFFEh, and #FFFDh. The area/service-definition blocks are disposed respectively at the positions in and higher than the logical address #FFFCh in the order in which they are produced.

In the manufacture ID block, there is disposed information regarding the manufacture of the IC card 2. Namely, in the manufacture ID block, for example, a unique manufacture ID, manufacture date, or manufacturer code is disposed.

In the issuance ID block, there is disposed information regarding the issuance of the IC card 2. Namely, in the issuance ID block, for example, there is disposed the date on which the IC card 2 was issued, the code that represents the order in which the IC card has been issued, or the card ID.

In the system-definition block, there is disposed, for example, the number of system blocks or user blocks that the EEPROM 66 possesses, or the system keys. It is to be noted that the system key is used when mutual authentication is performed between the IC card 2 and each of the reader/writer 1 and controller 3.

The area-definition block is produced, for example, by the memory areas of the EEPROM 66 being allocated to specific-use-operation areas and joint-use-operation areas as later described, etc. And, in that area-definition block, there is disposed information for managing the memory areas having had those use-operation areas disposed therein, etc. Namely, in the area-definition block, there are disposed, for example, the range of code that corresponds to the specific-operation-use area and joint-use-operation area, the empty capacity of each relevant memory area, the area key, etc. In the service-definition block, there is disposed items of information (the capacities of the service areas, the service keys, etc.) for managing the service areas having disposed therein applications, as later described, that are used for providing various kinds of services.

Next, an example of the data structure of data stored in the EEPROM 66 of the IC card 2 to which the present invention has been applied will be explained with reference to FIG. 6.

Figure 5:
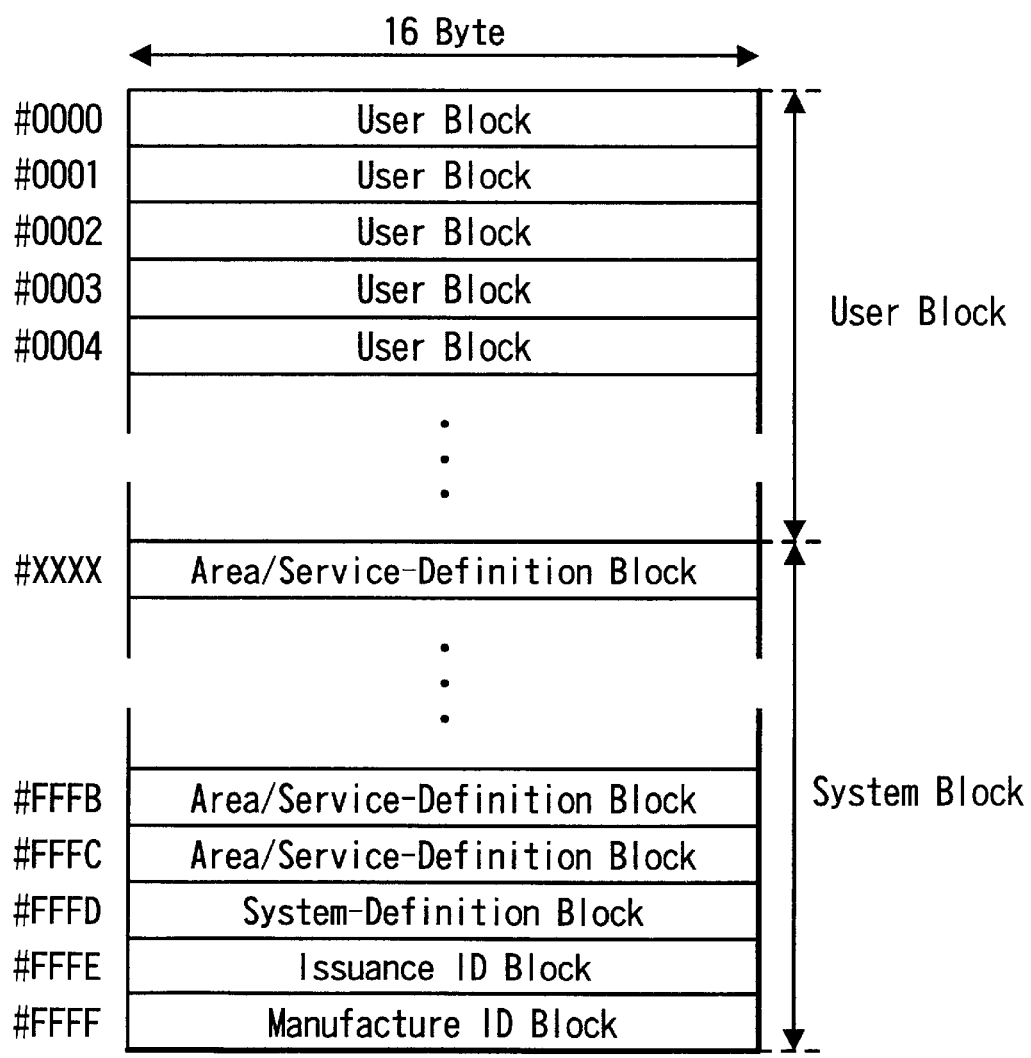
FIG. 5 is a view illustrating a logical format of the EEPROM of FIG. 3.

The data stored in the EEPROM 66 includes an OS (Operation System), a common area including an electronic money area and a joint-use-operation, or commonly accessible, area, a specific area, and a card format-definition block that corresponds to the system block explained using FIG. 5.

The OS is a fundamental program for managing an API (Application Program Interface) for having access to each of the applications that are used for providing various kinds of services disposed in the common area and specific area. In the electronic money area there is disposed an application for providing electronic money that can be used by the terminal apparatus that all enterprises and the like, cooperating with one another, are managing. Here, the "terminal apparatus" is constructed of, for example, the reader/writer 1 and the controller 3, illustrated in FIG. 1. Of the data stored in the EEPROM 66 of the IC card 2 that has been mounted thereinto, with respect to a prescribed service area thereof, the terminal apparatus performs read and write of data. The terminal apparatus thereby provides a prescribed kind of service.

With respect to the applications that are disposed in the electronic money area and joint-use-operation, or commonly accessible, area, a right to access is authenticated by a common key $K_{IF}$ that will later be described using FIG. 9. Namely, in each of those areas there is disposed an application that the cooperating enterprises, etc., other than an issuer (here referred to as "an issuer A") that has issued the IC card, can utilize. The applications disposed in the joint-use-operation area are not utilizable by all the terminal apparatus of the cooperating enterprises. Namely, according to the contents of the cooperations between the issuer A and the cooperating enterprises that manage the terminal apparatus, the applications that are utilizable are limited (the method for limitation will later be described).

With respect to the applications that are disposed in the specific area, a right to access is authenticated by a specific key A that is owned by the issuer A. In that area, there are disposed the applications the issuer A utilizes.

By the way, there can be considered to exist a case where, under the assumption that the issuer A of the IC card 2 is a company A, the user purchases an item of goods from a company B that is cooperating with the company A. And in this case the user settles the price of that item of goods, by the use of the IC card 2, by utilizing the electronic money service the company A manages. In other words, the company B's managed terminal apparatus has permitted with respect thereto an access to the application for providing an electronic money service that is disposed in a "sum of money area" of the joint-use-operation area of the company A's issued IC card 2.

In this case, the following two process steps are originally the same. One is a process step in which the electronic money is used through the use of the company A's managed terminal apparatus with the use of the company A's issued IC card 2 (the process that utilizes the application disposed in a "cashless" block in the specific area). The other is a process step in which the electronic money is used through the use of the company B's managed terminal apparatus with the use of the company A's issued IC card 2. In this case, when the service blocks for providing the same kind of service exist in the specific area and in the joint-use-operation area, a real block for this application is disposed in the joint-use-operation area. And, in the relevant block in the specific area, a link with the real block is made. Thereby, each of the corresponding applications is able to be executed.

Namely, with respect to common applications, the same application is not prepared twice with respect to the specific area and the joint-use-operation area, but actually the application is disposed with respect to either one of them (in this case, the joint-use-operation area). When an access to the relevant application has occurred from the specific area, there is used the link with the corresponding application in the joint-use-operation area. This prevents the waste of memory capacities in the EEPROM 66 of the IC card 2. In addition, by adopting this linked structure of the data, in case there are common data to both the specific area and the common area and data has been changed in one of the areas, it becomes unnecessary to execute processing for changing data in the other thereof by making this processing synchronous to the former change.

Next, with reference to FIG. 7, an explanation will be given of the case where, with respect to the issuer A of the IC card 2, another enterprise or the like makes a request to cooperate with the issuer A.

The issuer A issues the IC card 2 according to, for example, a user's request. In the EEPROM 66 of the IC card 2, as explained using FIG. 6, there are recorded the following data. They include the OS, the electronic money area, the joint-use-operation, commonly accessible area in which there is disposed the application accessible from the cooperating enterprises' managed terminal apparatus, the specific area in which there is disposed the application accessible from the issuer A's managed terminal apparatus, and data disposed in the card format-definition block.

A data-issuing machine 121 is constructed of, for example, the reader/writer 1 and the controller 3 illustrated in FIG. 1. Also, the data-issuing machine 121 can be installed, for example, in a railway station, a retailing store, or other facilities.

When wanting to change or renew data stored in the EEPROM 66 of the IC card 2, the issuer A registers into the data-issuing machine 121 the contents it wants to change or update. When thereafter the user mounts his IC card 2 into the data-issuing machine 121 (the user brings the IC card 2 into a state where the IC card 2 can make communication with the reader/writer 1 contained in the data-issuing machine 121), the data-issuing machine 121 operates as follows. The data-issuing machine 121 transmits commands and necessary data to the IC card 2 according to the information registered therein to thereby reload or update the contents of the data recorded in the EEPROM 66 of the IC card 2.

On the other hand, assume that a manager B and a manager C each want to provide service based on the use of the IC card 2 the issuer A has issued. In this case, those managers each conclude a contract with the issuer A, and they have supplied from the issuer A to them necessary data for the execution of authentication processing for authenticating the IC card 2. Those necessary data include a service code corresponding to accessible applications that are accessible according to the contents of the contract, and a common key $K_{IF}$ that is necessary for accessing the applications disposed in the joint-use-operation area explained in connection with FIG. 6. It may be arranged that those necessary data be supplied, for example, from the issuer A's managed terminal apparatus to the manager B's or C's managed terminal apparatus via a network, such as Internet lines, etc. Or it may be arranged that those necessary data be recorded in, for example, a removable disk and that this removable disk be supplied from the issuer A to the manager B or C.

Also, assume that a manager D, under the control of the manager B, wants to provide service based on the use of the IC card 2. In this case, the manager D concludes a contract with the manager B, and it has supplied from the manager B to it necessary data for the execution of authentication processing for authenticating the IC card 2. Those necessary data include a service code and a common key $K_{IF}$ corresponding to accessible applications that are accessible according to the contents of the contract.

Figure 7:
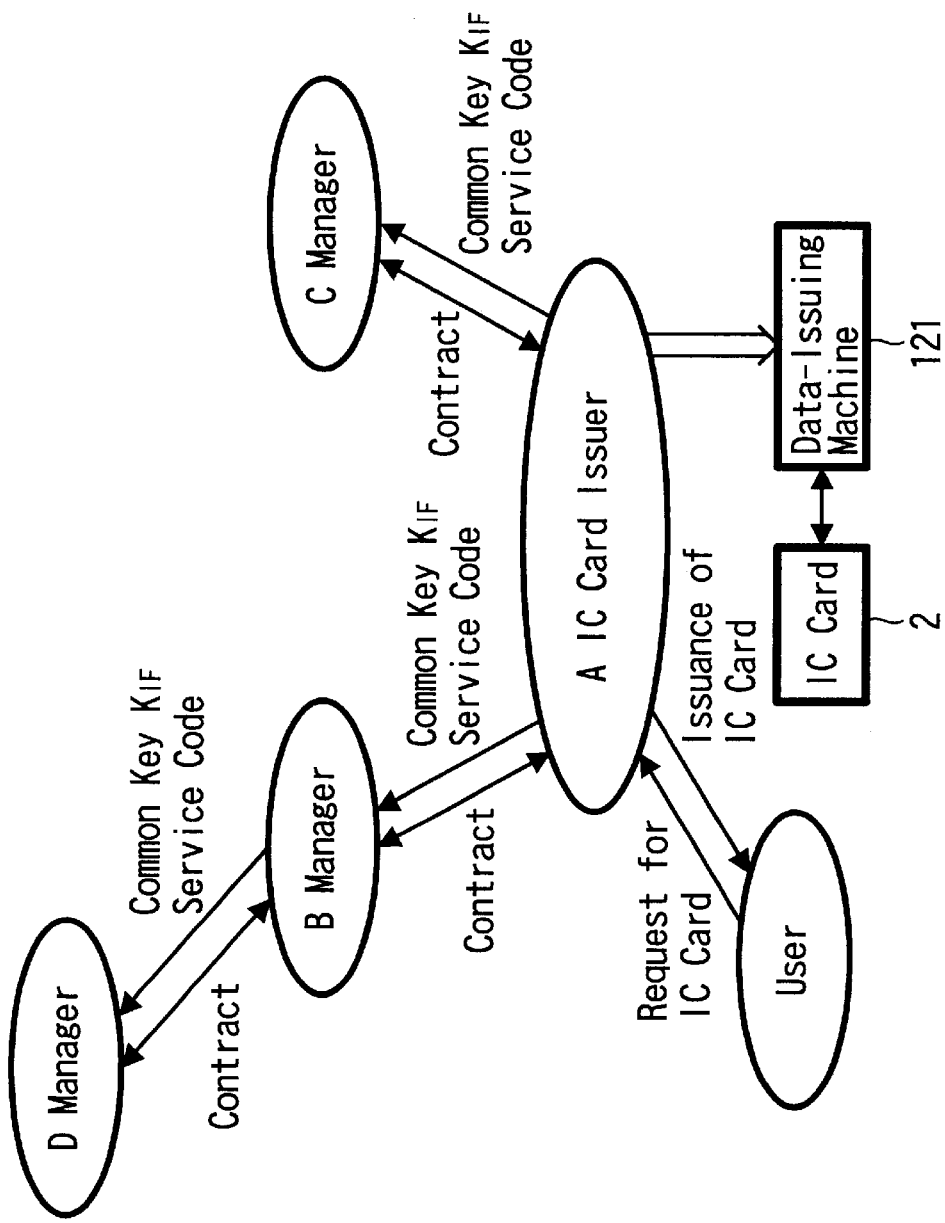
FIG. 7 is a view illustrating the relationship between an IC card issuer and its co-operators.

In FIG. 7, an explanation has been given of the case where the manager B and manager C cooperating with the issuer A, and the manager D cooperating with the manager B, enables the applications of the common areas of the issuer A's issued IC card 2 to be utilized with respect to the issuer A's issued IC card 2 through the use of their own companies' terminal apparatus. However, it may be arranged that each of the managers B, C, and D issues an IC card 2 in which there are disposed in the specific areas thereof the applications for providing the respective services of the managers.

For example, assume that the issuer A's issued IC card is an IC card 2-1. Then, the manager B can issue an IC card 2—2 the specific area of which is of a type in which a right to access is controlled by its own specific key B and has the applications recorded therein, and the common area of which is of a type in which a right to access is controlled by a common key $K_{IF}$ and has the applications recorded therein. Similarly, the manager C can issue an IC card 2-3, the specific area of which is of a type in which a right to access is controlled by its own specific key C and has the applications recorded therein, and the common area of which is of a type in which a right to access is controlled by a common key $K_{IF}$ and has the applications recorded therein. Further, the manager D can issue an IC card 2-4, the specific area of which is of a type in which a right to access is controlled by its own specific key D and has the applications recorded therein, and the common area of which is of a type in which a right to access is controlled by a common key $K_{IF}$ and has the applications recorded therein.

An enterprise that wants to make utilizable by its own company's terminal apparatus the applications in the common area of each of the other companies' issued IC cards 2-1 to 2-4 can request cooperation with the issuer of the corresponding IC cards. And that enterprise has supplied thereto an area code corresponding to the utilizable application and has only to register that area code in its company's managed terminal apparatus.

In the event a plurality of enterprises each issue an IC card 2 by which it can provide its specific service, it may be arranged that enterprises other than the managers that manage the terminal apparatus (e.g., every manager from the issuer A to manager D of FIG. 7) have, for example, an IC card center installed for them and thereby have the applications in the common area of their IC card 2 managed together. In this case, enterprises that want to participate in the IC card system and thereby to provide service based on the use of the IC card 2 having a common format can register themselves in the IC card center and, for example, can pay a registration fee. By doing so, each of those enterprises, when it itself wants to issue the IC card 2, can have a unique specific key supplied thereto and issue the IC card 2 for providing its own company's specific service to the user. In addition, that enterprise can have supplied thereto the common key $K_{IF}$ for accessing the common area of the IC card 2 another enterprise issues by using its own company's terminal apparatus.

Figure 8:
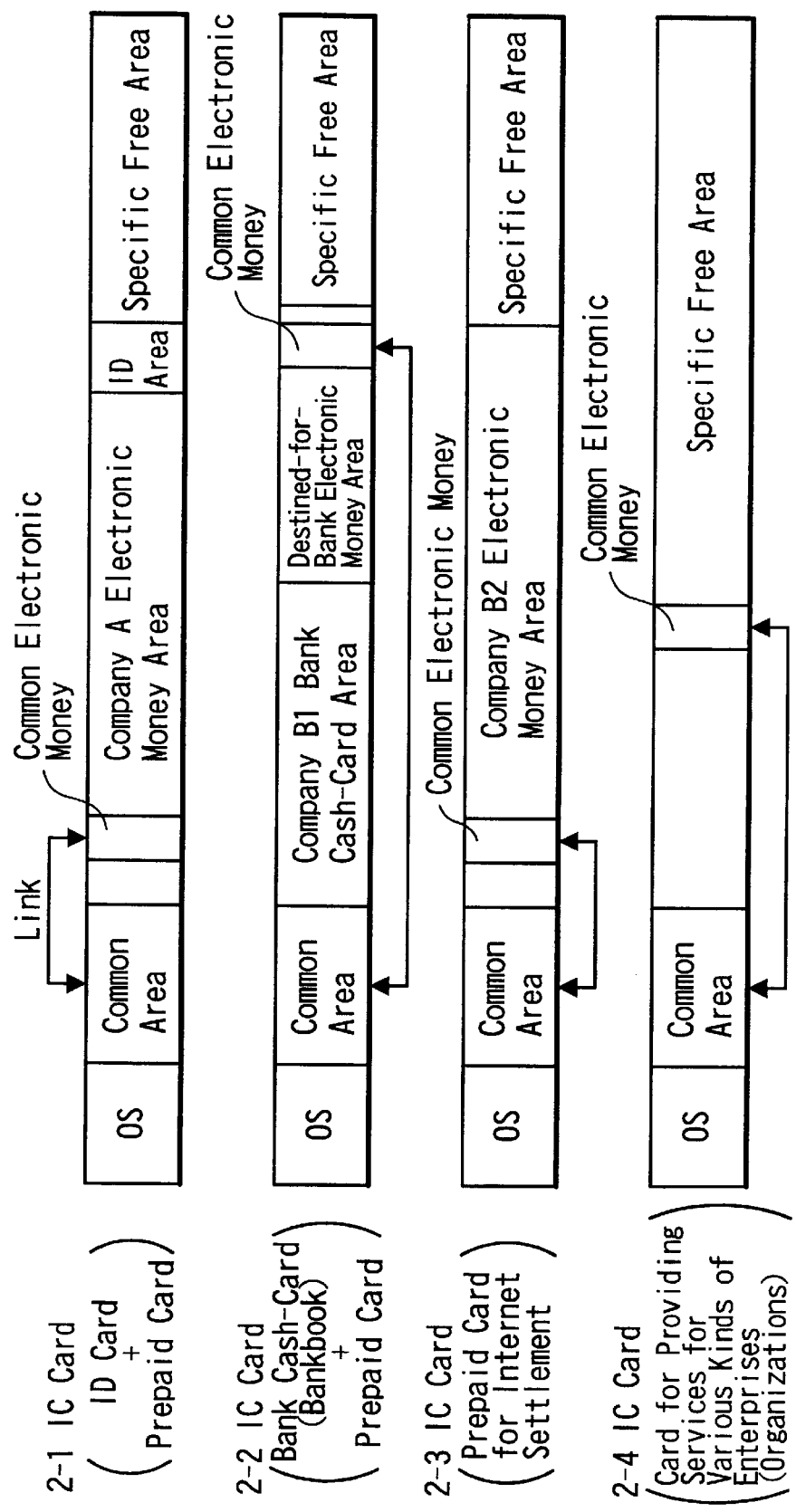
FIG. 8 is a view illustrating examples of the applications recorded in the EEPROM of FIG. 3.

The IC cards 2-1 to 2-4 can take various kinds of forms corresponding to the services their respective issuers provide to the user. With reference to FIG. 8, examples of the forms of the services that are provided by the IC cards 2 will hereafter be explained.

The IC card 2-1 is one that has been produced, for example, by adding the function of a prepaid card (that is utilizable from the company A's managed vending machines, gullets, stands, etc.) to the function of the IC card (a student identification card, a company's staff identification card, etc.). The IC card 2-1 is utilized, for example, in a school, an office, etc. Also, where the application regarding common electronic money disposed in the company A's specific area is the same application as the one corresponding to, for example, the electronic money provided to the IC card system and utilizable in other enterprises or stores (e.g., the application disposed in the electronic money area, explained using FIG. 6), a link is made between the common electronic money in the specific area and the corresponding application in the common area (hereinafter, the same applies to the cards 2—2 to 2-4 as well).

The IC card 2—2 is one that is produced, for example, by adding the function of a prepaid card to the cash card of a bank. In this IC card 2—2, where the value deposited in the bank electronic money area of the card is to be added to, that addition may be performed as follows. Namely, the user may directly deposit his cash each time the necessity arises, or may transfer money from his account to a prescribed money receipt account. Or the user may open another account in the same branch office he uses his account in, and thereby may transfer a prescribed amount of money into it as money that is utilizable by the IC card 2, beforehand, thereby the management thereof may be performed.

The IC card 2-3 is one that, for example, has the function of a prepaid card for settlement of Internet transactions. And, the IC card 2-4 has, excepting that it is prepared for the utilization of the common area, an area whose format is for specifically disposing the applications for providing the services of various kinds of enterprises or organizations.

Next, an example of a method of supplying authentication information, such as the common key $K_{IF}$, from issuer A of FIG. 7 to the managers B, C, and D, will now be explained with reference to FIG. 9. Common key $K_{IF}$ is one that is intended to permit each of those managers the right to access the applications disposed in the common area.

The issuer A of the IC card 2 determines the system key that, as explained using FIG. 5, is stored in the system-definition block of the EEPROM 66 and the specific key A that, as similarly explained, serves as the area key in the area-definition area (e.g., #0000h) corresponding to the specific area. The issuer A thereby causes the system key and the specific key A to be stored, respectively, in the system-definition block of the EEPROM 66 of the IC card 2 it issues and in the area-definition area #0000h thereof, beforehand. Hereinafter, regarding the area key in the area-definition area #xxxxh, it is described as the area key #xxxxh as the necessity arises.

The control part 101 of the controller 3 of the issuer A's managed terminal apparatus encodes the system key with use of the specific key A to thereby produce an area intermediate key $K_A$ beforehand. Incidentally, as the method of encoding, it is possible to adopt, for example, a DES (Data Encryption Standard) or an FEAL (Fast Data Encipherment Algorithm).

When giving the manager B the right to access the common area, the issuer A supplies to the manager B the following. It includes the common key $K_{IF}$ that serves as the area key of the area-definition area (e.g., #0100h) corresponding to the common area, the area intermediate key $K_A$, the service code and service key corresponding to the application the issuer A permits access to, and the area code #0000h. Namely, the control part 101 of the controller 3 of the issuer A's managed terminal apparatus has supplied thereto from the input part 103 the common key $K_{IF}$ that serves as the area key of the area-definition area (e.g., #0100h) corresponding to the common area, the area intermediate key $K_A$, the service code and service key corresponding to the application the issuer A permits access to, and the area code #0000h. It transmits these data items to the controller 3 of the manager B by way of the internal bus 102, network interface 107, and wide-band network such as the Internet communication network (not illustrated).

Accordingly, although the manager B's terminal apparatus can recognize the area intermediate key $K_A$ and common key $K_{IF}$, it cannot recognize the system key and the specific key A of the issuer A that is, so to speak, the parent. However, since the common key $K_{IF}$ of the manager B is one that has been given to the terminal apparatus of the manager B that is, so to speak, the child, by the terminal of the issuer A that is the parent, the issuer A that is the parent can recognize the common key $K_{IF}$ of the manager B that is the child.

The control part 101 of the controller 3 of the manager B's managed terminal apparatus codes the area intermediate key $K_A$ that has been received from the issuer A, by the use of the common key $K_{IF}$ that has been received from the issuer A. It thereby produces the area intermediate key $K_B$ which it supplies to the reader/writer 1, together with the common key $K_{IF}$ and the service code and service key corresponding to the application to which it has been permitted access, via the internal bus 102, network interface 107, and the network cable such as the RS-485A. It thereby causes these data to be kept stored in the flash memory 22 of the reader/writer 1.

Where the right to access the common area is given to the manager C, also similarly, the control part 101 of the controller 3 of the issuer A's managed terminal apparatus supplies to the manager C's controller 3 the common key $K_{IF}$, area intermediate key $K_A$, service code and service key corresponding to the application to which it is permitted access, and area code #0000h.

Accordingly, although the manager C's terminal apparatus can recognize the area intermediate key $K_A$ and the common key $K_{IF}$, it cannot recognize the system key and the specific key A of the issuer A that is the parent.

The control part 101 of the controller 3 of the manager C's managed terminal apparatus codes the area intermediate key $K_A$ that has been received from the issuer A that is the parent, by the use of the common key $K_{IF}$ that has been received similarly from the issuer A. It thereby produces an area intermediate key $K_C$ which it thereby supplies to the reader/writer 1, together with the common key $K_{IF}$ and the service code and service key corresponding to the application to which it is permitted access, via the internal bus 102, network interface 107, and network cable such as the RS-485A. It thereby causes these data to be kept stored in the flash memory 22 of the reader/writer 1.

On the other hand, where imparting to the manager D a part of the right to access the application to which it is permitted access, also similarly, the control part 101 of the controller 3 of the manager B's managed terminal apparatus supplies to the controller 3 of the manager D's managed terminal apparatus the area intermediate key $K_B$, service code and service key corresponding to the application to which it is permitted access, common key $K_{IF}$, area code #0100h, and area code #0000h of the issuer A that is the parent.

Accordingly, although the manager D's terminal apparatus can recognize the area intermediate key $K_B$ and the common key $K_{IF}$, it cannot recognize the system key and the specific key A of the issuer A.

The control part 101 of the controller 3 of the manager D's managed terminal apparatus codes the area intermediate key $K_B$ that has been received from the manager A that is the parent, by the use of the common key $K_{IF}$ that has been received similarly from the manager B. It thereby produces an area intermediate key $K_D$ which it supplies to the reader/writer 1, together with the common key $K_{IF}$ and the service code and service key corresponding to the application to which it is permitted access, via the internal bus 102, network interface 107, and network cable such as the RS-485A. It thereby causes these data to be kept stored in the flash memory 22 of the reader/writer 1.

It is to be noted that the common key $K_{IF}$ that the issuer A has given to each of the managers B and C and that the manager B has given to the manager D is written beforehand into the area-definition area #0100h of the EEPROM 66 of the IC card 2, which defines the common area.

Here, an explanation has been given of the case where the issuer A of the IC card 2 supplies authentication information, such as the common key $K_{IF}$, to the manager B and to the manager D. However, the same process is also executed when the above-described IC card center supplies the authentication information, such as the common key $K_{IF}$, to each of the manager B and the manager D.

Next, assuming that the supply of the right to access such as that explained in connection with FIG. 9 has been performed, and the IC card 2 has been mounted to the issuer A's terminal apparatus, the mutual authentication between the issuer A's terminal apparatus and the IC card 2 will be explained with reference to FIG. 10.

Assume a case where the application stored in the specific area of the EEPROM 66 of the IC card 2 is executed using the issuer A's managed terminal apparatus and a prescribed kind of service is provided to the user. In this case, as illustrated in FIG. 10, the controller 3 of the issuer A's terminal apparatus encodes a service key by the use of the area intermediate key $K_A$. The service key encoded (the service key stored in the service-definition area #xxxxh is hereinafter described as the necessity arises as the service key #xxxxh) is that stored in the service-definition area (e.g., the service-definition area #0008h) corresponding to the application disposed in the specific area. The controller 3 thereby produces a service intermediate key $K_{\#0008}$h which it registers in the flash memory 22 of the reader/writer 1 together with the area intermediate key $K_A$. In addition, the issuer A's controller 3 registers the following codes in the flash memory 22 of the reader/writer 1: the area code #0000h in the area-definition area #0000h corresponding to the specific area, and the service code in the service-definition area corresponding to the application, in the specific area, 1produced in the hierarchy of that area-definition area #0000h.

Namely, assume a case where the IC card 2 is mounted in the issuer A's managed terminal apparatus and the user has instructed the utilization of its desired service. In this case, the DPU 31 of the reader/writer 1 of the issuer A's managed terminal apparatus reads in from the flash memory 22 the area code #0000h registered therein and the service code (e.g., the service code #0008h) corresponding to the service the user wants to utilize, similarly registered therein. The DPU 31 transmits these data to the IC card 2 via the bus 35, SPU 32, modulator circuit 27, and antenna 27. The sequencer 91 of the IC card 2 has input thereto the area code #0000h and service code #0008h from the issuer A's terminal apparatus via the antenna 53, interface part 61, and BPSK demodulation part 62.

And, in the IC card 2, the system key stored in the system-definition block (FIG. 5) is read out from the data stored in the EEPROM 66. Simultaneously, the specific key A is read out from the area-definition area having the area code #0000h received from the issuer A's terminal apparatus. Further, the system key is encoded using the specific key A. As a result, there is produced the same key as the area intermediate key $K_A$ registered in the issuer A's terminal apparatus. This same key as the area intermediate key $K_A$ is used as a first access key (authentication key) $K_{bc}$ that is used for authentication of the right to access the specific key.

Also, in the IC card 2, the service key #0008h is read out from the service-definition area having the service code #0008h received from the issuer A's terminal apparatus. And, the area intermediate key $K_A$ is encoded using the service key #0008h. As a result, there is produced the same key as the area intermediate key $K_{\#0008h}$ registered in the issuer A's terminal apparatus of FIG. 10. This same key as the area intermediate key $K_{\#0008h}$ is used as a second access key (authentication key) $K_{ac}$ that is used for authentication of the right to access the corresponding application.

Accordingly, in the issuer A's terminal apparatus, there are registered the area intermediate key $K_A$ that is the first access key $K_{bc}$ and the service intermediate key $K_{\#0008h}$ that is the second access key $K_{ac}$. On the other hand, in the IC card 2, the area intermediate key $K_A$ that is the first access key $K_{bc}$ and the service intermediate key $K_{\#0008h}$ that is the second access key $K_{ac}$ are produced. Thereby, the utilization of the application in the specific area corresponding to the service key $K_{\#0008h}$ is authenticated.

Figure 11:
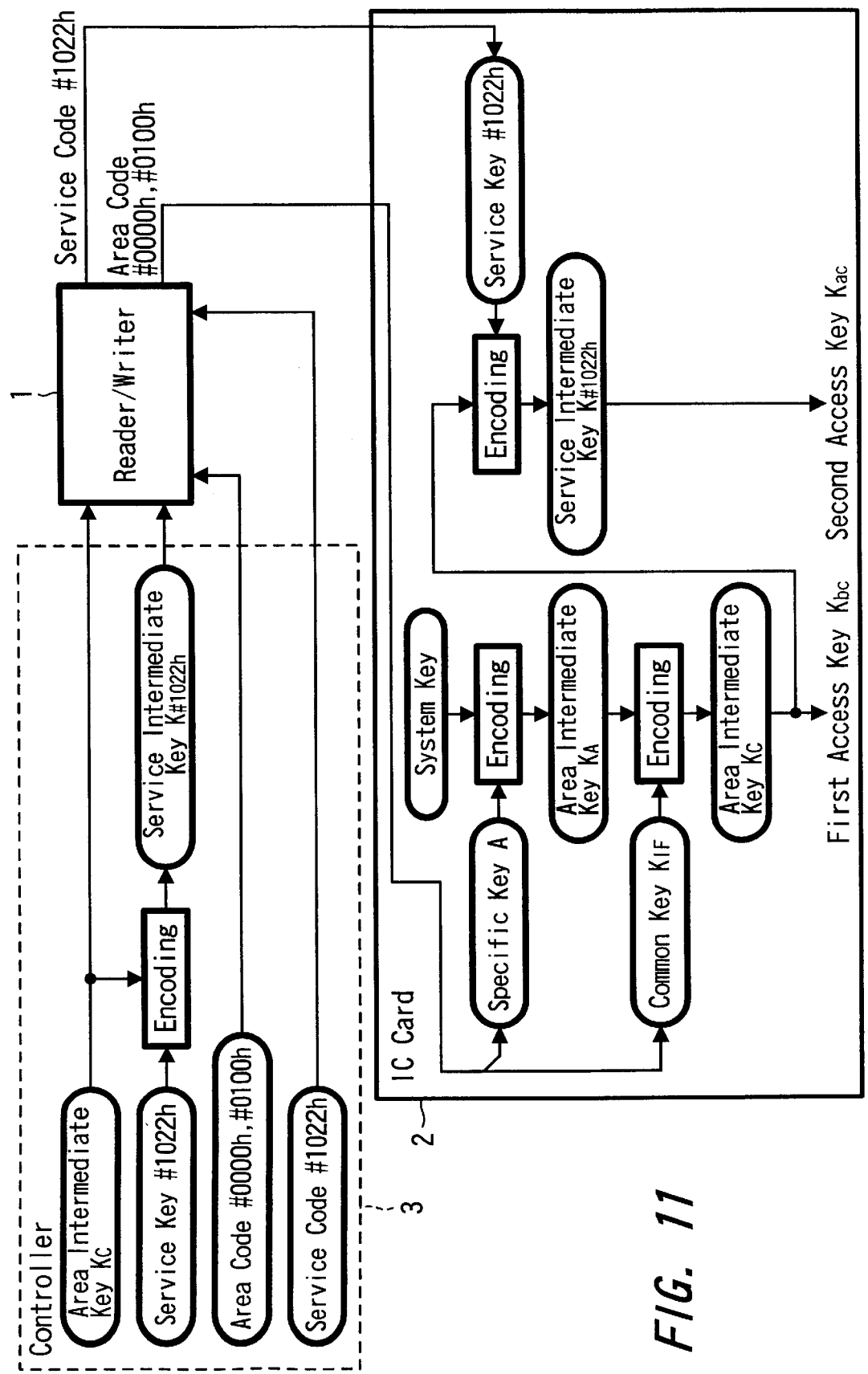
FIG. 11 is a view illustrating the process for authenticating the IC card that is executed in a co-operator's managed terminal apparatus.

Next, assuming that the supply of the right to access such as that explained in connection with FIG. 9 has been performed, and the IC card 2 has been mounted to the issuer C's terminal apparatus, the mutual authentication between the issuer C's terminal apparatus and the IC card 2 will be explained with reference to FIG. 11.

Assume a case where the application stored in the common area of the EEPROM 66 of the IC card 2 is executed using the issuer C's managed terminal apparatus and a prescribed kind of service is provided to the user. In this case, the controller 3 of the issuer C's managed terminal apparatus encodes, by the use of the area intermediate key $K_C$, a service key disposed in the common area. The service key encoded (e.g., the service key #1022h) is that corresponding to the application to which access is permitted to the manager C. The controller 3 thereby produces a service intermediate key K#1022h which it registers in the flash memory 22 of the reader/writer 1 together with the area intermediate key $K_C$. And, the controller 3 of the manager C's managed terminal apparatus registers in the flash memory 22 of the reader/writer 1 of the manager C's managed terminal apparatus the following codes: the area code #0000h of the issuer A, the area code #0100h corresponding to the common area, and the service code in the service-definition area (e.g., the service-definition area #1022h) corresponding to the application the utilization of which has been permitted to it under a relevant contract.

Namely, assume a case where the IC card 2 is mounted in the issuer C's managed terminal apparatus and the terminal apparatus has been operated by the user to enable him to utilize a desired service. In this case, the DPU 31 of the reader/writer 1 of the terminal apparatus reads in from the flash memory 22 the area codes #0000h and #0100h registered therein and the service code (e.g., the service code #1022h) corresponding to the service the user wants to utilize, similarly registered therein. The DPU 31 transmits these code data to the IC card 2 via the bus 35, SPU 32, modulation circuit 23, and antenna 27. The sequencer 91 of the IC card 2 has input thereto the area codes #0000h and #0100h and service code #1022h from the manager C's terminal apparatus via the antenna 53, interface part 61, and BPSK demodulation part 62.

And, in the IC card 2, the system key stored in the system-definition block explained using FIG. 5 is read out from the data stored in the EEPROM 66. Simultaneously, the specific key A or common key $K_{IF}$ is read out from the area-definition area having the area code #0000h or #0100h received from the manager C's terminal apparatus. Further, the system key is encoded using the specific key A. As a result, there is produced the same key as the area intermediate key $K_A$. And the same key as that area intermediate key $K_A$ is encoded using the common key $K_{IF}$. As a result, there is produced the same key as the area intermediate key $K_C$ registered in a service provider apparatus. This same key as the area intermediate key $K_C$ is used as a first access key $K_{bc}$ that is used for authentication of the right to access the common area.

Also, in the IC card 2, from the data stored in the EEPROM 66, the service key #1022h is read out from the service-definition area having the service code #1022h received from the issuer C's managed terminal apparatus. And, the same key as the area intermediate key $K_C$ is encoded using the service key #1022h. As a result, there is produced the same key as the area intermediate key $K_{\#1022h}$ registered in the issuer C's managed terminal apparatus. This same key as the area intermediate key $K_{\#1022h}$ is used as a second access key $K_{ac}$ that is used for authentication of the right to access the corresponding application.

Accordingly, in the manager C's managed terminal apparatus, there are registered the area intermediate key $K_C$ that is the first access key $K_{bc}$ and the service intermediate key $K_{\#1022h}$ that is the second access key $K_{ac}$. On the other hand, in the IC card 2, the area intermediate key $K_C$ that is the first access key $K_{bc}$ and the service intermediate key $K_{\#1022h}$ that is the second access key $K_{ac}$ are produced.

And, assume a case where, as a result of mutual authentication, the data of the IC card 2 and the data of the manager C's managed terminal apparatus are each proper with respect to the other. In this case, the IC card 2 permits, with respect to the manager C's managed terminal apparatus, access to the service area that is managed by the service-definition area having the service code that has been transmitted from the manager C's managed terminal apparatus. Therefore, in the case that has been explained using FIG. 11, the manager C's managed terminal apparatus is able to access the application of the service area that is managed by the service-definition area #1022h of the IC card 2.

That is to say, in the manager C's terminal apparatus in which the area intermediate key $K_C$, area code #0000h, #0100h, service key #1022h, and service code #1022h are each registered, access can be had to the service area that is under the control of the service-definition area #1022h. But, the manager C's terminal apparatus has not had registered therein other service codes which may not be utilized under a relevant contract. Therefore, the manager C's terminal apparatus cannot access, until it has issued with respect to it a relevant service code by the issuer A under a new relevant contract, the application in the service area managed in the corresponding relevant service-definition area.

As described above, the terminal apparatus managed respectively by the manager B that has cooperated with the issuer A issuing the IC card 2, manager C that has similarly cooperated with it, and manager D that has cooperated with the manager B, can each utilize, according to the contents of the corresponding cooperation, the application stored in the EEPROM 66 of the IC card 2. (Namely, each of them can access the application corresponding to the service code that has been supplied from the issuer A).

Next, the processing of the terminal apparatus to which the present invention is applied will be explained with reference to the flow chart of FIG. 12. Here, an explanation will be given of the processing executed using the terminal apparatus that has the specific key A and common key $K_{IF}$ and that is managed by the issuer A.

The reader/writer 1 of the terminal apparatus, in step S1, detects the mounting of the IC card with respect to it, for example, by monitoring the state of load of the antenna 2. In step S2, the reader/writer 1 has input thereto from the controller 3 a signal indicating an object-to-be-opened file, which signal among the applications stored in the EEPROM 66 indicates which one of the files should be opened. (Namely, that signal is the one indicating a utilization application with respect to which the user has input with use of the input part 103 of the controller 3 and which has been designated based on the user's operation indicating the utilization of, deposit into, etc. the electronic money). The signal indicating the object-to-be-opened is input to the DPU 31 via the SCC 33 and the bus 35.

Figure 10:
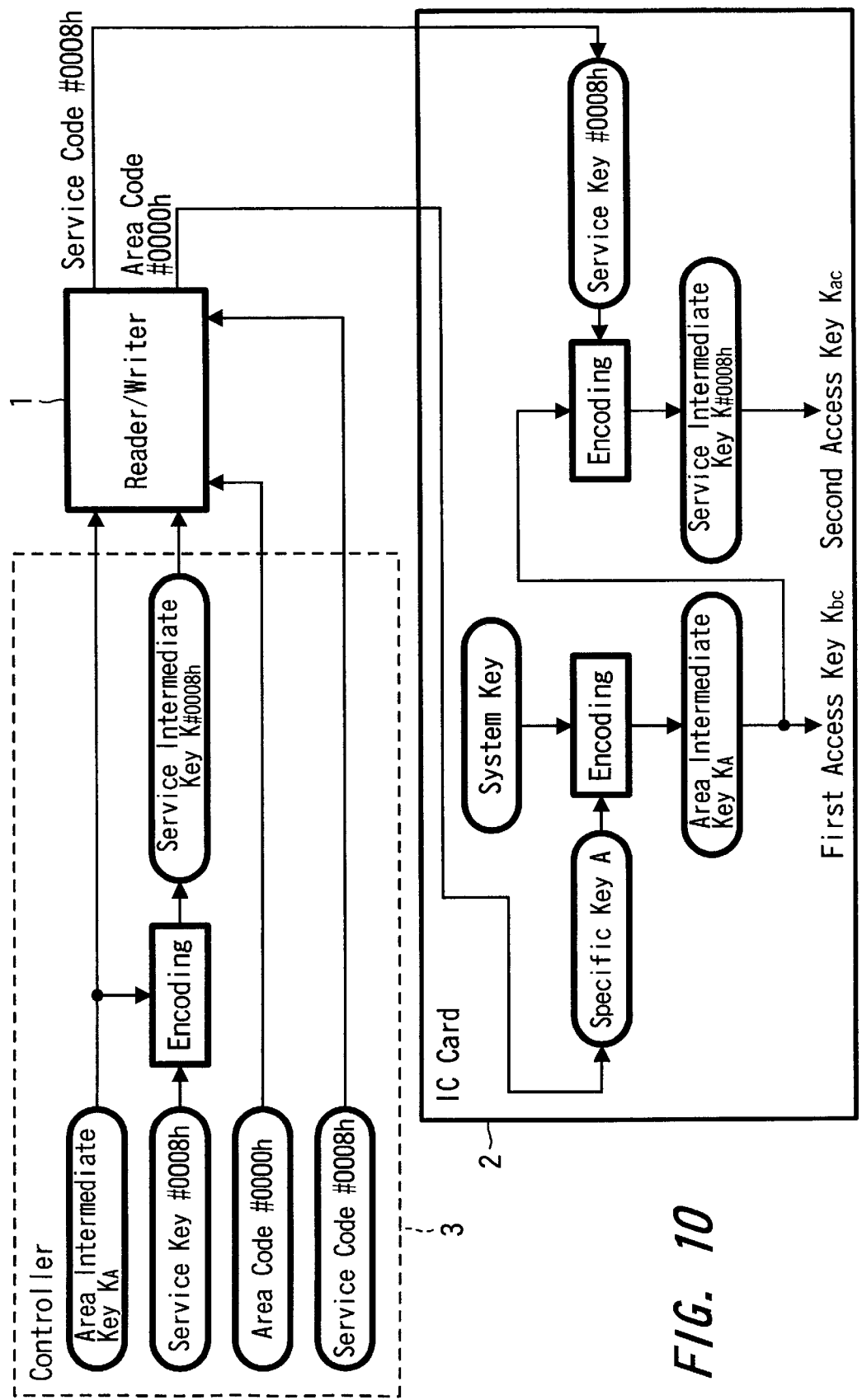
FIG. 10 is a view illustrating the process for authenticating the IC card that is executed in an issuer's managed terminal apparatus.

In step S3, the reader/writer 1 of the terminal apparatus performs authentication by the use of the specific key A through the execution of the processing explained using FIG. 10. Namely, the DPU 31 of the reader/writer 1 reads in via the bus 35 the authentication information based on the use of the specific key A stored in the flash memory 22. The DPU 31 then transmits that information to the IC card 2 via the bus 35, SPU 32, modulator circuit 23, and antenna 27.

The SPU 32 receives a response signal from the IC card 2 via the antenna 27 and the modulator circuit 25. It then inputs this response result to the DPU 31 via the bus 35.

In step S4, the DPU 31 of the reader/writer 1 determines whether the reader/writer 1 and the IC card 2 have been correctly authenticated with each other by the specific key A and according to the response signal input in step S3 from the IC card 2. When it is determined in step S4 that correct authentication has not been performed, the processing proceeds to step S11.

When it is determined in step S4 that correct authentication has been performed (namely, that the mounted IC card 2 is one issued by the issuer A), the DPU 31 of the reader/writer 1 in step S5 acts or operates on the signal indicating the object-to-be-opened file input in step S2. The DPU 32 according to that signal produces a control signal (including the service code corresponding to the object-to-be-opened file) for gaining the right to access the object-to-be-opened file disposed in the EEPROM 66 of the IC card 2. It then transmits that control signal to the IC card 2 via the bus 35, SPU 32, modulator circuit 23, and antenna 27. The SPU 32 receives a response signal from the IC card 2 via the antenna 27 and the demodulator circuit 25. Then, it inputs the corresponding response result to the DPU 31 via the bus 35.

In step S6, the DPU 31 of the reader/writer 1 determines, according to the response signal input in step S5 from the IC card 2, whether it has been able to get the right to access the object-to-be-opened file. When it is determined in step S6 that the DPU 31 has failed to get the right to access the object-to-be-opened file, the processing proceeds to step S10.

When it is determined in step S6 that the relevant terminal apparatus has been able to get the accessing right, the DPU 31 of the reader/writer 1 produces in step 57, according to the signal indicating the object-to-be-opened file input in step S2, a control signal for opening the object-to-be-opened file in the EEPROM 66 of the IC card 2. The DPU 31 then transmits that control signal to the IC card 2 via the bus 35, SPU 32, modulator 23, and antenna 27 together with the specific key A registered in the flash memory 22.

In step S8, the reader/writer 1 performs data transmission/reception with the IC card 2 as needed. In this step S8, the reader/writer 1 executes the command-processes based on, for example, the operation designating the utilization (subtraction) of the electronic money, the filling (addition) thereof, etc. that the user has input in step S2 by the use of the input part 103 of the controller 3. Concrete examples of the processes that are executed will be described later with reference to FIGS. 13 to 18.

In step S9, the DPU 31 of the reader/writer 1 records the log of the process executed in step S8 into the RAM 42 of the memory 34 of the reader/writer 1 as a case of utilizing the specific key A. The DPU 31 also produces a control signal for recording into the RAM 67 of the IC card 2, and transmits it to the IC card 2 via the bus 35, SPU 32, modulation 23, and antenna 27. The antenna 53 of the IC card 2 receives the control signal and supplies it to the interface part 61. Thereby, in the interface part 61, BPSK demodulation part 62, and calculation part 64, a prescribed process is executed. The log of the process executed in step S8 is kept stored in the RAM 67, and the process is terminated.

Assume a case where it has been determined in step S4 that no correct authentication has been performed with the use of the specific key A (namely, a case where the IC card 2 is one that has been issued by a manager other than the issuer A). In step S11, the reader/writer 1 of the terminal apparatus performs authentication with use of the common key $K_{IF}$ according to the process explained using FIG. 11. That is to say, the DPU 31 of the reader/writer 1 reads in the bus 35 the authentication information, the authentication of which is performed using the common key $K_{IF}$ stored in the flash memory 22. Then, it transmits that authentication information to the IC card 2 via the bus 35, SPU 32, modulator 23, and antenna 27. The SPU 32 receives a response signal from the IC card 2 via the antenna 27 and the demodulator circuit 25, and it inputs the response result to the DPU 31 via the bus 35.

In step S12, the DPU 31 of the reader/writer 1 operates on the response signal that has been input in step S11 from the IC card 2. The DPU 31 determines according to that response signal whether the correct authentication has been performed by the common key $K_{IF}$. When it is determined in step S12 that the correct authentication has not been performed, the processing proceeds to step S10.

When it is determined in step S12 that correct authentication has been performed, in step S13 the DPU 31 of the reader/writer 1 acts or operates on the signal that indicates the object-to-be-opened file that has been input in step S2. The DPU 31 then produces a control signal for gaining the accessing right for the object-to-be-opened file disposed in the EEPROM 66 of the IC card 2 (the control signal including the service code corresponding to the object-to-be-opened file). It then transmits the control signal to the IC card 2 via the bus 35, SPU 32, modulator circuit 23, and antenna 27. The SPU 32 receives a response signal from the IC card 2 via the antenna 27 and the demodulator circuit 2 and inputs the response result to the DPU 31 via the bus 35.

In step S14, the DPU 31 of the reader/writer 1 determines, according to the response signal input in step S13 from the IC card 2, whether it has been able to get the right to access the object-to-be-opened file. When it is determined in step 514 that the DPU 31 has failed to get the right to access the object-to-be-opened file, the processing proceeds to step S10.

When it is determined in step S14 that the relevant terminal apparatus has been able to get the accessing right, the DPU 31 of the reader/writer 1 produces in step S15, according to the signal indicating the object-to-be-opened file input in step S2, a control signal for opening the object-to-be-opened file in the EEPROM 66 of the IC card 2. The DPU 31 then transmits that control signal to the IC card 2 via the bus 35, SPU 32, modulator circuit 23, and antenna 27 together with the common key $K_{IF}$ registered in the flash memory 22.

In step S16, the reader/writer 1 performs data transmission/reception with the IC card 2 as needed. In this step S16, the reader/writer 1 executes the command-processes input by users using the input part 103 of the controller 3 based on, for example, the operation designating the utilization of the electronic money. Concrete examples of the processes that are executed will be described later with reference to FIGS. 13 to 18.

In step S17, the DPU 31 of the reader/writer 1 records the log of the process executed in step S16 into the RAM 42 of the memory 34 of the reader/writer 1 as a case of utilizing the common key $K_{IF}$. The DPU 31 also produces a control signal for recording into the RAM 67 of the IC card 2, and transmits it to the IC card 2 via the bus 35, SPU 32, modulator circuit 23, and antenna 27. The antenna 53 of the IC card 2 receives the control signal and supplies it to the interface part 61. Thereby, in the interface part 61, BPSK demodulation part 62, and calculation part 64, a prescribed process is executed. The log of the process executed in step S16 is kept stored in the RAM 67, and the process is terminated.

In the following cases, the DPU 31 of the reader/writer 1 in step S10 produces a control signal indicating the contents of the error, and outputs it to the controller 3 via the bus 35 and SCC 33. Namely, a first case is one wherein in step S6 it has been determined that the DPU 31 has failed to get the accessing right. A second case is one wherein in step S12 it has been determined that no correct authentication has been performed through the use of the common key $K_{IF}$. And a third case is one wherein in step S14 it has been determined that the DPU 31 has failed to get the accessing right. The control part 101 of the controller 3 has input thereto the control signal from the reader/writer 1 via the network interface 107 and the internal bus 102. It then produces an error message for display on the display part 105 and outputs it to the display part 105 via the internal bus 102, thereby the processing is terminated.

Next, concrete examples of the processes explained using FIG. 12 will be explained with reference to FIGS. 13 to 18.

Figure 6:
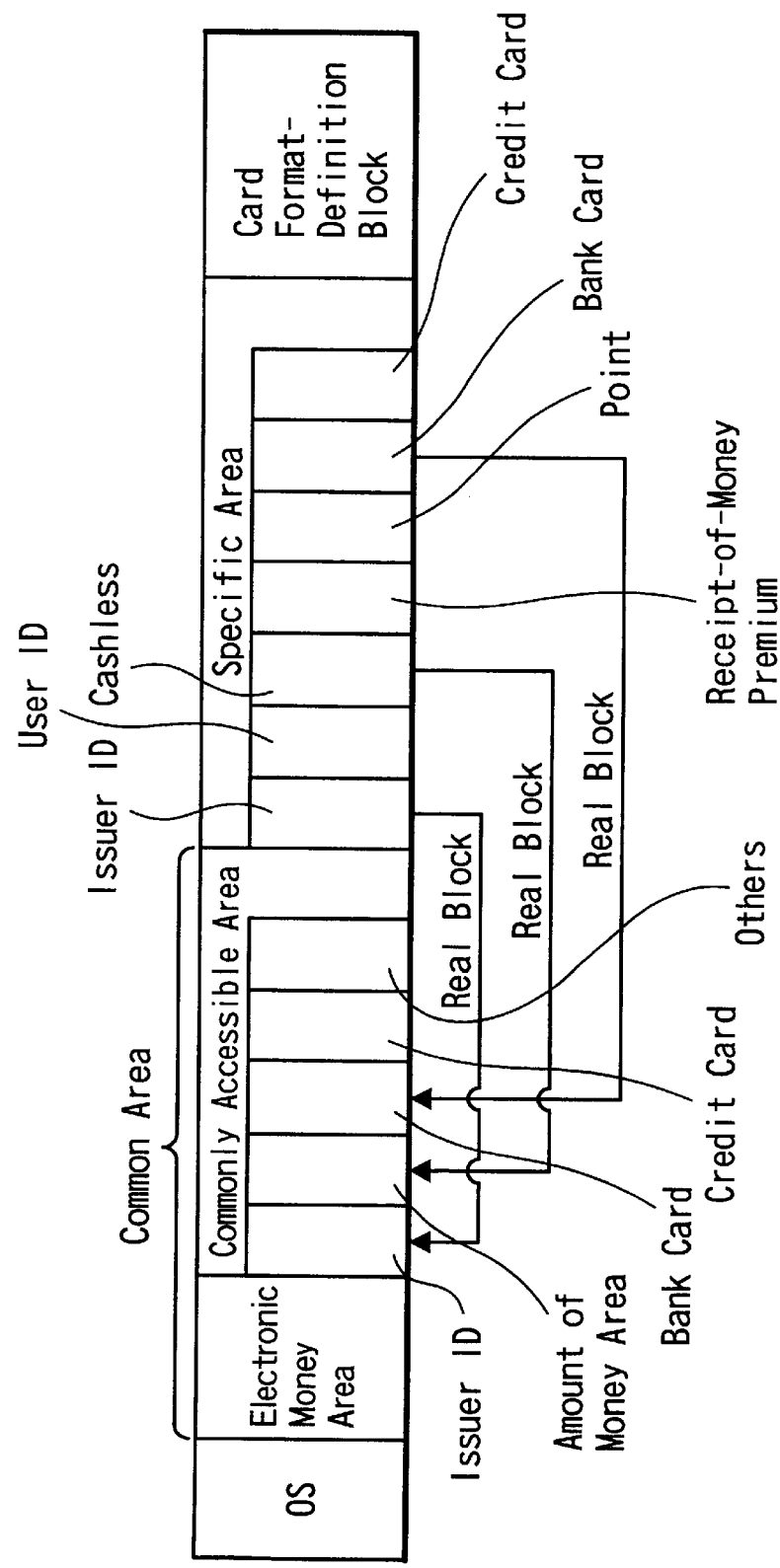
FIG. 6 is a view illustrating the construction of applications recorded in the EEPROM of FIG. 3.

For example, assume that the following is registered in the electronic money area of the common area, or the mutual-use-operation area, of the IC card 2, which has been explained using FIG. 6. Namely, the respective cooperating stores, and the application (the for-joint-use-operation, or commonly accessible, electronic value file) enabling the use of the "for-joint-use-operation (commonly accessible) electronic value" that can be used when purchasing an item of goods (i.e., having the same value as that of money or currency). Also, in the specific area, as well, of the IC card 2, there is disposed the commonly accessible electronic value file, that is linked with the commonly accessible electronic value file of the common area.

It is here assumed that it is arranged that the commonly accessible electronic value can be used by the stores of all enterprises taking part in the IC card use operation system. (Namely, it is arranged that all terminal apparatus have registered therein an area code corresponding to the application for executing the subtraction of the amount of commonly accessible electronic value). On the other hand, it is assumed that it is arranged that the application for increasing the amount of electronic value by the filling, i.e., deposit of money or the like, with respect to the commonly accessible electronic value can only be used with the terminal apparatus managed by the enterprise having issued the corresponding IC card 2.

The commonly accessible electronic value filling process executed by the terminal apparatus managed by the issuer A that has issued the IC card 2 will now be explained with reference to the flow chart of FIG. 13.

In step S21, the reader/writer 1 of the terminal apparatus detects the IC card 2 that has been mounted thereto. Then, the reader/writer 1 has input thereto from the controller 3 the filling amount of for-joint-use-operation, or commonly accessible, electronic value the user has input using the input part 103 of the controller 3. Namely, the object-to-be-opened file is a for-joint-use-operation electronic value file, and the filling amount of for-joint-use-operation electronic value is input to the DPU 31 via the SCC 33 and the bus 35.

Figure 12:
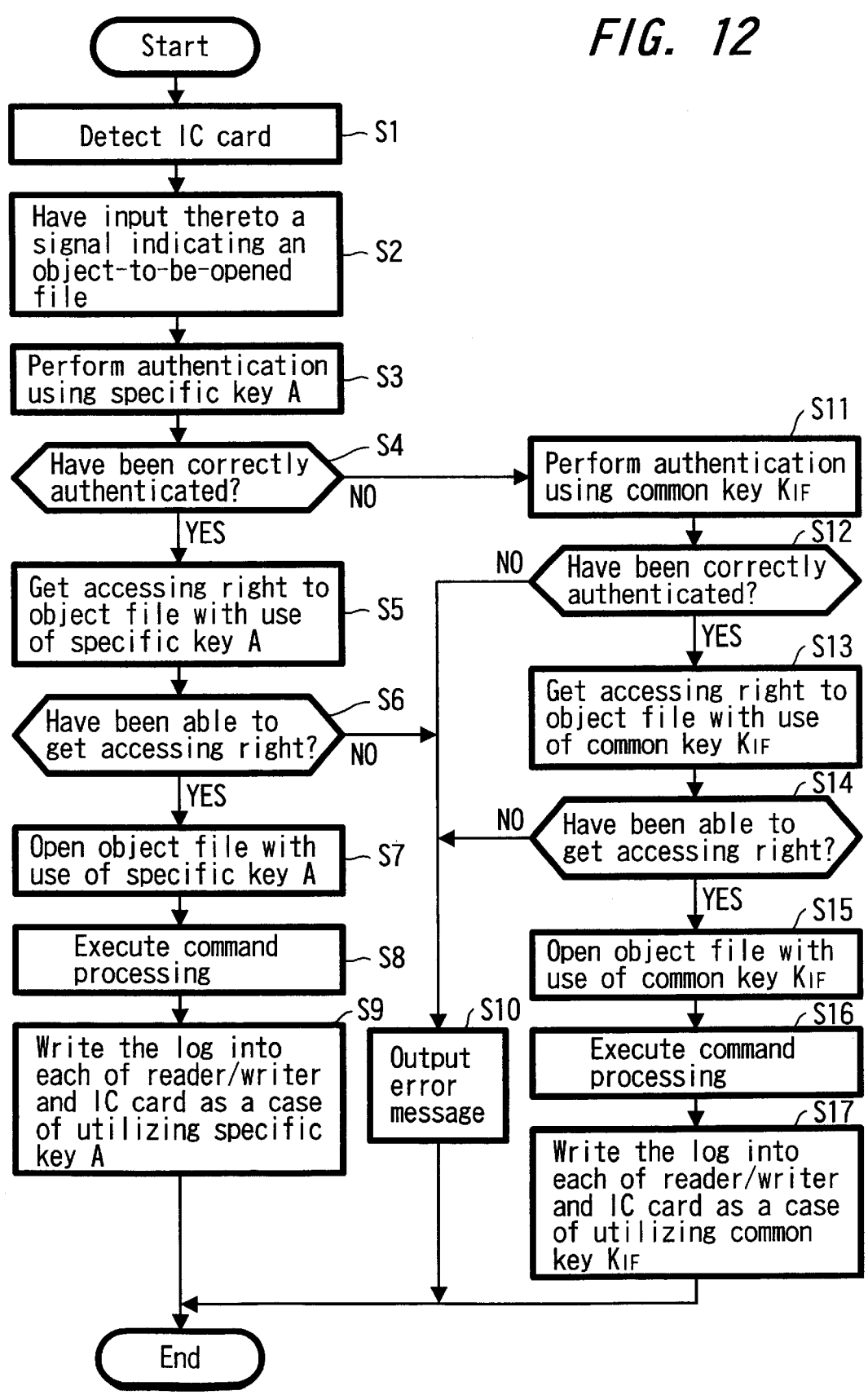
FIG. 12 is a flow chart illustrating the process of the terminal apparatus.

The DPU 31 of the reader/writer 1 of the terminal apparatus, in step S22 and in step S23, executes the same processes as in step S3 and step S4 of FIG. 12. When it is determined in step S23 that correct authentication has not been performed, the processing proceeds to step S29.

When it is determined in step S23 that correct authentication has been performed (namely, where the IC card 2 is one issued by the issuer A), the DPU 32 of the reader/writer 31 in step S24 produces a control signal (including the service code corresponding to the for-joint-use-operation, or commonly accessible, electronic value file) for gaining the right to access the for-joint-use-operation electronic value file recorded in the specific area of the EEPROM 66 of the IC card 2. It then transmits that control signal to the IC card 2 via the bus 35, SPU 32, modulator circuit 23, and antenna 27. It is to be noted that the real file of the for-joint-use-operation electronic value stored in the specific area of the EEPROM 66 of the IC card 2 is recorded in the common area, and that real file is linked to the for-joint-use-operation electronic value file recorded in the specific area. The SPU 32 receives the response signal from the IC card 2 via the antenna 27 and the demodulator circuit 25. Then, it inputs the corresponding response result to the DPU 31 via the bus 35.

In step S25, the DPU 31 of the reader/writer 1 determines, according to the response signal input in step S24 from the IC card 2, whether the terminal apparatus has the right to access the application corresponding to the addition processing of the amount of value with respect to the for-joint-use-operation electronic value file. When it is determined in step S25 that the terminal apparatus does not have the accessing right, the processing proceeds to step S29.

When it is determined in step S25 that the terminal apparatus has the accessing right, the DPU 31 of the reader/writer 1 in step S26 produces a control signal for opening the joint-use-operation electronic value file (real file) in the common area, which file is linked with and from the joint-use-operation electronic value file in the specific area in the EEPROM 66 of the IC card 2. Then the SPU 31 transmits that control signal to the IC card 2 together with the specific key A via the bus 35, SPU 32, modulator circuit 23, and antenna 27.

In step S27, the DPU 31 of the reader/writer 1 executes a filling process for filling the for-joint-use-operation electronic value, according to the filling amount of money the user has input using the input part 103 of the controller 3. Namely, the DPU 31 produces a control signal for adding the filling amount of money input from the controller 3 to the remainder of the for-joint-use-operation electronic value recorded in the for-joint-use-operation electronic value file and registered in the common area of the IC card 2. The DPU 31 then transmits that control signal to the IC card 2 via the bus 35, SPU 32, modulator circuit 23, and antenna 27.

The antenna 53 of the IC card 2 receives the ASK modulation signal corresponding to the control signal transmitted from the reader/writer 1 and supplies it to the interface part 61. Prescribed processes are executed in the interface part 61, BPSK demodulation part 62, and calculation part 64. Then, the control signal that has been transmitted from the reader/writer 1 is input to the sequencer 91. Then the sequencer 91, according to the control signal input thereto, changes the remainder of the for-joint-use-operation electronic value recorded in the EEPROM 66.

In step S28, the DPU 31 of the reader/writer 1 records the log of the process executed in step S27 into the RAM 42 of the memory 34 of the reader/writer 1 as a case of utilizing the specific key A. The DPU 31 also produces a control signal for recording the same log into the RAM 67 of the IC card 2, and transmits it to the IC card 2 via the bus 35, SPU 32, modulator circuit 23, and antenna 27. The antenna 53 of the IC card 2 receives the ASK modulation signal corresponding to the control signal transmitted from the reader/writer 1 and supplies it to the interface part 61. Thereby, in the interface part 61, BPSK demodulation part 62, and calculation part 64, a prescribed process is executed. The log of the process executed in step S27 is kept stored in the RAM 67, and the process is terminated.

When correct authentication has not been performed in step S23 or when it has been determined in step S25 that the accessing right to the relevant file (the accessing right for accessing the addition processing) is not permitted, in step S29 the same processing as in step S10 of FIG. 12 is executed, and the process is terminated.

Also, it may be arranged that the issuer A records into the specific area of the EEPROM 66 of the IC card 2 an application for providing as the service with respect to the user a service that supplies a service point that is utilizable only by the terminal apparatus the issuer A manages. For example, it may thereby be arranged that the service point corresponding to the amount of money for which an item of goods has been purchased, etc. can be supplied to the IC card 2 the corresponding user has. In this case, the control part 101 of the controller 3 calculates the adding amount of money corresponding to the for-specific-use-operation service point according to the utilized amount of money of the for-joint-use-operation electronic value the user has input using the input part 103 of the controller 3, etc. Then the control part 101 outputs the resulting adding amount of money to the reader/writer 1 via the internal bus 102 and the network interface 107.

Next, the for-specific-use-operation, or specific-accessible, service point write-in process that the terminal apparatus managed by the issuer A executes will be explained with reference to the flow chart of FIG. 14.

In step S41, the reader/writer 1 of the issuer A's managed terminal apparatus detects the IC card that has been mounted thereto. And, it has input thereto from the controller 3 the adding amount of money corresponding to the for-specific-use-operation service point. Thus, the object-to-be-opened file is the for-specific-use-operation service point file. The adding amount of money corresponding to the for-specific-use-operation service point is input to the DPU 31 via the SCC 33 and the bus 35.

The DPU 31 of the reader/writer 1 of the terminal apparatus, in step S42 and in step S43, executes the same processes as in step S3 and step S4 of FIG. 12. When it is determined in step S43 that correct authentication has not been performed, the processing proceeds to step S49.

When it is determined in step S43 that correct authentication has been performed (i.e., where the IC card 2 is the issuer A's issued IC card 2), in step S44 the DPU 31 of the reader/writer 1 produces a control signal for gaining the accessing right to the for-specific-use-operation, or specific-accessible, service point file recorded in the specific area of the EEPROM 66 of the IC card 2 (the control signal including the service code corresponding to the for-specific-use-operation service point file). It then transmits the control signal to the IC card 2 via the bus 35, SPU 32, modulator circuit 23, and antenna 27. The SPU 32 receives a response signal from the IC card 2 via the antenna 27 and the demodulator circuit 25 and inputs the response result to the DPU 31 via the bus 35.

In step S45, the DPU 31 of the reader/writer 1 determines, according to the response signal input in step S44 from the IC card 2, whether it has the right to access the addition processing with respect to the for-specific-use-operation service point. When it is determined in step S45 that it does not have the accessing right, the process proceeds to step S49.

When it is determined in step S45 that the accessing right has been given, in step S46 the DPU 31 of the reader/writer 1 produces a control signal for opening the for-joint-use-operation service point addition file that is disposed in the EEPROM 66 of the IC card 2. The DPU 31 transmits the control signal to the IC card 2 via the bus 35, SPU 32, modulator circuit 23, and antenna 27 jointly with the specific key A registered in the flash memory 22.

In step S47, the DPU 31 of the reader/writer 1 acts or operates on the adding amount of money corresponding to the for-specific-use-operation service point that has been input from the controller 3 in step S41. The DPU 31 according to that adding amount of money executes the addition processing corresponding to the for-specific-use-operation service point. Namely, the DPU 31 produces a control signal for adding the adding amount of money corresponding to the for-specific-use-operation service point to the for-specific-use-operation service point remainder that is recorded in the for-specific-use-operation service point file registered in the specific area of the IC card 2. The DPU 31 then transmits the control signal to the IC card 2 via the bus 35, SPU 32, modulator circuit 23, and antenna 27.

The antenna 53 of the IC card 2 receives the ASK modulated signal corresponding to the control signal transmitted from the reader/writer 1 and supplies it to the interface part 61. Prescribed processes are executed in the interface part 61, BPSK demodulation part 62, and calculation part 64. Then, the control signal that has been transmitted from the reader/writer 1 is input to the sequencer 91. Then the sequencer 91 according to the control signal input thereto changes the remainder of the for-joint-use-operation electronic value recorded in the EEPROM 66.

In step S48, the DPU 31 of the reader/writer 1 records the log of the process executed in step S47 into the RAM 42 of the memory 34 of the reader/writer 1 as a case of utilizing the specific key A. The DPU 31 also produces a control signal for recording the same log into the RAM 67 of the IC card 2, and transmits it to the IC card 2 via the bus 35, SPU 32, modulator circuit 23, and antenna 27. The antenna 53 of the IC card 2 receives the ASK modulated signal corresponding to the control signal transmitted from the reader/writer 1 and supplies it to the interface part 61. Thereby, in the interface part 61, BPSK demodulation part 62, and calculation part 64, a prescribed process is executed. The log of the process executed in step S47 is kept stored in the RAM 67, and the process is terminated.

When correct authentication has not been performed in step S43 or when it has been determined in step S45 that the accessing right to the relevant file (the accessing right for accessing the addition processing) is not permitted, in step S49 the same process as in step S10 of FIG. 12 is executed, and the processing is terminated.

Figure 13:
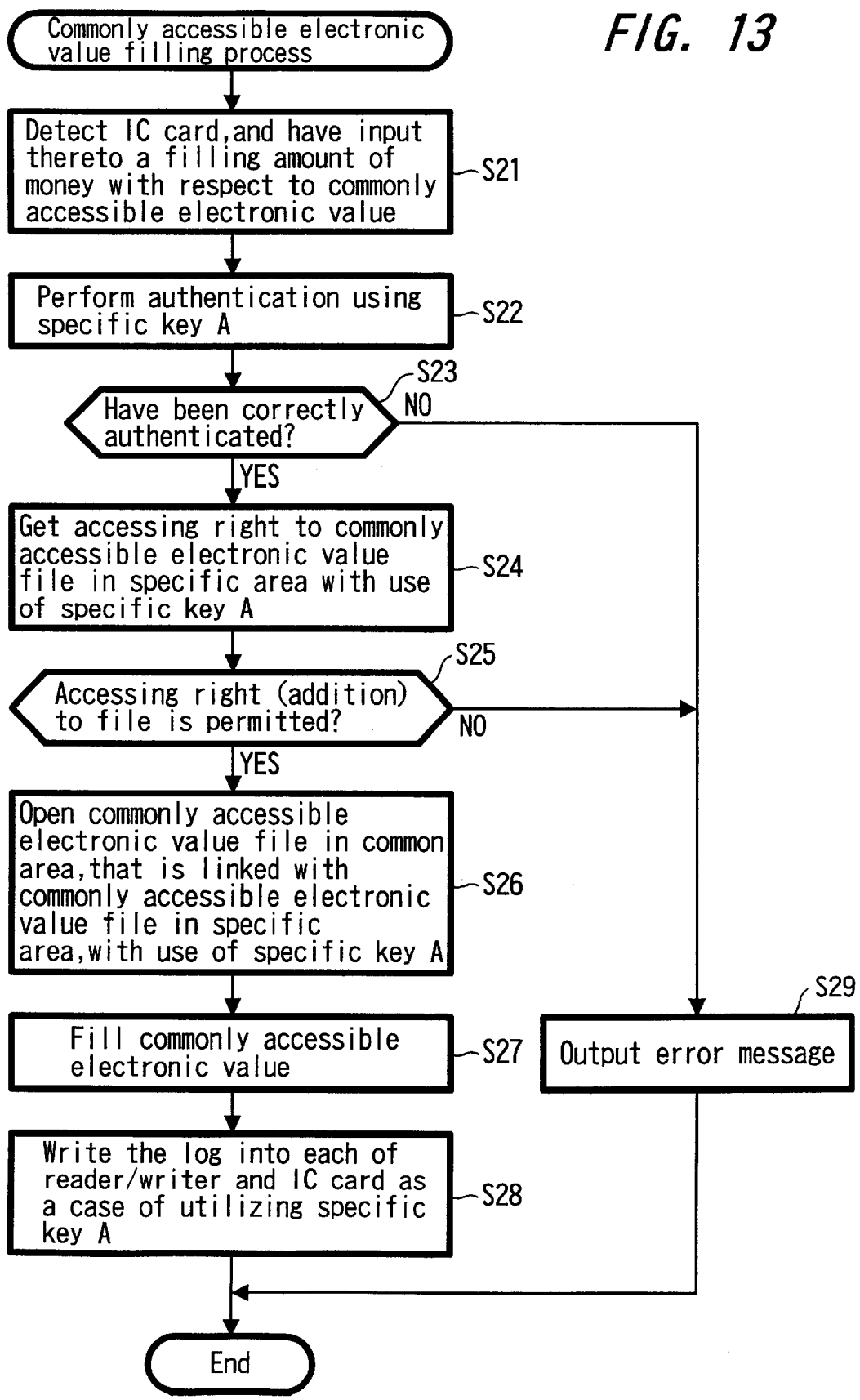
FIG. 13 is a flow chart illustrating a commonly accessible electronic value filling process.
Figure 14:
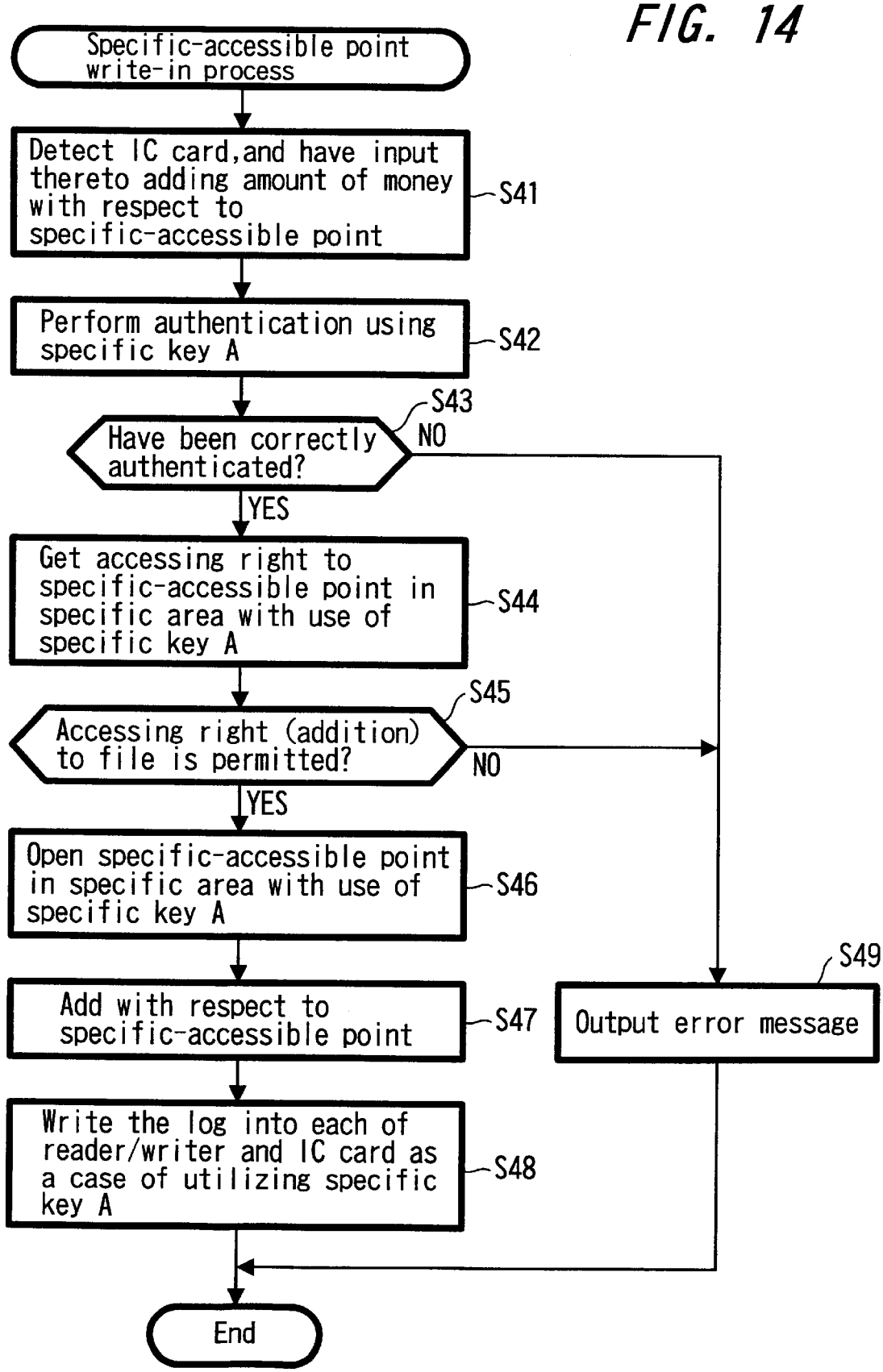
FIG. 14 is a flow chart illustrating a specific-accessible service point write-in process.

For example, it may be arranged that the issuer A of the IC card 2 can provide through the use of the issuer A's managed terminal apparatus the service of adding the for-specific-use-operation service point explained using the flow chart of FIG. 14 at the time of the filling with respect to the for-joint-use-operation electronic value explained using the flow chart of FIG. 13. In this case, the control part 101 of the controller 3 operates on the filling amount of money with respect to the for-joint-use-operation electronic value that the user has input using the input part 103 of the controller 3. The control part 101 according to that filling amount calculates the adding amount corresponding to the for-specific-use-operation service point, for example, using a prescribed calculation method of calculating 5% of that filling amount. The control part 101 thereby outputs it to the reader/writer 1 via the internal bus 102, and network interface 107.

The write-in process for the for-joint-use-operation electronic value and for-specific-use-operation service point will now be explained with reference to the flow chart of FIG. 15.

In step S61, the reader/writer 1 of the terminal apparatus detects the IC card 2 that is mounted thereto. It then has input thereto from the controller 3 the filling amount of the for-joint-use-operation electronic value and the adding amount corresponding to the for-specific-use-operation service point determined correspondingly to that filling amount, that the user has input using the input part 103 of the controller 3. Namely, the object-to-be-opened file is the for-joint-use-operation electronic value file and the for-specific-use-operation service point file. And the filling amount of the for-joint-use-operation electronic value and the adding amount corresponding to the for-specific-use-operation service point are input to the DPU 31 via the SCC 33 and the bus 35.

The DPU 31 of the reader/writer 1 of the terminal apparatus, in step S62 and in step S63, executes the same processes as in step S3 and step S4 of FIG. 12. When it is determined in step S63 that correct authentication has not been performed, the processing proceeds to step S69.

When it is determined in step S63 that correct authentication has been performed (i.e., where the IC card 2 is the issuer A's issued IC card 2), in step S64 the DPU 31 of the reader/writer 1 produces a control signal for gaining the accessing right for the for-common-use-operation electronic value file and for-specific-use-operation service point file recorded in the specific area of the EEPROM 66 of the IC card 2. (The control signal including the service code corresponding to the for-common-use-operation electronic value file and for-specific-use-operation service point file). It then transmits the control signal to the IC card 2 via the bus 35, SPU 32, modulator circuit 23, and antenna 27.

It is to be noted that the real file of the for-joint-use-operation electronic value file stored in the specific area of the EEPROM 66 of the IC card 2 is recorded in the common area. And that real file is linked with the for-joint-use-operation electronic value file recorded in the specific area. Also, the for-specific-use-operation service point file stored in the specific area of the EEPROM 66 of the IC card 2 is the application stored only in the specific area. The SPU 32 receives a response signal from the IC card 2 via the antenna 27 and the demodulator circuit 25, and inputs the response result thereof to the DPU 31 via the bus 35.

In step S65, the DPU 31 of the reader/writer 1 determines, according to the response signal input in step S64 from the IC card 2, whether it has the right to access the addition processing for the amount of value the addition of which is performed using the for-joint-use-operation electronic value file and the right to access the addition processing that is executed using the for-joint-use-operation service point file. When it is determined in step S65 that it does not have the accessing right, the processing proceeds to step S69.

When it is determined in step S65 that the accessing right has been given, in step S66 the DPU 31 of the reader/writer 1 produces a control signal according to the following indication signals. These indication signals respectively indicate the filling amount of for-joint-use-operation electronic value and the adding amount of for-specific-use-operation service point, each of which has been input in step S61. The control signal is for opening the for-joint-use-operation electronic value file (i.e., real file) linked with the for-joint-use-operation electronic value file in the specific area disposed in the EEPROM 66 of the IC card 2 and the for-specific-use-operation service point file in the specific area. The DPU 31 transmits that control signal to the IC card 2 via the bus 35, SPU 32, modulator circuit 23, and antenna 27 jointly with the specific key A.

In step S67, the DPU 31 of the reader/writer 1 operates on the filling amount that is added to the for-joint-use-operation electronic value and has been input in step S61. The DPU 31 according to that filling amount that is added to the for-joint-use-operation electronic value executes the filling process with respect to the for-joint-use-operation electronic value and the addition process corresponding to the for-specific-use-operation service point. That is, the DPU 31 produces the following control signals. One control signal is for adding the filling amount for the for-joint-use-operation electronic value input from the controller to the remainder of the for-joint-use-operation electronic value recorded in the for-joint-use-operation electronic value file registered in the common area of the IC card 2. The other control signal is for adding the adding amount corresponding to the for-specific-use-operation service point input from the controller 3 to the remainder of the for-specific-use-operation service point recorded in the for-specific-use-operation service point file registered in the specific area. The DPU 31 then transmits these control signals to the IC card 2 via the bus 35, SPU 32, modulator circuit 23, and antenna 27.

The antenna 53 of the IC card 2 receives the ASK modulated signals corresponding to the control signals transmitted from the reader/writer 1 and supplies them to the interface part 61. Prescribed processes are thereby executed in the interface part 61, BPSK demodulation part 62, and calculation part 64. Then, the control signals that have been transmitted from the reader/writer 1 are input to the sequencer 91. Then the sequencer 91, according to the control signals input thereto, changes the remainders of the for-joint-use-operation electronic value and for-specific-use-operation service point recorded in the EEPROM 66.

In step S68, the DPU 31 of the reader/writer 1 records the log of the process executed in step S67 into the RAM 42 of the memory 34 of the reader/writer 1 as a case of utilizing the specific key A. The DPU 31 also produces a control signal for recording the same log into the RAM 67 of the IC card 2, and transmits it to the IC card 2 via the bus 35, SPU 32, modulator circuit 23, and antenna 27. The antenna 53 of the IC card 2 receives the ASK modulated signal corresponding to the control signal transmitted from the reader/writer 1 and supplies it to the interface part 61. Thereby, in the interface part 61, BPSK demodulation part 62, and calculation part 64, a prescribed process is executed. The log of the process executed in step S67 is kept stored in the RAM 67, and the processing is terminated.

In case correct authentication has not been performed in step S63 or in case it has been determined in step S65 that the accessing right to the relevant file (the accessing right for accessing the addition processing) is not permitted, in step S69 the same process as in step S10 of FIG. 12 is executed, and the processing is terminated.

Figure 16:
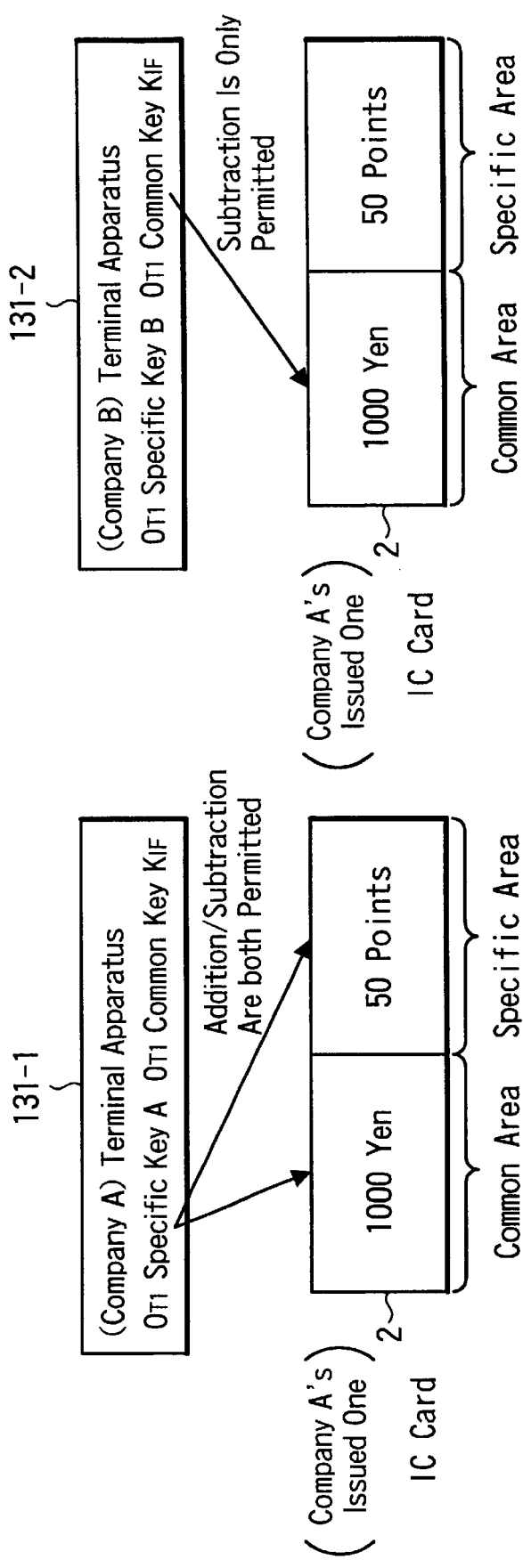
FIG. 16 is a view illustrating the accessing right to the applications in the specific and the common area that is imparted to a co-operator that cooperates with the IC card's issuer.

Next, with reference to FIG. 16, there will be explained the right to access the application for executing processes on the for-joint-use-operation electronic value and for-specific-use-operation service point.

For example, assume that a for-joint-use-operation electronic value of 1000 yen is registered in the common area of the company A's issued IC card 2 and that a for-specific-use-operation service point of 50 points (corresponding to 50 yen) is registered in the specific area. In this case, regarding the for-joint-use-operation electronic value and for-specific-use-operation service point that are registered in the enterprise A's issued IC card 2, using the specific key A registered in the company A's terminal apparatus 131-1, it is possible to access the application for executing each of the addition processing and subtraction processing concerned therewith. (In case in the company A's terminal apparatus 131-1 access is had to the application concerned with the for-joint-use-operation electronic value by the use of the registered specific key A, in actuality access is had to the application concerned with the for-joint-use-operation electronic value in the common area, by way of the linked portion in the specific area.)

However, in the cooperating company B's terminal apparatus 131-2, it is certainly possible to access the application for executing the subtraction processing with respect to the for-joint-use-operation electronic value by using the common key $K_{IF}$ registered therein. However, that terminal apparatus does not have the right to access the application for executing the addition processing with respect to the for-joint-use-operation electronic value and the application for executing the processing with respect to the for-specific-use-operation service point registered in the specific area. That is to say, assume that the user has paid 200 yen by using the enterprise A's managed terminal apparatus 131-1. In this case, it results that the user pays 200 yen from the 1050 yen that is obtained by adding up the two service blocks. But, in case the user has paid 200 yen through the use of the company B's managed terminal apparatus 131-2, it results that the user pays 200 yen from the 1000 yen in the common area.

Figure 17:
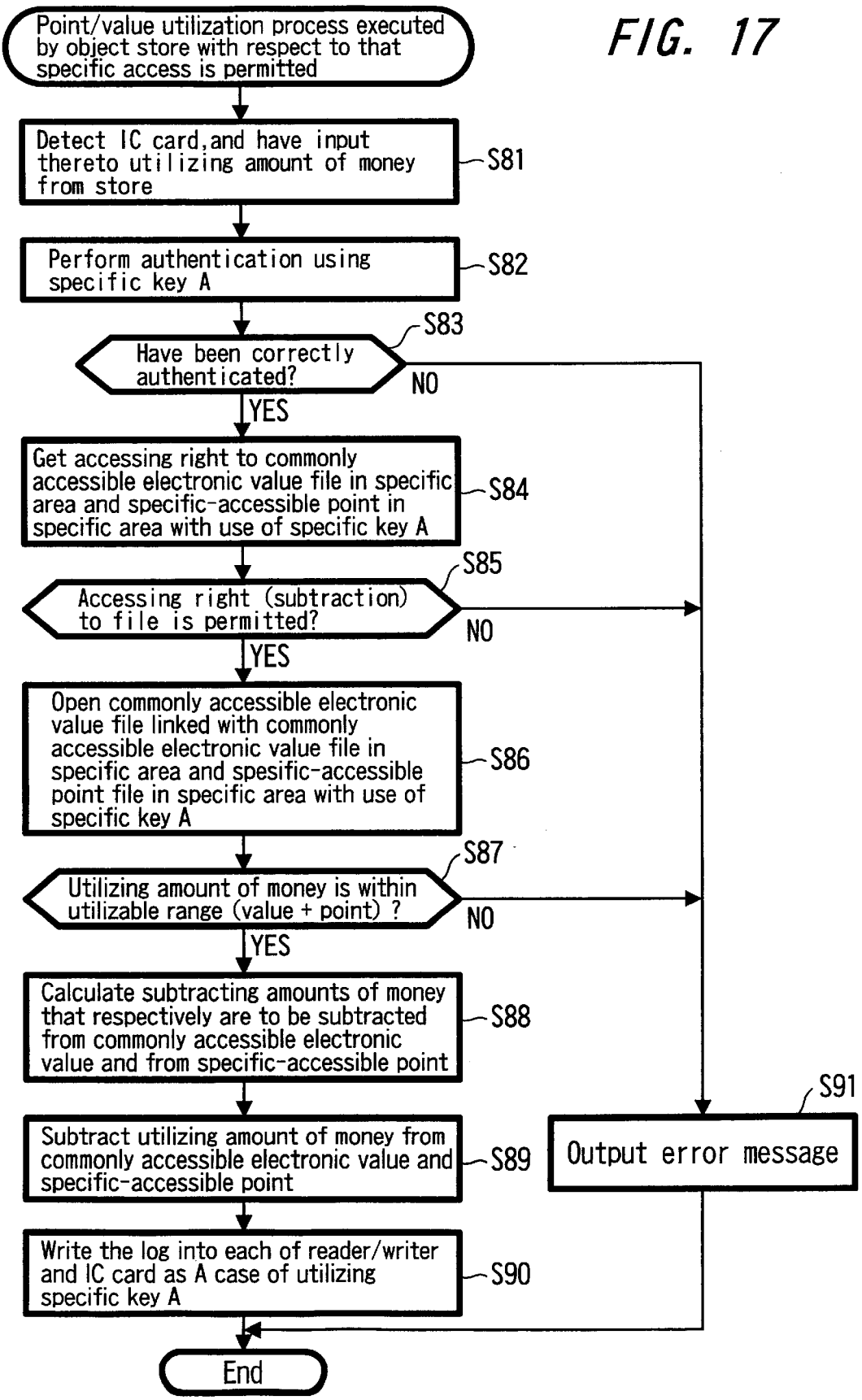
FIG. 17 is a flow chart illustrating a point/value utilization process that is executed by an object store with respect to which specific access is permitted.

Next, there will be explained with reference to the flow chart of FIG. 17 the point/value utilization process in the case where the company A's issued IC card 2 has been used in an object store with respect to which the specific-use-operation of the IC card 2 is permitted. (This object store, for example, is one equipped with the company A's managed terminal apparatus 131-1 in FIG. 16.)

In step S81, the reader/writer 1 of the terminal apparatus detects the IC card 2 that has been mounted thereto. Then the reader/writer 1 has input thereto the amount of money that the store has utilized and that the user has input from the controller 3 by the use of the input part 103 thereof. Namely, the object-to-be-opened file is the for-joint-use-operation electronic value file and for-specific-use-operation service point file, each of which can be utilized for purchasing an item of goods in the object store with respect to which the specific-use-operation of the IC card 2 is permitted. And the user's utilizing amount of money, i.e., a sum total of the subtracting amount of money corresponding to the for-joint-use-operation electronic value and the subtracting amount of money corresponding to the for-specific-use-operation service point is input to the DPU 31 via the SCC 33 and bus 35.

The DPU 31 of the reader/writer 1 of the terminal apparatus, in step S82 and in step S83, executes the same processes as in step S3 and step S4 of FIG. 12. When it is determined in step S83 that correct authentication has not been performed, the processing proceeds to step S91.

Figure 15:
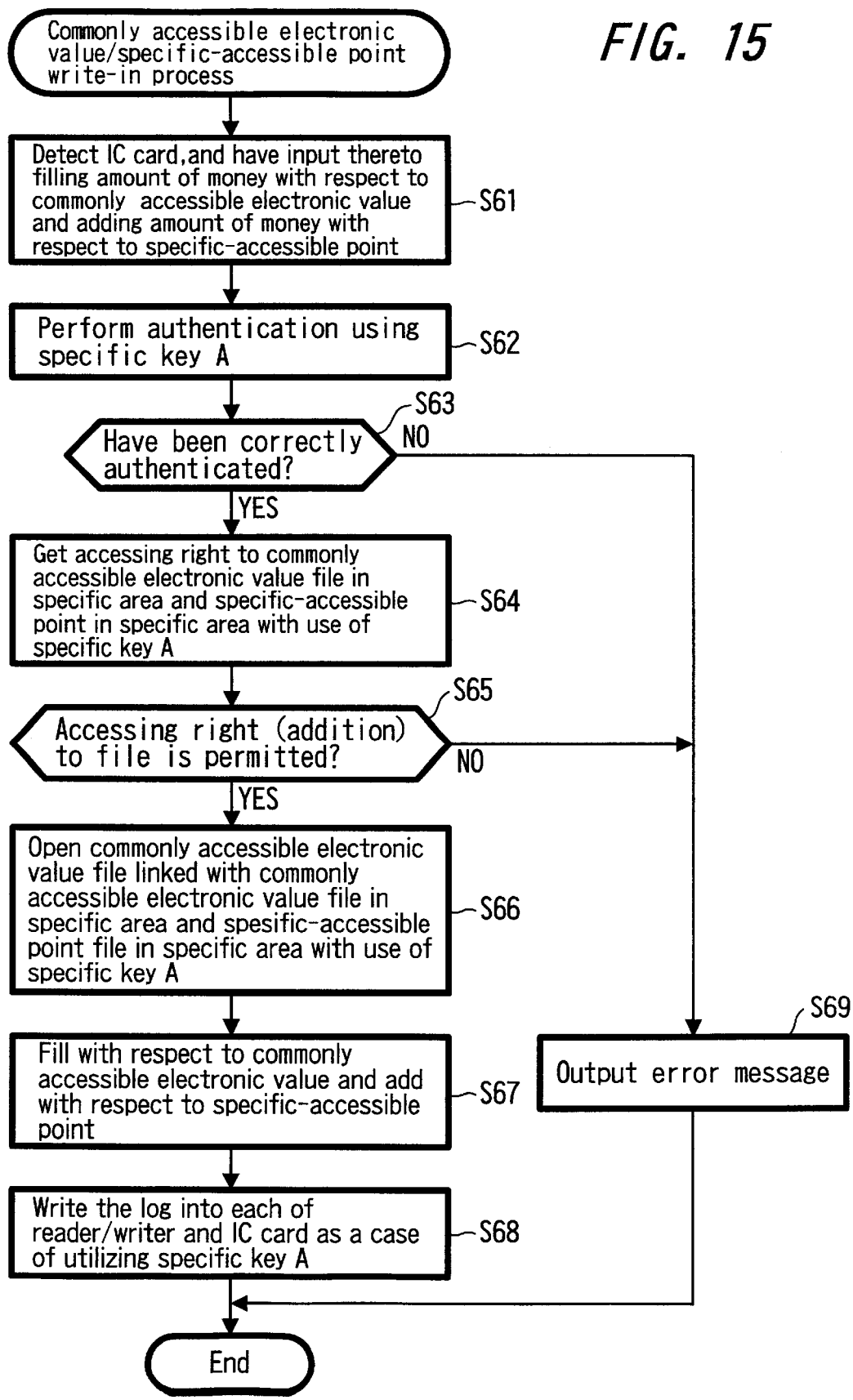
FIG. 15 is a flow chart illustrating the commonly accessible electronic value and specific-accessible service point write-in process.

When it is determined in step S83 that correct authentication has been performed (i.e., where the IC card 2 is the issuer A's issued IC card 2), in step S84 the same process as in step S64 of FIG. 15 is executed.

In step S85, the DPU 31 of the reader/writer 1 determines, according to the signal input in step S84 from the IC card 2, whether it has the right to access the subtraction processing for the amount of value the subtraction of which is performed using the for-joint-use-operation electronic value file and the right to access the subtraction processing that is executed using the for-joint-use-operation service point file. When it is determined in step S85 that it does not have the accessing right, the processing proceeds to step S91.

When it is determined in step S85 that the accessing right has been given, in step S86 the DPU 31 of the reader/writer 1 produces a control signal for opening the for-joint-use-operation electronic value file (i.e., real file) in the common area linked with the for-joint-use-operation electronic value file in the specific area disposed in the EEPROM 66 of the IC card 2 and the for-specific-use-operation service point file in the specific area. The DPU 31 transmits that control signal to the IC card 2 via the bus 35, SPU 32, modulator circuit 23, and antenna 27 jointly with the specific key A.

In step S87, the DPU 31 of the reader/writer 1 reads in from the for-joint-use-operation electronic value file (i.e., real file) in the common area and the for-specific-use-operation service point file in the specific area, which have been opened in step S86, the following amounts of money. Namely, the amount of money corresponding to the for-joint-use-operation electronic value and the amount of money corresponding to the for-specific-use-operation service point. The DPU 31 thereby calculates a utilizable range of the amounts of money (i.e., a sum of the amount of money corresponding to the for-joint-use-operation electronic value and the amount of money corresponding to the for-specific-use-operation service point.). Thereby, the DPU 31 according to the signal indicating the user's utilizing amount of money determines whether his utilizing amount of money is within the utilizable range input in the step S81. When it is determined in step S87 that his utilizing amount of money is not within the utilizable range, the processing proceeds to step S91.

When it is determined in step S87 that the utilizing amount of money is within the utilizable range, in step S88 the DPU 31 of the reader/writer 1 calculates the subtracting amount of money to be subtracted from each of the for-joint-use-operation electronic value and the for-specific-use-operation service point, according to the user's utilizing amount of money that has been input in step S81. In calculating that subtracting amount of money, there may be adopted the following methods. Namely, it may be arranged to preferentially perform the subtraction from the for-specific-use-operation service point. Or it may be arranged that the subtraction ratio between the for-joint-use-operation electronic value and the for-specific-use-operation service point be able to be set through the user's operation.

In step S89, the DPU 31 of the reader/writer 1 executes the subtraction process for the for-joint-use-operation electronic value and that for the for-specific-use-operation service point. That is, the DPU 31 produces a control signal for subtracting the utilizing amount of money corresponding to the for-joint-use-operation electronic value and the utilizing amount of money for the for-specific-use-operation service point, each of which has been calculated in step S88, from the following remainders. Namely, one remainder is for the for-joint-use-operation electronic value recorded in the for-joint-use-operation electronic value file that is registered in the common area of the IC card 2. The other remainder is for the by-specific-use-operation service point recorded in the for-specific-use-operation service point file that is registered in the specific area. The DPU 31 thereby transmits that control signal to the IC card 2 via the bus 35, SPU 32, modulator circuit 23, and antenna 27.

The antenna 53 of the IC card 2 receives the ASK modulated signal corresponding to the control signal transmitted from the reader/writer 1 and supplies it to the interface part 61. Prescribed processes are thereby executed in the interface part 61, BPSK demodulation part 62, and calculation part 64. Then, the control signal that has been transmitted from the reader/writer 1 is input to the sequencer 91. Then the sequencer 91, according to the control signal input thereto, changes the remainders of the for-joint-use-operation electronic value and for-specific-use-operation service point recorded in the EEPROM 66.

In step S90, the DPU 31 of the reader/writer 1 records the log of the process executed in step S89 into the RAM 42 of the memory 34 of the reader/writer 1 as a case of utilizing the specific key A. The DPU 31 also produces a control signal for recording the same log into the RAM 67 of the IC card 2, and transmits it to the IC card 2 via the bus 35, SPU 32, modulator circuit 23, and antenna 27. The antenna 53 of the IC card 2 receives the ASK modulated signal corresponding to the control signal transmitted from the reader/writer 1 and supplies it to the interface part 61. Thereby, in the interface part 61, BPSK demodulation part 62, and calculation part 64, a prescribed process is executed. The log of the process executed in step S89 is kept stored in the RAM 67, and the processing is terminated.

In case correct authentication has not been performed in step S83 or in case it has been determined in step S85 that the accessing right to the relevant file (the accessing right for accessing the subtraction processing) is not permitted, or it has been determined in step S87 that the utilizing amount of money is not within the utilizable range, in step S91 the same process as in step S10 of FIG. 12 is executed, and the processing is terminated.

Figure 18:
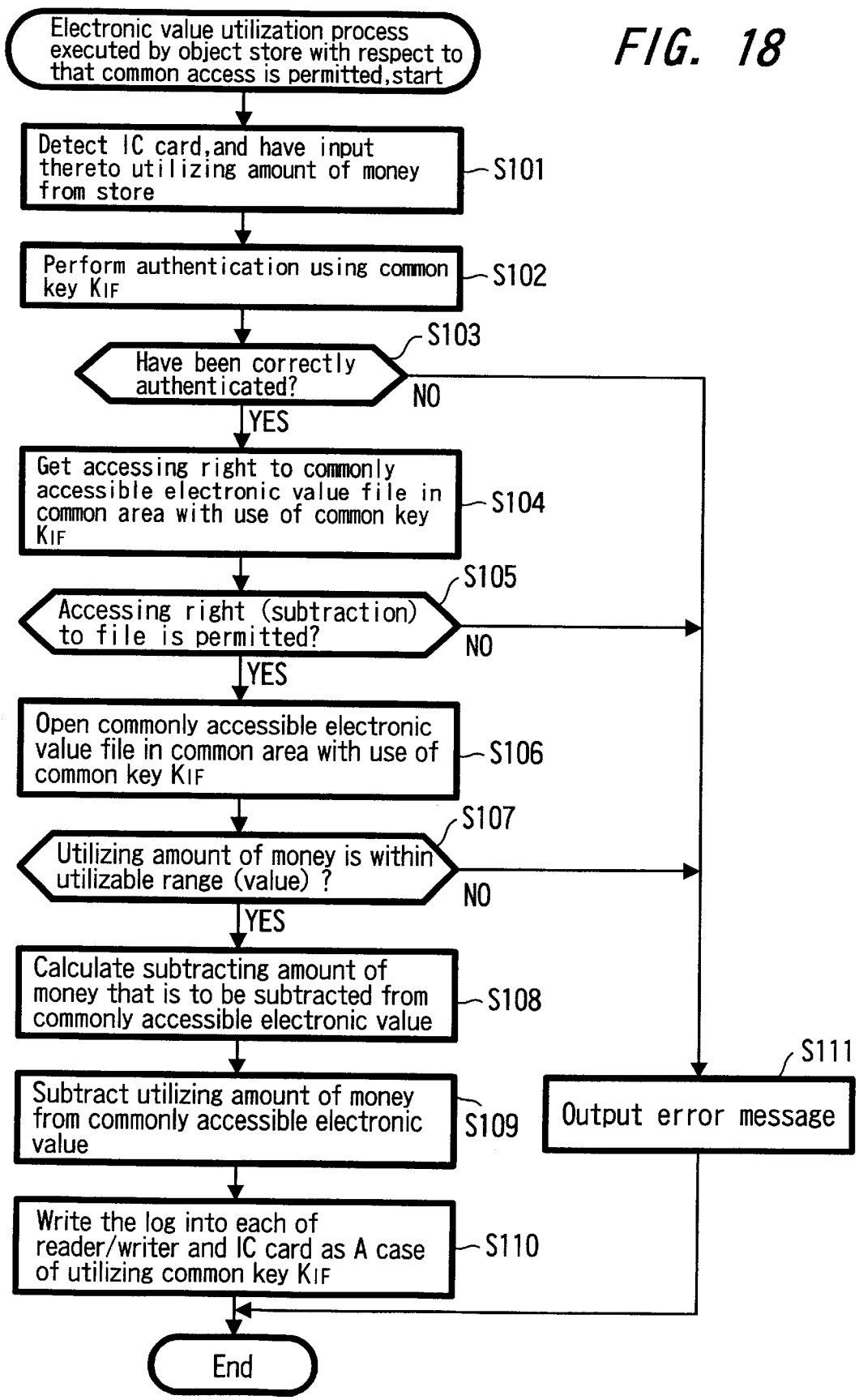
FIG. 18 is a flow chart illustrating an electronic value utilization process that is executed by an object store with respect to which common access is permitted.

Next, there will be explained with reference to the flow chart of FIG. 18 the electronic value utilization process that is executed by an object store with respect to which the joint use operation is permitted. (That store is one equipped with the terminal apparatus 131-2 that is managed by, for example, the company B in FIG. 16 that is other than the issuer of the IC card 2).

In step S101, the reader/writer 1 of the terminal apparatus detects the IC card 2 that has been mounted thereto. Then, the reader/writer 1 has input thereto from the controller 3 the utilizing amount in the store the user has input using the input part 103 of the controller 3. Namely, the object-to-be-opened file is a for-joint-use-operation electronic value file that can be utilized for purchasing an item of goods in the object store with respect to which the joint use operation is permitted. And the user's utilizing amount of money, i.e., the subtracting amount of money with respect to the for-joint-use-operation electronic value is input to the DPU 31 via the SCC 33 and the bus 35.

The DPU 31 of the reader/writer 1 of the terminal apparatus, in step S102 and in step S103, executes the same processes as in step S11 and step S12 of FIG. 12. When it is determined in step S103 that correct authentication has not been performed, the processing proceeds to step S111.

When it is determined in step S103 that correct authentication has been performed (namely, where the IC card is one that is able to be authenticated using the common key $K_{IF}$), the DPU 31 of the reader/writer 1 in step S104 produces a control signal which includes the service code corresponding to the for-joint-use-operation electronic value file. That control signal is for gaining the right to access the for-joint-use-operation electronic value file and the for-joint-use-operation service point file recorded in the specific area of the EEPROM 66 of the IC card 2. The DPU 31 then transmits that control signal to the IC card 2 via the bus 35, SPU 32, modulator circuit 23, and antenna 27.

In step S105, the DPU 31 of the reader/writer 1 determines, according to the signal input in step S104 from the IC card 2, whether the terminal apparatus has the right to access the application corresponding to the subtraction processing for subtracting the amount of value with respect to the for-joint-use-operation electronic value file. When it is determined in step S105 that the terminal apparatus does not have the accessing right, the processing proceeds to step S111.

When it is determined in step S105 that the accessing right has been given, the DPU 31 of the reader/writer 1 in step S106 produces a control signal for opening the for-joint-use-operation electronic value file in the common area, which file is disposed in the EEPROM of the IC card 2. Then the DPU 31 transmits that control signal to the IC card 2 together with the common key $K_{IF}$ via the bus 35, SPU 32, modulator circuit 23, and antenna 27. The SPU 32 receives a response signal from the IC card 2 via the antenna 27 and demodulator circuit 25, and inputs the response signal to the DPU 31 via the bus 35.

In step S107, the DPU 31 of the reader/writer 1 reads in the for-joint-use-operation electronic value remainder from the for-joint-use-operation electronic value file in the common area that has been opened in step S106. Thereby, the DPU 31, according to the signal indicating the user's utilizing amount of money, determines whether his utilizing amount of money is within the utilizable range (the range defined by the for-joint-use-operation electronic value remainder). When it is determined in step S107 that his utilizing amount of money is not within the utilizable range, the processing proceeds to step S111.

When it is determined in step S107 that the utilizing amount of money is within the utilizable range, in step S108 the DPU 31 of the reader/writer 1 calculates the subtracting amount of money with respect to the for-joint-use-operation electronic value according to the user's utilizing amount of money that has been input in step S101.

In step S109, the DPU 31 of the reader/writer 1 executes the subtraction process for the for-joint-use-operation electronic value. That is, the DPU 31 produces a control signal for subtracting the utilizing amount of money corresponding to the for-joint-use-operation electronic value that has been calculated in step S108, from the remainder of the for-joint-use-operation electronic value recorded in the for-joint-use-operation electronic value file that is registered in the common area of the IC card 2. The DPU 31 transmits that control signal to the IC card 2 via the bus 35, SPU 32, modulator circuit 23, and antenna 27.

The antenna 53 of the IC card 2 receives the ASK modulated signal corresponding to the control signal transmitted from the reader/writer 1 and supplies it to the interface part 61. Prescribed processes are thereby executed in the interface part 61, BPSK demodulation part 62, and calculation part 64. Then, the control signal that has been transmitted from the reader/writer 1 is input to the sequencer 91. Then the sequencer 91, according to the control signal input thereto, changes the remainder of the for-joint-use-operation electronic value recorded in the EEPROM 66.

In step S110, the DPU 31 of the reader/writer 1 records the log of the process executed in step S109 into the RAM 42 of the memory 34 of the reader/writer 1 as a case of utilizing the common key $K_{IF}$. The DPU 31 also produces a control signal for recording the same log into the RAM 67 of the IC card 2, and transmits the control signal to the IC card 2 via the bus 35, SPU 32, modulator circuit 23, and antenna 27. The antenna 53 of the IC card 2 receives the ASK modulated signal corresponding to the control signal transmitted from the reader/writer 1 and supplies it to the interface part 61. Thereby, in the interface part 61, BPSK demodulation part 62, and calculation part 64, a prescribed process is executed. The log of the process executed in step S109 is kept stored in the RAM 67, and the processing is terminated.

In case correct authentication has not been performed in step S103 or in case it has been determined in step S105 that the accessing right to the relevant file (the accessing right for accessing the subtraction processing) is not permitted, or it has been determined in step S107 that the utilizing amount of money is not within the utilizable range, in step S111 the same process as in step S10 of FIG. 12 is executed, and the processing is terminated.

In each of the processes that have been explained with reference to the flow charts of FIGS. 17 and 18, the log of the utilization is recorded by being classified in units of a key that is used. As a result of this, the settlement corresponding to the utilization (local utilization) of the IC card 2 based on the use of the specific key can be performed within a relevant company's system.

Figure 19B:
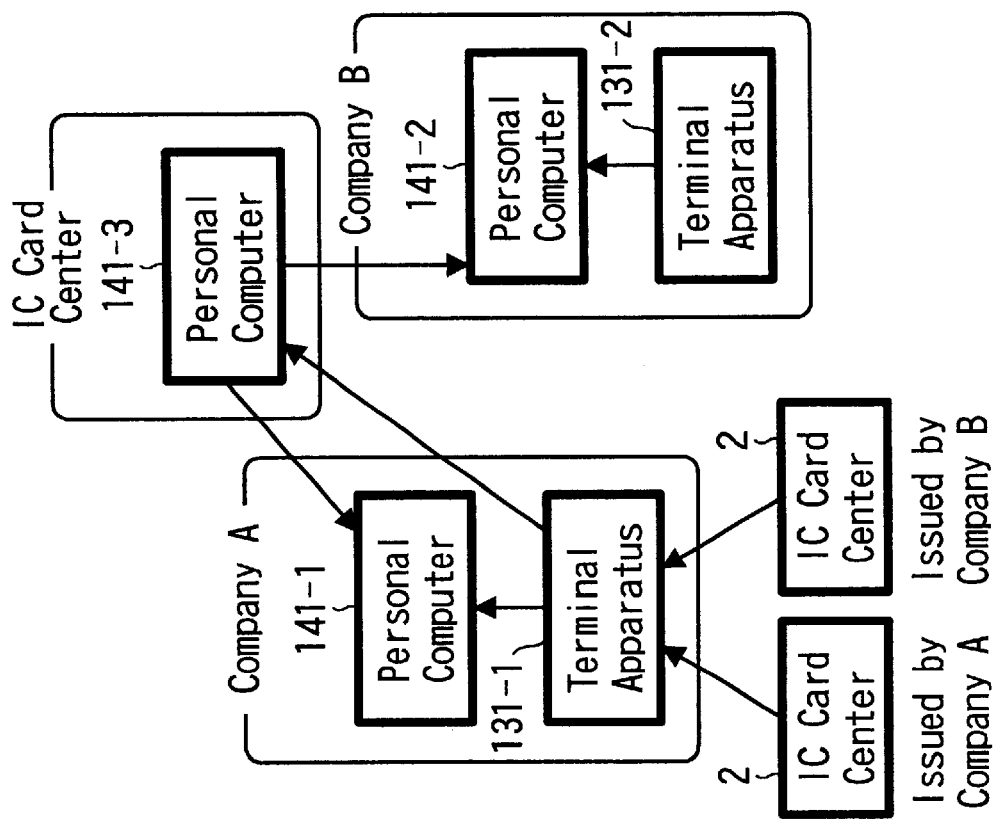
FIGS. 19A and 19B are views each illustrating the IC card issuer, the co-operator, and an IC card center.
Figure 19A:
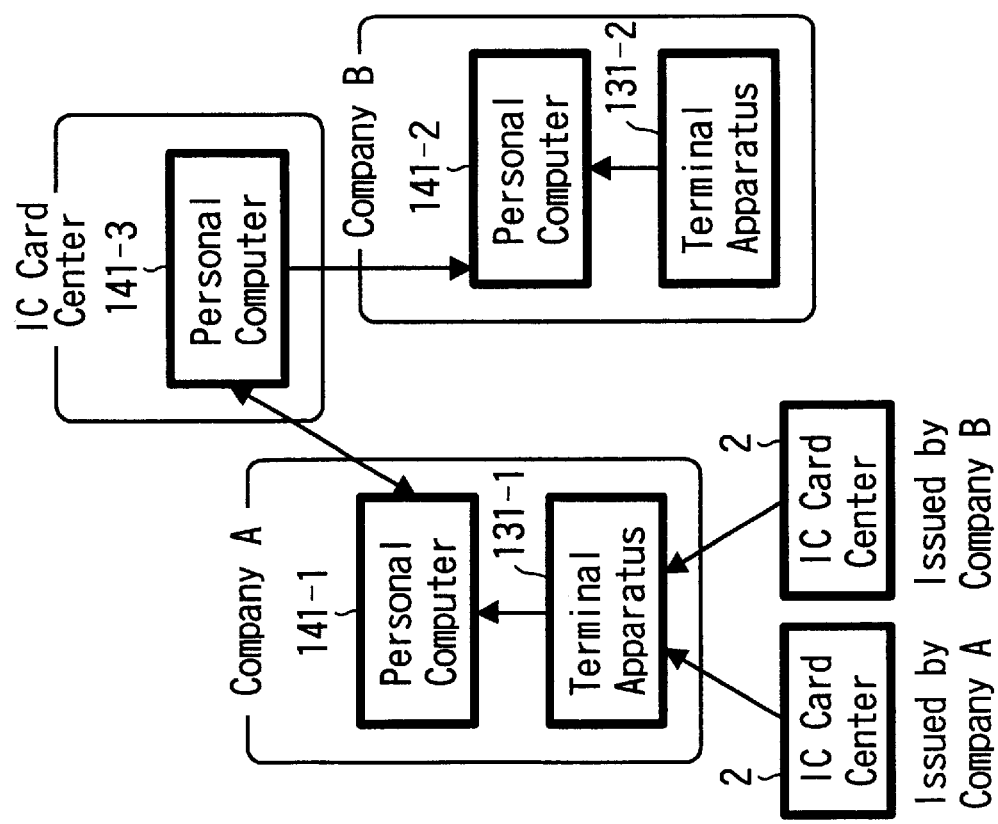

It may be arranged that, in order to execute the settlement process corresponding to joint utilization, the log of the utilization in the case where the IC card 2 has been utilized using the common key $K_{IF}$ is gathered at the above-described IC card center. It may thereby be arranged that the settlement process corresponding to joint utilization is executed by the IC card center. It may thereby be arranged that the settlement information indicating the result of the settlement process is transmitted to each of the respective cooperating managers. Assume now that a company A is the issuer of the IC card 2 and that a company B is a company with which company A cooperates. Then, there are, for example, the following two recovery methods for recovering the log of the utilization corresponding to the utilization of the common key $K_{IF}$. One recovery method is that, as illustrated in FIG. 19A, the company A's terminal apparatus 131-1 supplies the whole utilization log to the company A's managed personal computer 141-1. And, of the whole utilization log that has been input, the personal computer 141-1 transmits the log, in the case where the IC card has been utilized using the common key $K_{IF}$, to a personal computer 141-3 of the IC card center. The other recovery method is that, as illustrated in FIG. 19B, the company A's terminal apparatus 131-1 transmits the log, in the case where the IC card has been utilized using the common key $K_{IF}$, directly to the personal computer 141-3 of the IC card center.

The personal computer 141-3 of the IC card center has input thereto the log in the case where the IC card 2 has been utilized using the common key $K_{IF}$. The personal computer 141-3 thereby executes the settlement process corresponding to the joint utilization. The personal computer 141-3 thereby supplies the settlement information, which is the result of the executed settlement process, to the personal computer 141-1 of the company A, which is the issuer of the IC card 2, and the personal computer 141-2 of the company B, which is the company with which the company A cooperates.

Figure 20:
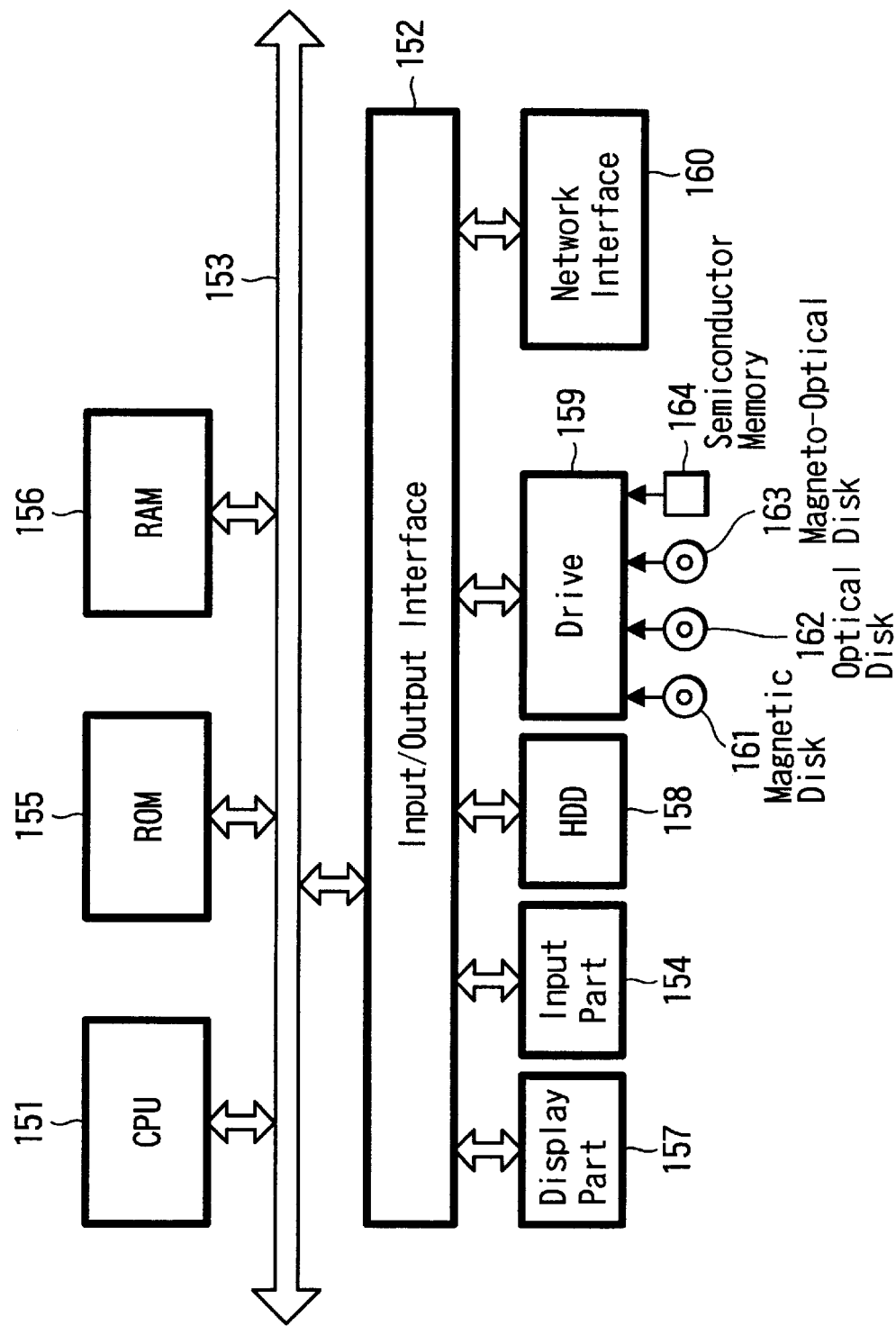
FIG. 20 is a block diagram illustrating the construction of the personal computer of FIG. 19.

FIG. 20 is a block diagram illustrating the construction of the personal computer 141-1. It is to be noted that the construction of the personal computers 141-2 and 141-3 is the same as that of the personal computer 141-1. Therefore, an explanation of that construction will be omitted.

The CPU 151 has input thereto signals that correspond to various kinds of instructions the user has input using the input part 154, by way of an input/output interface 152 and an internal bus 153. The CPU 151 also has input thereto a control signal that the other personal computers, etc. have transmitted, by way of the network interface 160. The CPU 151 thereby executes various kinds of processes that are based on the use of the signals that have been input thereto. The ROM 155 has stored therein basically fixed data of the programs and calculation parameters the CPU 151 uses. The RAM 156 has stored therein the programs the CPU 151 uses in its operation and the parameters that suitably vary during the operation of the CPU 151. The CPU 151, ROM 155, and RAM 156 are connected to one another by means of an internal bus 153.

The internal bus 153 is connected to the input/output interface 152 as well. The input part 154 consists, for example, of a keyboard or mouse that the user operates when inputting various kinds of instruction commands to the CPU 151. The display part 157 consists, for example, of a CRT or the like, and the display thereof is performed with the use of various kinds of items of information, text, or images. An HDD (hard disk drive) 158 drives a hard disk and causes the hard disk to record therein or reproduce therefrom the program or information the CPU 151 executes. With respect to a drive 159, as the necessity arises, there is mounted a magnetic disk 161, an optical disk 162, a magneto-optical disk 163, or a semiconductor memory 164. Thereby, transmission/reception of data is performed between the both.

The network interface 160 is connected to a LAN (Local Area Network) by the use of, for example, a prescribed interface cable, etc. The network interface 160 is connected to a wide-band network such as, for example, an Internet communication network through the telephone lines (not illustrated). The network interface 160 thereby performs data transmission/reception to and from, for example, the terminal apparatus 131, personal computer 141-2, personal computer 141-3, etc.

These elements from the input part 154 to the network interface 160 are each connected to the CPU 151 by way of the input/output interface 152 and the internal bus 153.

Next, with reference to FIG. 21, an explanation will be given of the settlement process (FIG. 19A) that is executed between the company A that is the issuer of the IC card 2 and the company B in the case where the company A's terminal apparatus 131-1 supplies all the utilization logs to the issuer A's personal computer 141-1 which transmits to the IC card center the utilization logs based on the use of the common key $K_{IF}$.

In step S121, the control part 101 of the controller 3 of the company A's managed terminal apparatus 131-1 reads in via the network interface 107 and the internal bus 102 the utilization log recorded in the RAM 42 of the reader/writer 1. (That utilization log is, for example, one that is recorded through the execution of step S28 of FIG. 13, step S48 of FIG. 14, step S68 of FIG. 15, step S90 of FIG. 17, or step S110 of FIG. 18.) Thereafter, the control part 101 supplies that utilization log to the company A's personal computer 141-1 via the internal bus 102 and the network interface 107.

In step S122, the CPU 151 of the personal computer 141-1 analyzes the utilization log input thereto via the network interface 160, input/output interface 152, and internal bus 153, and classifies it into the log utilized using the common key A and the log utilized using the common key $K_{IF}$.

In step S123, the CPU 151 of the personal computer 141-1 determines, according to the analysis result in step S122, whether utilization based on the use of the common key $K_{IF}$ has been performed.

In step S123, when it is determined that no utilization based on the use of the common key $K_{IF}$ has been performed, the CPU 151 in step S124 performs the settlement corresponding to the local utilization based on the use of the specific key A, i.e., the local utilization that has been performed using the IC card 2 a relevant company itself has issued and using the terminal apparatus 131-1 this relevant company itself manages.

Assume next that it has been determined in step S123 that utilization based on the use of the common key $K_{IF}$ has been performed. Then, in step S125, the CPU 151 sends the utilization log corresponding to the common key $K_{IF}$ to the personal computer 141-3 of the IC card center via the internal bus 153, input/output interface 152, and network interface 160. Then the CPU 151 executes the process in step S124 described above.

In step S126, the CPU 151 of the personal computer 141-3 of the IC card center receives the utilization log corresponding to the common key $K_{IF}$ the personal computer 141-1 has transmitted in step S125. This notification is made via the network interface 160, input/output interface 152, and internal bus 153. The CPU 151 of the personal computer 141-3 of the IC card center has received therein not only the transmission from the company A that has been made in step S125 but also the transmission from each enterprise to which the company A is contracted.

In step S127, the CPU 151 of the personal computer 141-3 analyzes the input utilization log corresponding to the common key $K_{IF}$ in each enterprise's terminal apparatus by a method of, for example, classifying and calculating it for every utilizing enterprise.

In step S128, the CPU 151 of the personal computer 141-3 converts the mutual utilization (enterprise-to-enterprise's) relationship into a matrix of every issuer of the IC card according to the analyses results in step S127.

In step S129, the CPU 151 of the personal computer 141-3 produces the settlement information to be sent to each company by the use of the matrix of the mutual or joint utilization (enterprise-to-enterprise's) relationship having been produced in step S128. The CPU 151 then sends that information to the company A's personal computer 141-1 and company B's personal computer 141-2 via the internal bus 153, input/output interface 152, and network interface 160.

In step S130, the CPU 151 of the personal computer 141-1 receives the settlement information corresponding to the mutual utilization the personal computer 141-3 has transmitted in step S129, via the network interface 160, input/output interface 152, and internal bus 153. Similarly, in step S132, the CPU 151 of the personal computer 141-2 receives the settlement information corresponding to the mutual utilization the personal computer 141-3 has transmitted in step S129, via the network interface 160, input/output interface 152, and internal bus 153. Here, in this context of the specification, explanation is made assuming that mutual utilization has been performed between the companies A and B.

In step S131, the CPU 151 of the personal computer 141-1 acts or operates on the settlement information corresponding to the mutual utilization that it has received in step S130, as follows. Namely, that CPU 151, for example, accesses the server (not illustrated) of a prescribed banking system via the Internet lines, etc. That CPU 151 thereby executes the settlement processing through which to confirm, for example, the transfer with respect to the company B or the receipt from the company B. Similarly, in step S133, the CPU 151 of the personal computer 141-2 operates on the settlement information corresponding to the mutual utilization that it has received in step S130. That CPU 151 thereby executes the settlement processing through which to confirm, for example, the transfer with respect to the company A or the receipt from the company A.

Next, with reference to the flow chart of FIG. 22, an explanation will be given of the settlement process between the companies A and B (FIG. 19B) that is executed in the case where the log that is obtained when the terminal apparatus 131-1 of the company A, which is the issuer of the IC card 2, has been utilized using the common key $K_{IF}$ is directly transmitted to the IC card center.

In step S141, the control part 101 of the controller 3 of the terminal apparatus 131-1 reads in the utilization log that is recorded in the RAM 42 of the reader/writer 1 via the network interface 107 and the internal bus 102. The control part 101 then classifies that log into one corresponding to the utilization performed using the specific key A and one corresponding to the utilization performed using the common key $K_{IF}$.

In step S142, the control part 101 of the controller 3 of the terminal apparatus 131-1 transmits, of the utilization logs classified in step S141, the log corresponding to the utilization performed using the common key $K_{IF}$ to the personal computer 141-3 of the IC card center. This transmission is made via the internal bus 102 and the network interface 107.

In step S143, the control part 101 of the controller 3 of the terminal apparatus 131-1 supplies, of the utilization logs classified in step S141, the log corresponding to the utilization performed using the specific key A to the personal computer 141-1 of the company A. This supply is made via the internal bus 102 and the network interface 107.

The CPU 151 of the personal computer 141-1 has input thereto in step S144 the log corresponding to the utilization performed using the specific key A via the network interface 160, input/output interface 152, and internal bus 153. The CPU 151 thereby in step S145 executes the settlement corresponding to the local utilization through the same process as in the case of step S124 of FIG. 21.

In step S146, the CPU 151 of the personal computer 141-3 of the IC card center has transmitted thereto via the network interface 160, input/output interface 152, and internal bus 153 the utilization log corresponding to the common key $K_{IF}$ the reader/writer 1 of the company A's terminal apparatus 131-1 has transmitted in step S142. The CPU 151 of the personal computer 141-3 of the IC card center receives not only the transmission from the company A but also the transmission from each enterprise that the company A is contracted to.

Figure 21:
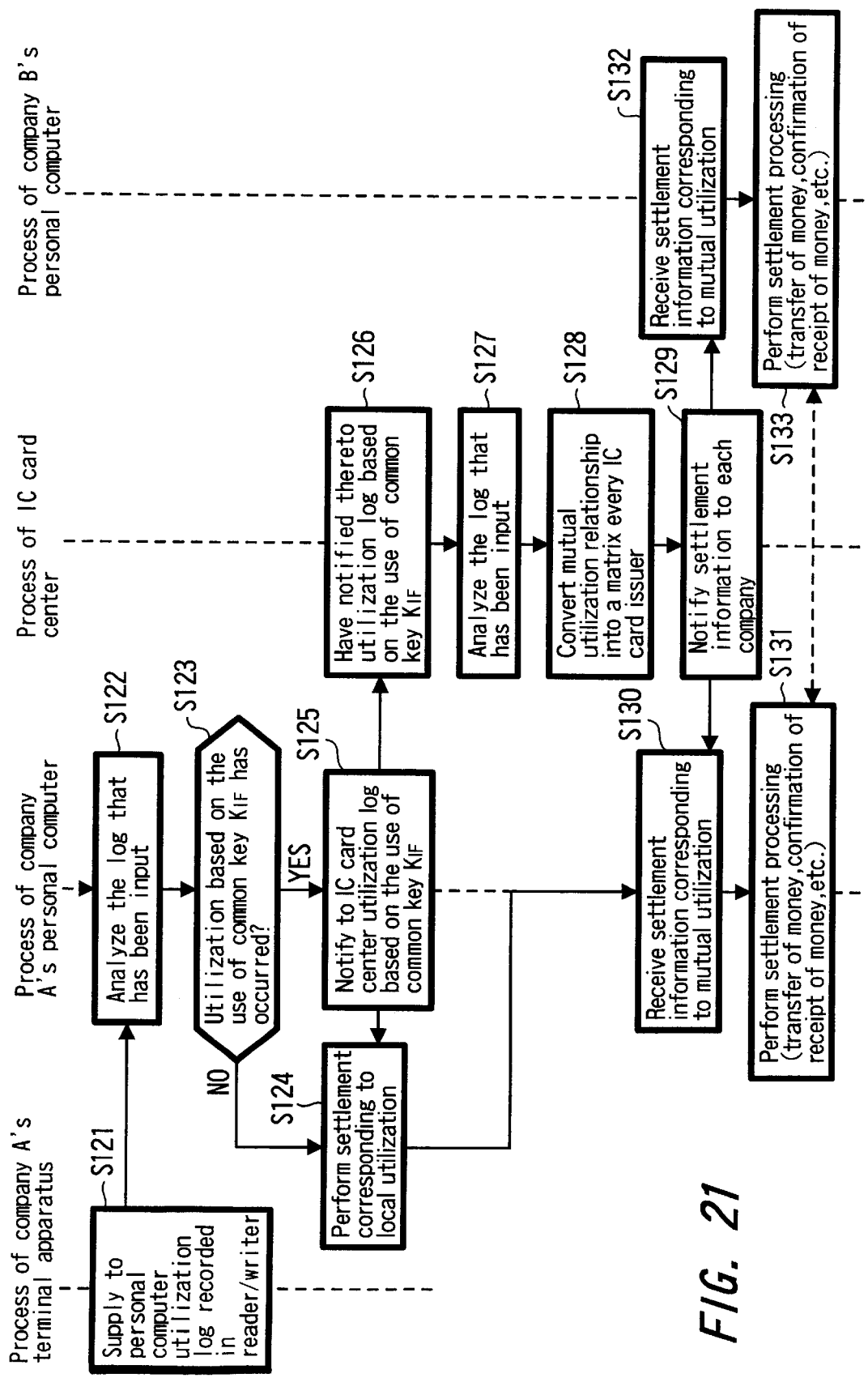
FIG. 21 is a flow chart illustrating the settlement process that is executed by each of the IC card issuer, the co-operator, and the IC card center.

In step S147 to step S153, the same processes as those in step S127 to step S133 explained using FIG. 21 are executed, whereby the settlement process is executed between the companies A and B.

Figure 22:
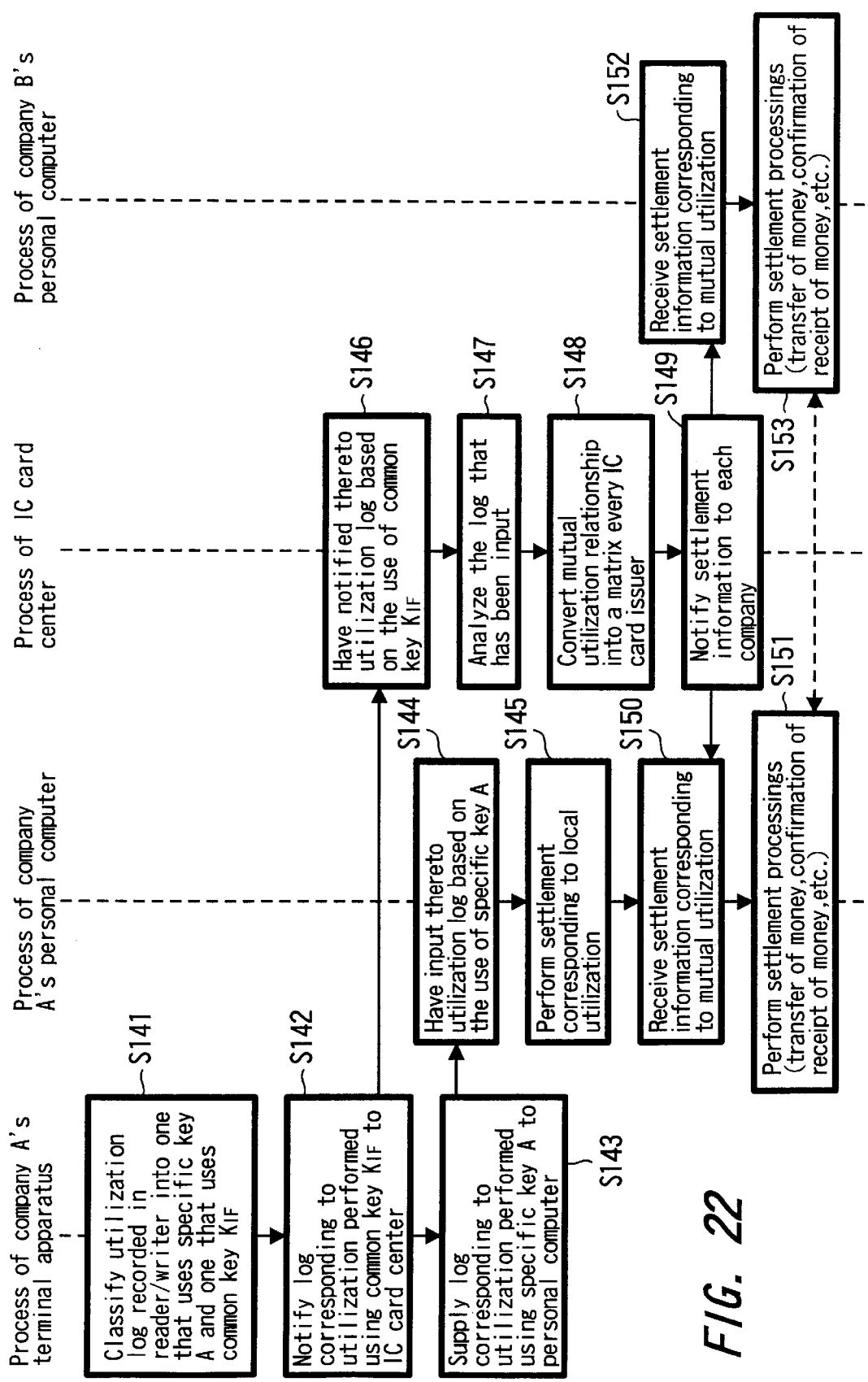
FIG. 22 is a flow chart illustrating the settlement process that is executed by each of the IC card issuer, the co-operator, and the IC card center.

In the settlement system that has been explained using FIGS. 21 and 22, only necessary information alone (i.e., the utilization log corresponding to the common key $K_{IF}$) is transmitted to the personal computer 141-3 of the IC card center. Therefore, it is unnecessary that the personal computer 141-3 of the IC card center manages all the transactions. Namely, the personal computer 141-3 of the IC card center has only to receive the transactions corresponding to the mutual utilization from each enterprise and distribute the processed results thereof to each enterprise. Therefore, it is possible to mitigate the processing burden upon the IC card center. Further, the transactions corresponding to the specific utilization can be settled only on the side of the company A that is the issuer of the IC card 2. Therefore, the IC card 2-issuing enterprise's system (e.g., the personal computer 141-1) has only to be structured in relation to the amount of transactions that occur from the specific utilization.

Figure 23:
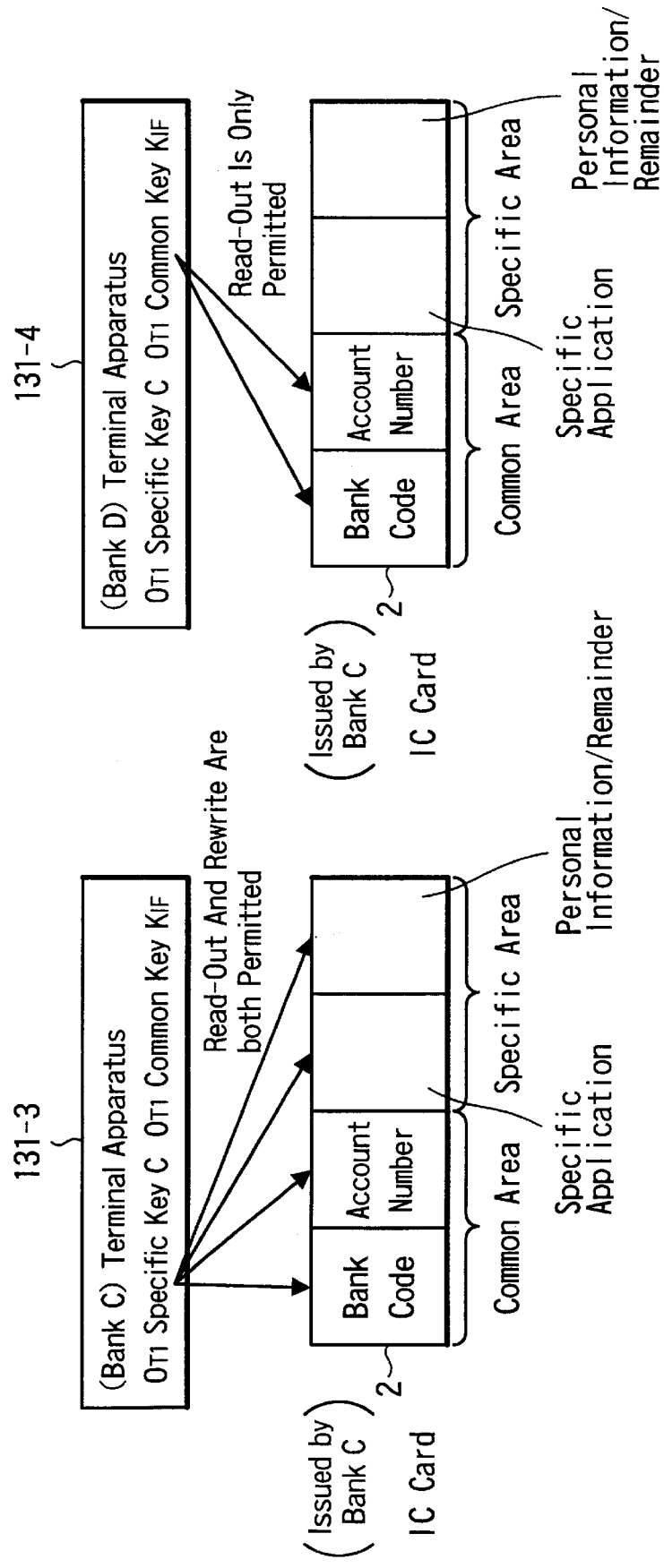
FIG. 23 is a view illustrating the accessing right to the applications in the specific and the common area that is imparted to a co-operator that cooperates with the IC card's issuer.

Next, using FIG. 23, an example will be described wherein the IC card system of the present invention is applied to the cash card of a financial institution, such as a bank.

Assume, for example, that the common area of the IC card 2 issued by a bank C has registered therein a bank code and an account number. And assume also that the specific area thereof has registered therein a specific application peculiar to the bank C, personal information, and remainder. In this case, regarding the bank code, account number, specific application, personal information, and remainder registered in the bank C's issued IC card 2, read-out and rewrite of data are possible with use of the specific key C. Namely, with respect to those respective items of information, read-out and rewrite of data (i.e., the addition and subtraction of data) can be performed using the specific key C registered in the bank C's terminal apparatus 131-3. It is to be noted that where, in the bank C's terminal apparatus, access is had to the application in the common area by using the specific key C, access is actually had to the application in the common area via the linked portion in the specific area. This method of accessing is the same as in the case explained using FIG. 16. (In the following description, where access is had to the application in the common area by using the specific key, the methods of accessing are all the same.)

On the other hand, in the cooperating bank D's terminal apparatus 131-4, the bank code and account number that are recorded in the common area can certainly be read in through the use of the common key $K_{IF}$ that is registered. However, that terminal apparatus 131-4 has no accessing right with respect to the application registered in the specific area. Thus, where the user uses the bank C's managed terminal apparatus 131-3, he can be given the service such as payment from his bank account or deposit of money into his savings account. On the other hand, where the terminal apparatus managed by another enterprise (e.g., a bank D) is used, the user cannot be given the service such as payment from his bank account or deposit of money into his savings account. However, the user can be given the service corresponding to the application in the common area the accessing right with respect to which has been provided to that other enterprise. (That service is, for example, the reference-to-remainder to the for-common-use-operation electronic value that is recorded in the for-common-use operation electronic money area, etc. that has been explained using FIG. 6.)

Figure 24:
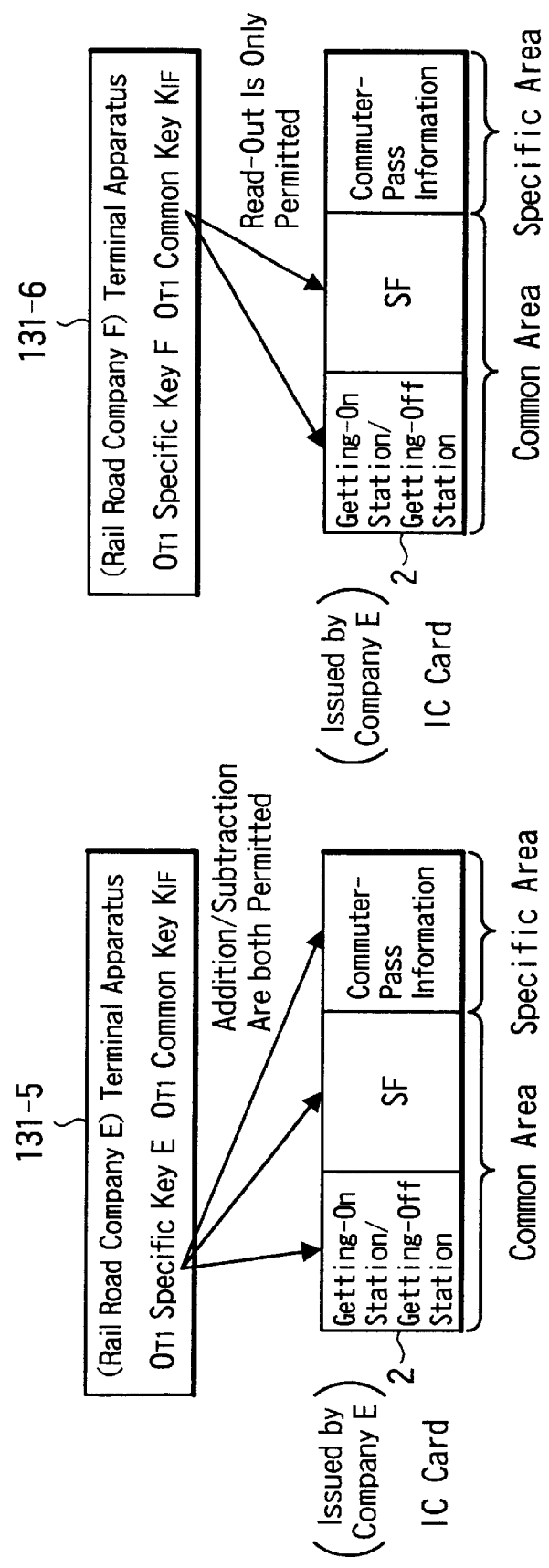
FIG. 24 is a view illustrating the accessing right to the applications in the specific and the common area that is imparted to a co-operator that cooperates with the IC card's issuer.

Next, using FIG. 24, an example will be described wherein the IC card system of the present invention is applied to the fare adjustment of a railroad company.

Assume that, for example, the common area of the IC card 2 the railroad company E has issued has registered therein information indicating the station at which a passenger (user) gets on the train, the station at which a passenger (user) gets off the train, and an SF (Stored Fare). Assume also that the specific area of that IC card 2 has registered therein commuter-pass information of the railroad company E. The SF represents the value (i.e., the thing having the same value as that of the currency) that has been paid or transferred to a prescribed financial institution, etc. beforehand as the fare utilizable in the co-operated railroad company. Regarding the information indicating the station at which a passenger (user) gets on the train and the station at which a passenger (user) gets off the train, the SF, and the commuter-pass information of the railroad company E, registered in the railroad company E's issued IC card 2, access can be had to the relevant applications for executing addition and subtraction processes through the use of the specific key E registered in the railroad company E's terminal apparatus 131-5.

Certainly, in the co-operated railroad company F's terminal apparatus, access can be had through the use of the common key $K_{IF}$ to the applications for reading out and subtracting of the information indicating the getting-on station and getting-off station and the SF information that are registered in the common area in the railroad company E's issued IC card 2. However, in that terminal apparatus, there is no accessing right with respect to the applications registered in the specific area. In other words, where the user has used the terminal apparatus 131-5 that is managed by the railroad company E, he can certainly be given the service such as purchase of the commuter pass, filling of the SF, adjustment of the fare for the extra distance he has ridden, etc. However, where he uses the terminal apparatus managed by another enterprise (e.g., the railroad company F), he cannot be given the service such as purchase of the commuter pass, filling of the SF, etc. But he can be given the service (e.g., adjustment of the fare for the extra distance he has ridden) through the use of the application in the common area the accessing right with respect to which has been provided to that other enterprise.

Figure 25:
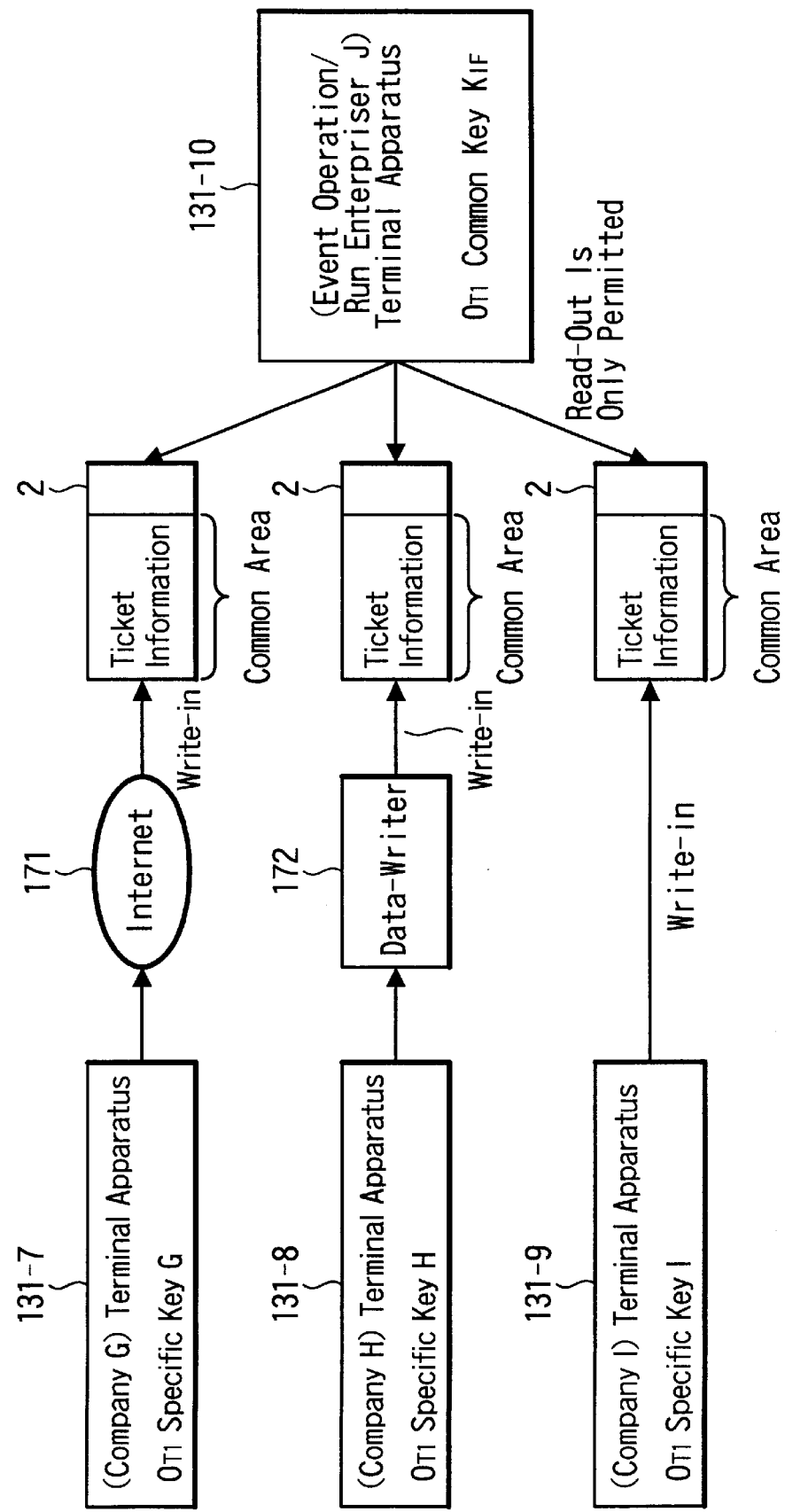
FIG. 25 is a view illustrating the accessing right to the applications in the specific and the common area that is imparted to a co-operator that cooperates with the IC card's issuer.

Next, using FIG. 25, an example will be described wherein the IC card system of the present invention is applied to an electronic-ticket service.

Assume that, for example, the common area of each of the IC cards 2 issued by companies G, H, and I has registered therein an application to write therein ticket information of an event such as, for example, a concert. Assume also that, for example, the company G's managed terminal apparatus 131-7 can write ticket information into the IC card 2 via the Internet lines 171; the company H's managed terminal apparatus 131-8 can write ticket information into the IC card 2 via a data-writing apparatus 172 installed at a station, large-sized store, etc.; and the company I's terminal apparatus 131-9 is installed at a ticket center, etc. and can write ticket information into the IC card 2.

In the terminal apparatus 131-10 of an event operation/run enterprise J cooperating with each of companies G, H, and I it is only possible to read out through the use of the common key $K_{IF}$ ticket information recorded in the common area. However, that terminal apparatus has no accessing right with respect to the application regarding the write-in of the ticket information. That is to say, in the terminal apparatus 131-10 of the event operation/run enterprise J, it is impossible to issue any ticket (write ticket information into the IC card 2), but it is possible to read in ticket information registered in the common area. Therefore, it is possible to confirm that the user has purchased a ticket of the relevant event through the use of the terminal apparatus 131-7 to 131-9. (That purchase is followed by the fact that the ticket information is written into the IC card 2 through the intermediary of the terminal apparatus 131-7 to 131-9.)

Figure 26:
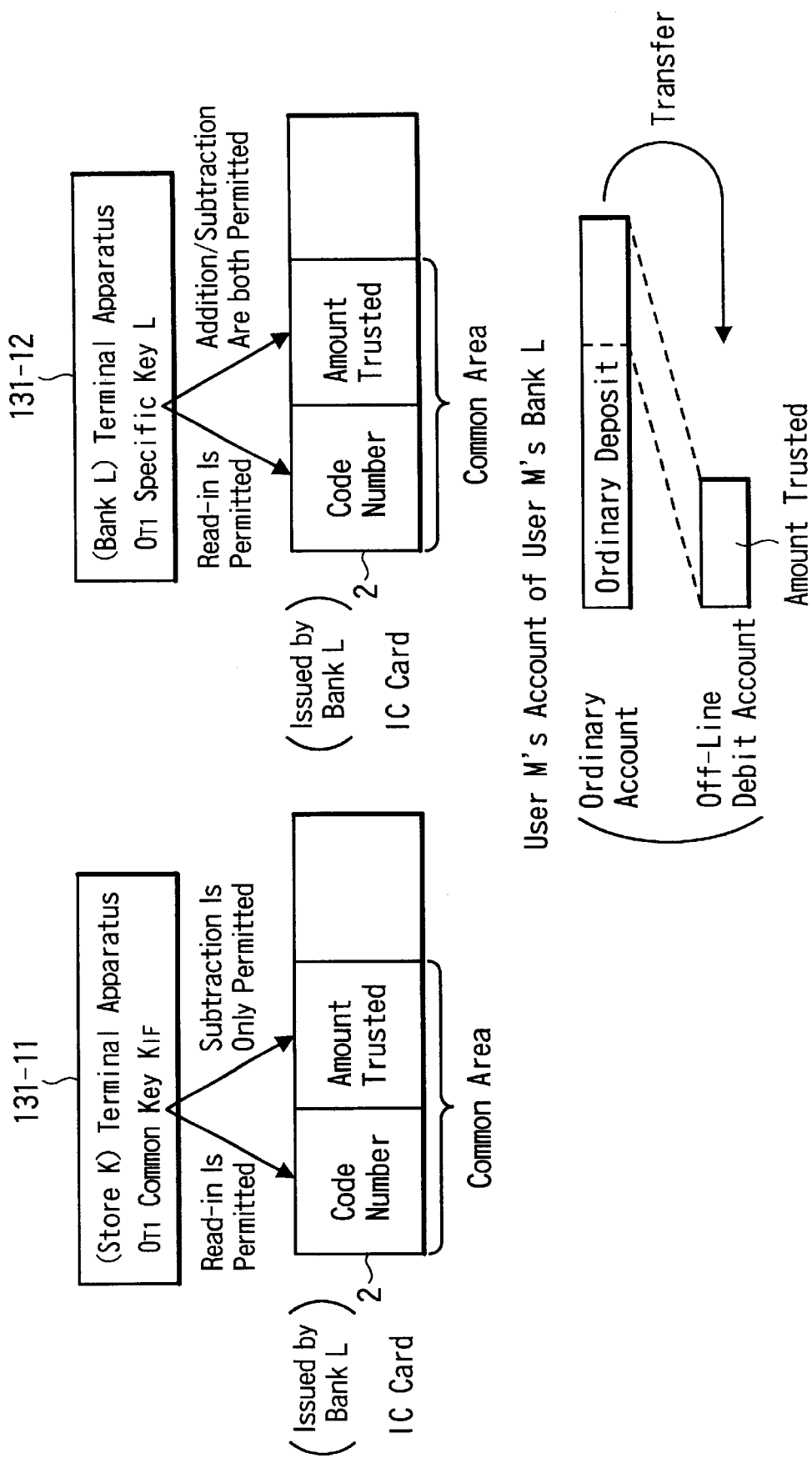
FIG. 26 is a view illustrating the accessing right to the applications in the specific and the common area that is imparted to a co-operator that cooperates with the IC card's issuer.

Next, an example wherein the IC card system of the present invention is applied to an off-line debit service will be explained with reference to FIG. 26.

For example, the terminal apparatus 131-11 of a cooperating store K for providing off-line debit service can utilize through the use of the registered common key $K_{IF}$ only an application for executing read-in of the code number registered in the common area and for executing subtraction processing of the amount trusted similarly registered therein. Terminal apparatus 131-11 has no accessing right to the processing in which to perform addition with respect to the amount trusted. Here, the "amount trusted" is as follows. Assume that the users who each possess the IC card 2 include, for example, a user M who has an ordinary account in a bank K. The "amount trusted"]is where a prescribed amount of money has been transferred from the amount deposited in that ordinary account to a for-use-M off-line debit account in the same branch office of the same bank. The "amount trusted" is intended to permit the utilization of the off-line debit by using that "amount trusted" as the amount mortgaged.

Through the use of the cooperating terminal apparatus 131-11 for providing the off-line debit service, the user can be given the service of the price settlement executed, for example, when he has purchased an item of goods. However, the user cannot be given the service in which an addition (transfer) is performed with respect to the amount trusted. And, regarding the bank L's issued IC card 2, through the use of the bank L's managed terminal apparatus 131-12, access can be had to the application for processing addition or subtraction with respect to the amount trusted via the specific key L. So the user can enjoy the service of performing addition (transfer) with respect to the amount trusted through the use of the bank L's managed terminal apparatus 131-12.

The adjustment of the amount of money the user has utilized through the off-line debit service is executed through the use of the bank L's terminal apparatus 131-12, for example, by preparing in the specific area of the IC card 2 an application for executing a batch process regarding the settlement of the off-line debit money. The user cannot buy an item of goods, etc. the price of which exceeds the amount trusted. Therefore, it is possible to prevent the overuse of the amount trusted. Also, it may be arranged, for example, to necessarily execute the batch process of the settlement at the time of the transfer of the amount trusted or the reference-to-remainder of the amount trusted. It thereby may be arranged to enable the execution of the batch process regarding the settlement of the off-line debit service without the user's special operation.

In the foregoing explanation, unless using the IC card 2 issuer's specific key, it has been impossible to execute the addition processing of performing addition with respect to the value recorded in the IC card. That addition processing includes the filling processing with respect to the for-joint-use-operation, or commonly accessible, electronic value. (That is, access to the application corresponding to the addition processing for executing addition with respect to the commonly accessible electronic value.) However, it may be arranged to keep a prescribed specific key stored in the EEPROM 66 of the IC card 2 beforehand so as to achieve a specific result, such as, for example, to impart to a prescribed specific key other than the issuer's specific key the accessing right to the application corresponding to the addition processing for executing the commonly accessible electronic value. By doing so, it may be arranged to enable the execution of the filling processing with respect to the commonly accessible electronic value through the use of the issuer's permitted terminal apparatus managed by a prescribed manager.

Next, the write-in process for writing into the electronic value through the use of a specific key other than the issuer's specific key will be explained with reference to the flow chart of FIG. 27. Here, it is assumed that the issuer A of the IC card 2 cooperates with a money-receipt business agent B. Assume that the accessing right with respect to the application for executing the filling process for filling the commonly accessible electronic value in the common area recorded in the EEPROM 66 of the issuer A's issued IC card 2 is imparted beforehand to the specific key B registered in the terminal apparatus that is managed by the money-receipt by-proxy-execution business agent B. By this previous imparting, the filling process of the commonly accessible electronic value is executed through the use of the money-receipt by-proxy-execution business agent B's managed terminal apparatus.

In step S161, the reader/writer 1 of the terminal apparatus detects the issuer A's issued IC card 2 that has been mounted. The reader/writer 1 has input thereto from the controller the filling amount for the commonly accessible electronic value that the user has input using the input part 103 of the controller 3. Thus, the object-to-be-opened file is the for-joint-use-operation, or commonly accessible, electronic value file, and the filling amount of money with respect to the commonly accessible electronic value is input to the DPU 31 via the SCC 33 and the bus 35.

The DPU 31 of the reader/writer 1 of the terminal apparatus, in step S162, performs authentication, with the use of the specific key B, through the execution of the same process as that in step S3 of FIG. 12. In step S163, that DPU 31 determines, according to the signal input in step S162 from the IC card 2, whether the reader/writer 1 and the IC card 2 have been correctly authenticated with each other through the use of the specific key B. When it is determined in step S163 that correct authentication has not been performed, the processing proceeds to step S169.

Assume that it has been determined in step S163 that correct authentication has been performed. (Namely, assume that the IC card 2 is the issuer A's issued IC card 2, access to which based on the use of the specific key B is permitted.) Then, in step S164, the DPU 31 of the reader/writer 1 produces a control signal for gaining the accessing right with respect to the commonly accessible electronic value file recorded in the common area in the EEPROM 66 of the IC card 2. (That control signal includes the service code corresponding to the commonly accessible electronic value file). The DPU 31 then transmits that control signal to the IC card 2 via the bus 35, SPU 32, modulator circuit 23, and antenna 27. The SPU 32 receives a response signal from the IC card 2 via the antenna 27 and the demodulator circuit 25, and inputs the result of the response signal to the DPU 31 via the bus 35.

In step S165, the DPU 31 of the reader/writer 1 operates on the response signal that has been input in step S164 from the IC card 2. The DPU 31 determines according to that response signal whether the accessing right to the addition processing for an amount of value that can access the commonly accessible electronic value file is permitted. When it is determined in step S165 that the accessing right is not permitted, the processing proceeds to step S169.

When it is determined in step S165 that the accessing right is permitted, the DPU 31 of the reader/writer 1, in step S166, produces a control signal for opening the commonly accessible electronic value file in the common area disposed in the EEPROM 66 of the IC card 2. Then the DPU 31 transmits the control signal to the IC card 2 along with the specific key B via the bus 35, SPU 32, modulator circuit 23, and antenna 27.

In step S167, the DPU 31 of the reader/writer 1 acts or operates on the filling amount of money with respect to the commonly accessible electronic value that the user has input in step S161 by using the input part 103 of the controller 3. Thereby, the DPU 31 according to that filling amount executes filling processing with respect to the commonly accessible electronic value. That is, the DPU 31 produces a control signal for adding the adding amount of commonly accessible electronic value that has been input from the controller 3 to the remainder recorded in the commonly accessible electronic value file registered in the common area of the IC card 2. The DPU 31 then transmits that control signal to the IC card 2 via the bus 35, SPU 32, modulator 23, and antenna 27.

The antenna 53 of the IC card 2 receives the control signal and supplies it to the interface part 61. With respect to it, there is executed a prescribed process through the operations of the interface part 61, BPSK demodulation part 62, and calculation part 64. Then, to the sequencer 91 there is input an ASK modulated signal that corresponds to the control signal transmitted from the reader/writer 1. According to the control signal that has been input to it, the sequencer 91 alters the remainder of the commonly accessible, or for-joint-use-operation, electronic value that is recorded in the EEPROM 66.

In step S168, the DPU 31 of the reader/writer 1 records, as a case of utilizing the specific key B, the log of the process executed in step S167 into the RAM 42 of the memory 34 of the reader/writer 1. Simultaneously, the DPU 31 produces a control signal for recording the process executed in step S167 into the RAM 67 of the IC card 2. It then transmits the control signal to the IC card 2 via the bus 35, SPU 32, modulator circuit 23, and antenna 27. The antenna 53 of the IC card 2 receives the ASK modulated signal corresponding to the control signal transmitted from the reader/writer 1, and supplies it to the interface part 61. With respect to it, there is executed a prescribed process through the operations of the interface part 61, BPSK demodulation part 62, and calculation part 64. As a result of this, the log of the process executed in step S167 is stored in the RAM 67, with the result that the process is terminated.

In case no correct authentication has been performed in step S163, or in case it has been determined in step S165 that the accessing right (the accessing right to the addition processing) to the file is not permitted, the same process as that in step S10 of FIG. 12 is executed in step S169. The process thereby is terminated.

Incidentally, here, the specific key B is registered in the issuer A's issued IC card 2 at the time of the cooperation. Through this registration, it is arranged that the filling process for filling the commonly accessible electronic value can be executed using the money-receipt by-proxy-execution business agent B's managed terminal apparatus. However, it is also possible to arrange that, at the time of the cooperation, the issuer A of the IC card 2 supplies the specific key A to the money-receipt by-proxy-execution agent B, and the specific key A is registered in the money-receipt by-proxy-execution agent B's managed terminal apparatus. By doing so as well, it is possible to execute the same process.

Next, with reference to the flow chart of FIG. 28, the settlement process for price (commission) between the issuer A and the money-receipt by-proxy-execution agent B will be explained in the case where there has been executed the write-in process for performing write with respect to the electronic value through the use of the specific key other than the issuer's specific key, which write-in process is the one that has been explained using FIG. 27.

In step S171, the reader/writer 1 of the terminal apparatus (hereinafter, the terminal apparatus B) of the money-receipt by-proxy-execution agent B has mounted with respect thereto the issuer A's issued IC card 2. And the reader/writer 1 has input thereto a request for the process for filling a value into the IC card 2 (the filling of a value such as, for example, electronic money, commonly accessible electronic value, or an SF). The DPU 31 of the reader/writer 1 reads in from the IC card 2 that has been mounted a card ID disposed in the issuance ID block that has been explained using FIG. 5, via the antenna 27, demodulator circuit 25, SPU 32, and bus 35. Then, the DPU 31 supplies that card identification (ID) to the controller 3 via the bus 35 and the SCC 33.

In step S172, the control part 101 of the controller 3 has input thereto the card ID of the IC card 2 mounted with respect to the reader/writer 1, via the network interface 107 and the internal bus 102. Thereby, the control part 101 produces a signal for requesting permission to execute the money-receipt by-proxy-execution process with respect to the IC card 2. Then the control part 101 transmits that signal to the issuer A's managed personal computer (hereinafter, the personal computer A) via the internal bus 102, network interface 107, and wide-band network such as the Internet lines (not illustrated).

The CPU 151 of the personal computer A has input thereto in step S173 the signal indicating the request for permission for by-proxy execution from the terminal apparatus B via the wide-band network such as the Internet lines (not illustrated), network interface 160, input/output interface 152, and internal bus 153. In step S174, the CPU 151 transmits a signal indicating permission for by-proxy execution to the terminal apparatus B via the internal bus 153, input/output interface 152, network interface 160, the Internet lines, etc.

In step S175, the terminal apparatus B has input thereto the signal indicating permission for by-proxy execution that the personal computer A has transmitted in step S174. Then, in step S176, the terminal apparatus B executes the write-in process in which write-in is performed using a specific key other than the issuer's one and which has been explained using FIG. 27.

Figure 27:
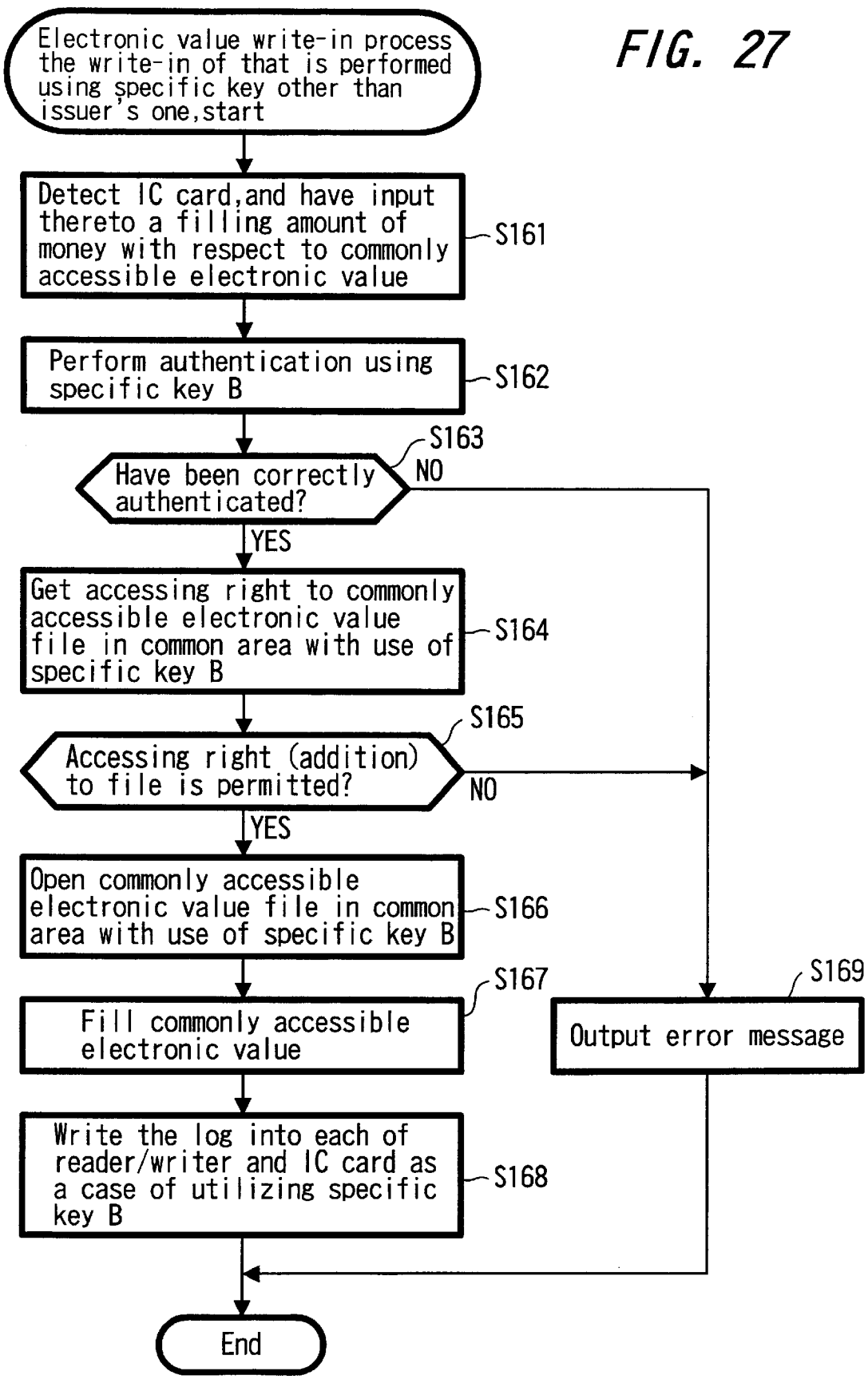
FIG. 27 is a flow chart illustrating the electronic value write-in process which, with respect to the electronic value, is performed using a specific key other than that of the issuer.
Figure 28:
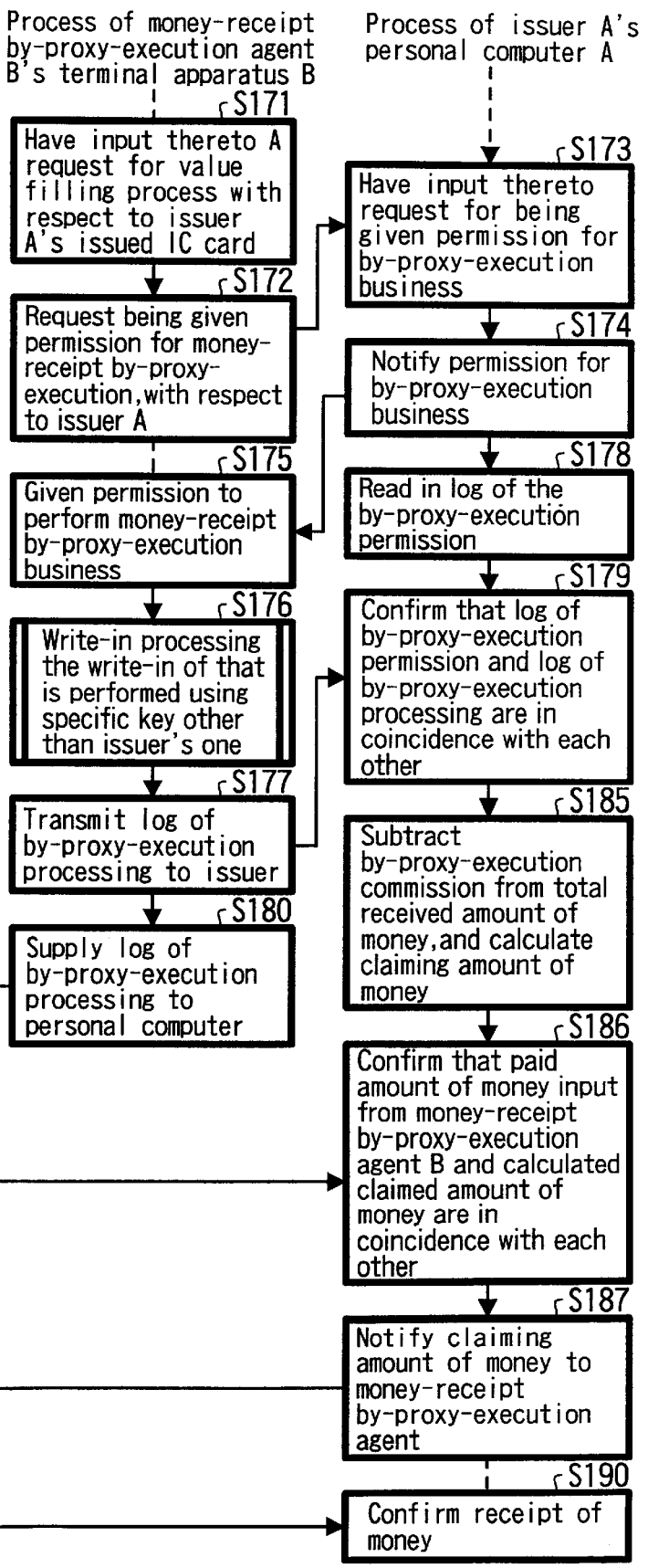
FIG. 28 is a flow chart illustrating the settlement process that, in the case the write-in with respect to the electronic value has been performed using a specific key other than that of an issuer, is executed in each of the issuer and the co-operator.

In step S177, the DPU 31 of the reader/writer 1 of the terminal apparatus B reads out the log of the process executed in step S176, which has been recorded in the RAM 42 of the memory 34 in step S168 of FIG. 27. Then, the DPU 31 supplies it to the controller 3 via the bus 35 and SCC 33. The control part 101 of the controller 3 has input thereto the log of the process executed in step S167, via the network interface 107 and internal bus 102. And the control part 101 transmits it to the personal computer A via the internal bus 102, network interface 107, wide-band network such as the Internet lines, etc.

In step S178, the CPU 151 of the personal computer A reads in the by-proxy-execution permission log that has been transmitted in step S174 to the terminal apparatus B. In step S179, the CPU 151 has input thereto the by-proxy-execution process that the terminal apparatus B has transmitted in step S177 via the wide-band network such as the Internet lines, network interface 160, input/output interface 152, and internal bus 153. Thereby, the CPU 151 confirms that the by-proxy-execution permission log it has read-in in step S178 and the by-proxy-execution log that has been input thereto are in coincidence with each other.

In step S180, the control part 101 of the controller 3 of the terminal apparatus B transmits the log of the by-proxy-execution process that has been input thereto in step S177, to the money-receipt by-proxy-execution agent B's managed personal computer (hereinafter, the personal computer B). The log is transmitted thereto via the internal bus 102, network interface 107, and network such as a LAN (not illustrated).

In step S181, the CPU 151 of the personal computer B has input thereto the log of the by-proxy-execution process that the terminal apparatus B has transmitted in step S180 via the network such as a LAN (not illustrated), network interface 160, input/output interface 152, and internal bus 153. The CPU 151 converts the thus-input by-proxy-execution process log into a database, and calculates a sum total of the received amounts of money that have been received by the by-proxy-execution business (i.e., the deposited amounts of money).

The CPU 151 of the personal computer B, in step S182, calculates a by-proxy-execution commission the computer B demands of the issuer A. The CPU 151, in step S183, also subtracts that by-proxy-execution commission from the total deposited amount of money. The CPU 151 thereby calculates the resulting amount of money to be paid to the issuer A. The CPU 151 then transmits, in step S184, the thus-calculated paid amount of money to the personal computer A via the internal bus 153, input/output interface 152, network interface 160, and wide-band network such as the Internet lines.

The CPU 151 of the personal computer A, in step S185, operates on the log of the money-receiving by-proxy-execution operation that has been input in step S179 from the terminal apparatus B. According to that operation log, the CPU 151 subtracts from the total by-proxy-execution received amount of money the commission to be paid to the money-receipt by-proxy-execution agent B to thereby calculate the amount claimed with respect thereto. In step S186, the CPU 151 has input thereto the paying amount of money that the personal computer B has transmitted in step S184. Thereby, the CPU 151 confirms that the paying amount of money coincides with the amount claimed that has been calculated in step S185. In step S187, the CPU 151 produces a signal indicating the amount it claims with respect to the money-receipt by-proxy-execution agent B. The CPU 151 transmits that signal to the personal computer B via the internal bus 153, input/output interface 152, network interface 160, wide-band network such as the Internet lines, etc.

In step S188, the CPU 151 of the personal computer B has input thereto a signal indicating the amount claimed that the personal computer A has transmitted in step S187. Thereby, the CPU 151 thereof confirms that the amount claimed coincides with the paying amount of money that it has calculated in step S184. In step S189, that CPU 151 pays the claimed amount of money to the issuer A through the execution of a process with respect to the issuer A of transmitting to the server (not illustrated) of a prescribed financial institution via, for example, the Internet lines, a signal for transferring the paying amount of money into the account the issuer A has.

In step S190, the CPU 151 of the issuer A's personal computer A accesses the server of the prescribed financial institution via, for example, the Internet lines. Thereby, that CPU 151 confirms the receipt of the money from the money-receipt by-proxy-execution agent B through the processing of, for example, confirming the balance of the account the issuer A has.

Figure 9:
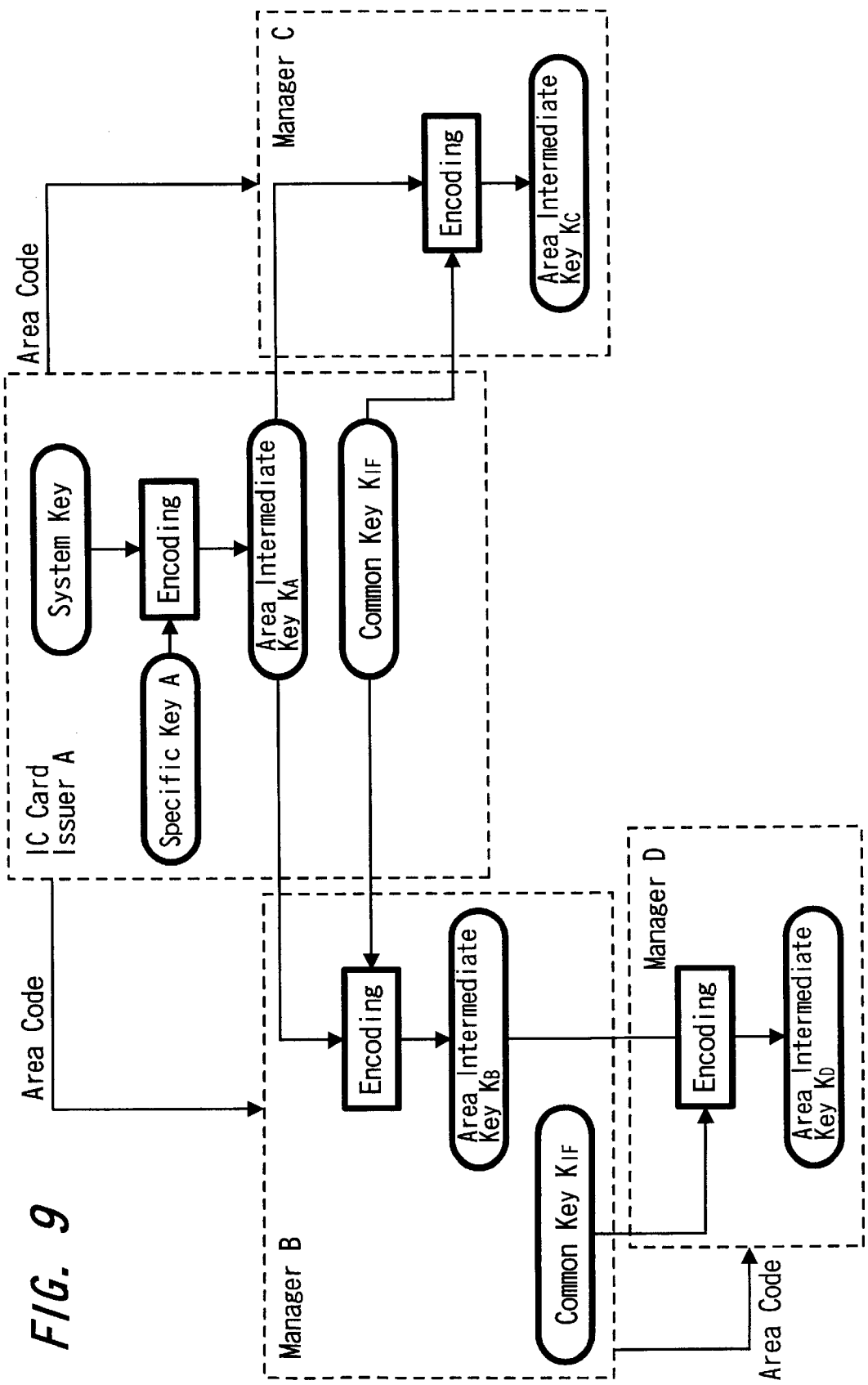
FIG. 9 is a view illustrating the delivery/receipt of an authentication key between the managers.

Regarding the delivery/receipt of the accessing right explained using FIG. 9, an explanation has been given of the following case. Namely, the issuer A supplies to each of its co-operated managers B and C the common key $K_{IF}$ and the service code corresponding to the utilizable application based on the contents of their contract. By this supplying, the issuer A makes a prescribed application in the common area utilizable in the manager B's or C's managed terminal as well. Further, through the cooperation of the manager B with the manager D, part of the by-manager B-utilizable applications can also be utilized by the manager D as well.

Next, by use of FIG. 29, an explanation will be given of the case wherein the issuer A doesn't supply to each of its cooperated managers the service code based on the contents of their contract. In that case, with no such service code being supplied to each of those cooperate d managers, they make a common possession, between themselves, of the applications in the common area that involves a more complex relationship with each other.

As illustrated in FIG. 29A, the manager A encodes the system key with the specific key A and supplies the encoded result to each of the managers E and G that are the partners that the manager A cooperates with.

As illustrated in FIG. 29B, the manager E encodes with the common key $K_{IF}$ the encoded result obtained by encoding the system key with the specific key A and input from the manager A. The manager E uses that encoded result as a first access key $K_{E1}$. Further, the manager E sequentially encodes the first access key $K_{E1}$ (the encoded result obtained by encoding with the common key $K_{IF}$) with use of the service keys #5008h, #5048h, #5088h, and #50C8h, namely, the service keys corresponding to the applications the utilization of which is permitted to the manager E under the contents of the contract. The manager E uses the final encoded result as a second access key $K_{E2}$.

A manager F, as illustrated in FIG. 29C, has input thereto from the manager E the first access key $K_{E1}$ (the encoded result based on the use of the common key $K_{IF}$), and encodes that first access key with the common key $K_{IF}$. The manager F uses that encoded result as a first access key $K_{F1}$. Further, the manager F sequentially encodes the first access key $K_{F1}$ with the service keys #6008h and #6048h. The manager F supplies that encoded result to the manager E. The manager F sequentially causes the manager E to encode that encoded result with the service keys #5048h and #5088h, namely, the service keys corresponding to the applications the utilization of which is permitted to the manager E under the cooperation contract. Thereafter, the manager F has supplied thereto from the manager E that encoded result, and then supplies that encoded result to the manager G. The manager F causes the manager G to encode that encoded result with the service key #70C8h corresponding to the application the utilization of which is permitted to the manager G under the cooperation contract. And the manager F has supplied from the manager G that encoded result, and uses it as a second access key $K_{F2}$.

On the other hand, as illustrated in FIG. 29D, the manager G encodes with the common key $K_{IF}$ the encoded result input from the manager A that has been obtained by encoding the system key with the specific key A. The manager G uses that encoded result as a first access key $K_{G1}$. Further, the manager G sequentially encodes the first access key $K_{G1}$ with the service keys #7008h and #70C8h corresponding to the application the utilization of which is permitted to the manager G under the cooperation contract. The manager G then supplies that final encoded result to the manager encoded result with the service key #6048h corresponding to the application the utilization of which is permitted to the manager F under the cooperation contract. Thereafter, the manager G supplies to the manager E the encoded result based on the use of the service key #6048h, the encoding of which is performed by the manager F. Then the manager G sequentially causes the manager E to encode that encoded result with the service keys #5088h and #50C8h corresponding to the applications the utilization of which is permitted to the manager E under the contract. And the manager G has supplied thereto from the manager E that encoded result and uses it as a second access key $K_{G2}$.

Figure 30:
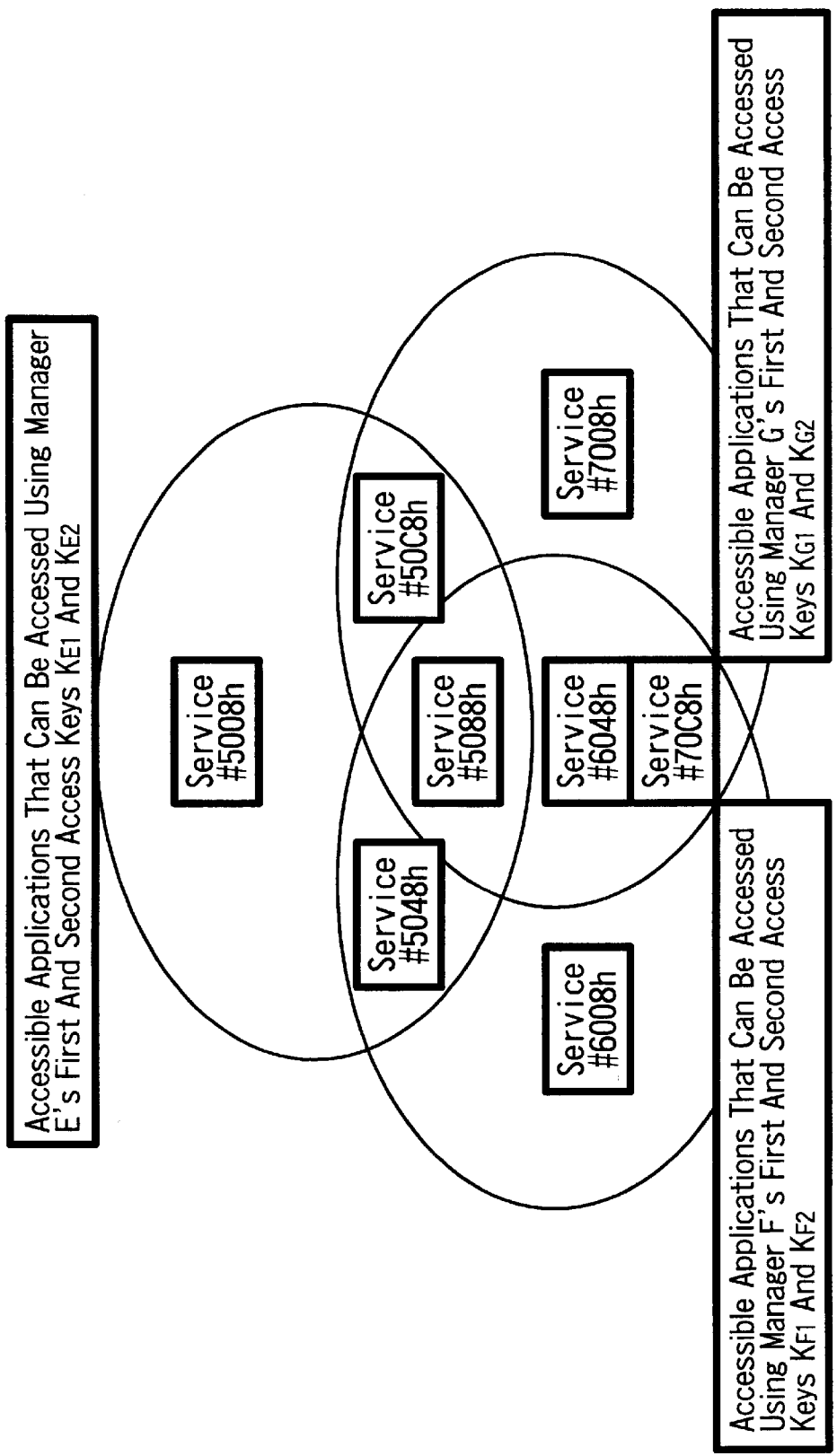
FIG. 30 is a view illustrating the common possession of services (applications) between the managers.

In this case, in the IC card 2, using the common key $K_{IF}$ and service key stored in its EEPROM 66, there is encoded the system key according to the same procedure as that explained in connection with FIG. 11. As a result, there are produced the first access key and the second access key. It therefore becomes possible between each of the managers E, F, and G to make a common use, such as that illustrated in FIG. 30, of the application disposed in the service-definition area in the common area.

Figure 29:
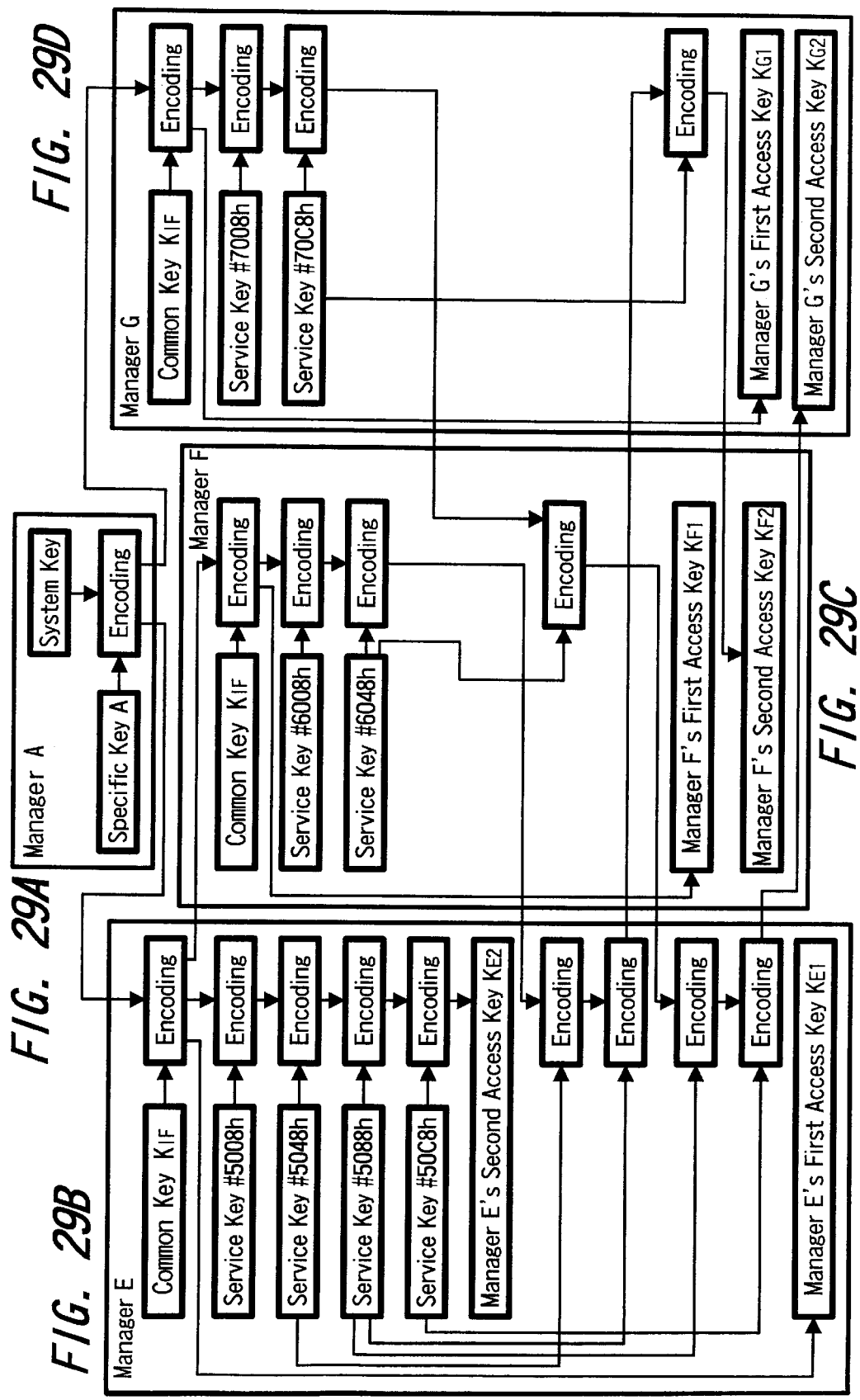
FIG. 29 is a view illustrating the delivery/receipt of a common key between the managers.

Data transmission/reception for permitting an accessing right to the application disposed in the common area is performed as explained using FIG. 29. As a result, the manager E can access each of the applications disposed in the service-definition areas #5008, #5048h, #5088h, and #50C8h.

Also, the manager F can access the service-definition areas #6008h and #6048h, the accessing right to which is permitted to itself. In addition, the manager F can access the service-definition areas #5048h and #5088h with respect to which the manager E has the service key, and the service-definition area #70C8h with respect to which the manager G has the service key. Similarly, the manager G can access the service-definition areas #7008h and #70C8h with respect to which the manager G itself has the service key. In addition, the manager G can access the service-definition areas #5088h and #50C8h with respect to which the manager E has the service key, and the service-definition area #6048h with respect to which the manager F has the service key.

Incidentally, in the delivery and receipt of keys such as illustrated in FIG. 29, it is impossible that the service key itself of a certain manager will be known by the other managers. That is, it is impossible that the service keys #5008h, #5048h, #5088h, and #50C8h of the manager E will be known by any one of the managers F and G. Similarly, it is impossible that the service keys #6008h and #6048h of the manager F will be known by any one of the managers E and G. Further, it is impossible that the service keys #7008h and #70C8h of the manager G will be known by any one of the managers E and F.

The above-described series of processes can be executed through the use of hardware or through the use of software. When the series of processes are executed through the use of software, the software may be installed from a recording medium storing the program therein into a computer that has an exclusive piece of hardware in which the program constituting that software is incorporated or into, for example, a general-purpose personal computer that enables execution of various kinds of functions by having installed therein various kinds of programs. Or that software may be downloaded via communication networks such as cellular phone networks, the Internet, and the like.

The recording medium is constructed of a package medium, etc. The package medium, as illustrated in FIGS. 2, 4, or 20, is distributed separately from the relevant computer in order to provide a program to the user and that has recorded therein the program. The medium may consist of the magnetic disk 45, 111, or 161 (including a floppy disk), the optical disk 46, 112, or 162 (including CD-ROM (Compact Disk-Read Only Memory) or DVD (Digital Versatile Disk)), the magneto-optical disk 47, 113, or 163 (including an MD (Mini-Disk)), or the semiconductor memory 48, 114, or 164.

Also, in the specification of this patent application, the steps that describe the program recorded in the recording medium include the processes that are time-series executed in the order of the corresponding described instructions. Those steps include, in addition, the processes that, even when not time-series executed, are executed in parallel or individually separately.

Additionally, in the specification of this patent application, the system represents the entire apparatus that is constructed of a plurality of devices.

In the data storage device and data storage method of the present invention, data is recorded in a first recording area for recording therein first data and first authentication information with respect to the first data and in a second recording area for recording therein second data and second authentication information with respect to the second data;

the input/output of the data with respect to the information-processing apparatus is controlled; according to the authentication information that has been input from the information-processing apparatus and the first authentication information and second authentication information it is determined whether the transmission/reception of the first data and second data should be performed with respect to the information-processing apparatus; of the first data and second data, according to the first data and second data with regard to which it has been determined that the transmission/reception of the data should be performed by the data storage device with respect to the information-processing apparatus, a calculation process is executed; third data of the first data recorded in the first recording area is recorded in association with fourth data of the second data recorded in the second recording area; and in case the information-processing apparatus performs data transmission/reception on the third data, a calculation process is executed with respect to the fourth data. Therefore, without excessively using the recording area, it is possible to ensure the security of the data that are respectively recorded in the first and the second recording areas.

In a first information-processing apparatus, first information-processing method, and first program of the present invention, there is controlled the input/output of the data with respect to the data storage device; there is recorded at least one authentication information used for performing the transmission/reception of a prescribed item of data that is included in the data recorded in the data storage device; and in case the data transmission/reception of the data storage device with respect to the information-processing apparatus has been performed, there is separately recorded information indicating the contents of the data transmission/reception of every authentication information used for the data transmission/reception. Therefore, data transmission/reception with the data storage device can be performed so that the transactions can be managed for every form of authentication.

In a second information-processing apparatus, second information-processing method and second program of the present invention, there are recorded first authentication and second authentication information that are used when the data storage device and another information-processing apparatus perform data transmission/reception therebetween, and code information defining each of a plurality of data the data storage device stores therein; there is encoded the first authentication information; and there are output to the another information-processing apparatus the encoded first authentication information, the second authentication information, and a prescribed item of the code information. Therefore, without making the first authentication information known, it is possible to supply to the another information-processing apparatus the authentication information that is necessary for providing the commonly accessible service. Thereby, it is possible to realize the co-existence of a specific-accessible service and a commonly accessible service.

In a third information-processing apparatus, third information-processing method, and a third program of the present invention, there is input the first information that regards the data transmission/reception executed by a corresponding one of the other information-processing apparatus with respect to the data storage device; there is produced, according to the first information that has been input, second information regarding the data transmission/reception that corresponds to a plurality of the other information-processing apparatus; and there is output to the corresponding other information-processing apparatus the second information that has been produced. Therefore, the third information-processing apparatus can have input thereto the history of use of the IC card that provides a plurality of services by a plurality of enterprises. Thereby, the third information-processing apparatus can transmit the settlement information to a respective relevant one of the enterprises.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A data storage device operable to communicate with an information-processing apparatus, comprising:
   a first memory having a first storing area and a second storing area,
   the first storing area including first data, which includes second data, and first authentication information with respect to the first data, and
   the second storing area including third data, which includes fourth data, the fourth data being associated with the second data, and second authentication information with respect to the third data;
   a data input/output control operable to control (i) data communication between the data storage device and the information-processing apparatus, and (ii) manipulation of at least one of the first data and the third data by the information-processing apparatus, based on authentication information from the information-processing apparatus, and at least one of the first and second authentication information; and
   a processing unit operable to process the fourth data based on the associated second data when the data input/output control has permitted the information-processing apparatus to manipulated the second data.

2. The data storage device according to claim 1, wherein:
   each of the first and second authentication information includes information indicating whether read-out, write-in, addition, or subtraction processing with respect to the first data and the third data can be executed; and
   the data input/output control is operable to permit one or more of the read-out, write-in, addition, or subtraction processes based on the authentication information input from the information-processing apparatus and at least one of the first and second authentication information.

3. The data storage device according to claim 1, wherein:
   each of the first data and the second data includes an application for providing a predetermined service, the application being defined by a corresponding different code; and
   the processing unit is operable to determine which of the applications should be executed based on the code contained in the authentication information input from the information-processing apparatus, and to execute that application.

4. The data storage device according to claim 1, further comprising a second memory operable to store information indicative of the data communication between the data storage device and the information-processing apparatus, the information being based on which of the first and second authentication information is used by the data input/output control to control the data communication.

5. A data storage device, comprising: a memory having a specific storage area and a common storage area, data in the specific storage area being accessible by way of first authentication information associated therewith, and data in the common storage area being accessible by way of second authentication information associated therewith, and the specific storage area having link data associated with certain of the data stored in the common area such that use of the first authentication information also enables access to the certain data in the common storage area.

6. A data storage device according to claim 5, wherein the data in the common storage area includes an electronic money application that may be used to purchase goods and services from participating entities.

7. A data storage device according to claim 6, wherein an issuing entity may gain access to the specific storage area by way of the first authentication information, but neither the participating entities nor a user of the data storage device may gain access to the specific storage area.

8. A data storage device according to claim 7, wherein the electronic money application in the common storage area is linked to certain of the data in the specific storage area such that the issuing entity may affect the electronic money application by way of the first authentication information without requiring use of the second authentication information.

9. A method, comprising:
storing first data, which includes second data, and first authentication information with respect to the first data, in a first memory of a data storage device, the first memory having a first storing area and a second storing area;
storing third data, which includes fourth data, the fourth data being associated with the second data, and second authentication information with respect to the third data, in the second storing area of the first memory;
controlling (i) data communication between the data storage device and an information-processing apparatus, and (ii) manipulation of at least one of the first data and the thiro data by the information-processing apparatus, based on authentication information from the information-processing apparatus, and at least one of the first and second authentication information; and
processing the fourth data based on the associated second data when the information-processing apparatus has manipulated the second data.

10. The method according to claim 9, wherein:
each of the first and second authentication information includes information indicating whether read-out, write-in, addition, or subtraction processing with respect to the first data and the third data can be executed; and
the method further includes executing one or more of the read-out, write-in, addition, or subtraction processes based on the authentication information input from the information-processing apparatus and at least one of the first and second authentication information.

11. The method according to claim 9, wherein:
each of the first data and the second data includes an application for providing a predetermined service, the application being defined by a corresponding different code; and
the method further includes determining which of the applications should be executed based on the code contained in the authentication information input from the information-processing apparatus, and executing that application.

12. The method according to claim 9, further comprising storing information indicative of the data communication between the data storage device and the information-processing apparatus in a second memory of the data storage device, the information being based on which of the first and second authentication information is used by the data input/output control to control the data communication.

13. A storage medium including a software program stored thereon that is capable of controlling a processor of a data storage device to perform steps, comprising:
storing first data, which includes second data, and first authentication information with respect to the first data, in a first memory of the data storage device, the first memory having a first storing area and a second storing area;
storing third data, which includes fourth data, the fourth data being associated with the second data, and second authentication information with respect to the third data, in the second storing area of the first memory;
controlling (i) data communication between the data storage device and an information-processing apparatus, and (ii) manipulation of at least one of the first data and the third data by the information-processing apparatus, based on authentication information from the information-processing apparatus, and at least one of the first and second authentication information; and
processing the fourth data based on the associated second data when the information-processing apparatus has manipulated the second data.

14. The storage medium according to claim 13, wherein:
each of the first and second authentication information includes information indicating whether read-out, write-in, addition, or subtraction processing with respect to the first data and the third data can be executed; and
the steps further including executing one or more of the read-out, write-in, addition, or subtraction processes based on the authentication information input from the information-processing apparatus and at least one of the first and second authentication information.

15. The storage medium according to claim 13, wherein:
each of the first data and the second data includes an application for providing a predetermined service, the application being defined by a corresponding different code; and
the steps further include determining which of the applications should be executed based on the code contained in the authentication information input from the information-processing apparatus, and executing that application.

16. The storage medium according to claim 13, further comprising storing information indicative of the data communication between the data storage device and the information-processing apparatus in a second memory of the data storage device, the information being based on which of the first and second authentication information is used by the data input/output control to control the data communication.

17. An information-processing apparatus operable to perform data communication with a data storage device, comprising:
a data input/output control operable to control data communication with the data storage device;
a first memory operable to store respective authentication information, which may be used for enabling communication of data corresponding to the respective authentication information from among data stored in the data storage device;

a second memory operable to store information indicative of the data communication-between the information-processing apparatus and the data storage device, the information being organized in association with the respective authentication information;

a selector operable to select certain of the information stored in the second memory based on a particular one of the respective authentication information; and an output control operable to control the output of the selected information to one or more other information-processing apparatus.

18. The information-processing apparatus according to claim 17, further comprising an encoder operable to encode at least some of the authentication information used in connection with the data communication between the information-processing apparatus and the data storage device, wherein the output control is further operable to control the output of the encoded authentication information to the one or more other information-processing apparatus.

19. The information-processing apparatus according to claim 18, wherein:

the second memory is further operable to store code information indicative of the data stored in the data storage device; and the output control is further operable to control the output of the code information to the one or more other information-processing apparatus.

20. The information-processing apparatus according to claim 19, wherein:

the data storage device includes: a memory having a specific storage area and a common storage area, data in che specific storage area being accessible by way of first authentication information associated therewith, and data in the common storage area being accessible by way of second authentication information associated therewith;

the encoder is operable to encode the first authentication information used in connection with the data communication between the information-processing apparatus and the data storage device; and the output control is operable to control the output of the code information concerning the data stored in the specific storage area of the data storage device to the one or more other information-processing apparatus.

21. A method, comprising:

controlling data communication between an information-processing apparatus and a data storage device;

using respective-authentication information stored in a first memory of the information-processing apparatus to enable communication of data corresponding to the respective authentication information from among data stored in the data storage device;

storing information indicative of the data communication between the information-processing apparatus and the data storage device in a second memory of the information-processing apparatus, the information being organized in association with the respective authentication information;

selecting certain of the information stored in the second memory based on a particular one of the respective authentication information; and outputting the selected information to one or more other information-processing apparatus.

22. The method according to claim 21, further comprising:

encoding at least some of the authentication information used in connection with the data communication between the information-processing apparatus and the data storage device; and controlling the output of the encoded authentication information to the one or more other information-processing apparatus.

23. The method according to claim 22, further comprising:

storing code information in the second memory, the code information indicative of the data stored in the data storage device; and controlling the output of the code information to the one or more other information-processing apparatus.

24. The method according to claim 23, wherein:

the data storage device includes: a memory having a specific storage area and a common storage area, data in the specific storage area being accessible by way of first authentication information associated therewith, and data in the common storage area being accessible by way of second authentication information associated therewith; and the method further includes encoding the first authentication information used in connection with the data communication between the information-processing apparatus and the data storage device, and controlling the output of the code information concerning the data stored in the specific storage area of the data storage device to the one or more other information-processing apparatus.

25. A storage medium including a software program stored thereon that is capable of controlling a processor of an information-processing apparatus to perform steps, comprising:

controlling data communication between the information-processing apparatus and a data storage device;

using respective authentication information stored in a first memory of the information-processing apparatus to enable communication of data corresponding to the respective authentication information from among data stored in the data storage device;

storing information indicative of the data communication between the information-processing apparatus and the data storage device in a second memory of the information-processing apparatus, the information being organized in association with the respective authentication information;

selecting certain of the information stored in the second memory based on a particular one of the respective authentication information; and outputting the selected information to another information-processing apparatus.

26. The storage medium according to claim 25, further comprising:

encoding at least some of the authentication information used in connection with the data communication between the information-processing apparatus and the data storage device; and controlling the output of the encoded authentication information to the one or more other information-processing apparatus.

27. The storage medium according to claim 26, further comprising:

storing code information in the second memory, the code information indicative of the data stored in the data storage device; and controlling the output of the code information to the one or more other information-processing apparatus.

28. The storage medium according to claim 27, wherein:

the data storage device includes: a memory having a specific storage area and a common storage area, data in the specific storage area being accessible by way of first authentication information associated therewith, and data in the common storage area being accessible by way of second authentication information associated therewith; and the steps further include encoding the first authentication information used in connection with the data communication between the information-processing apparatus and the data storage device, and controlling the output of the code information concerning the data stored in the specific storage area of the data storage device to the one or more other information-processing apparatus.

29. A data communication system, comprising:

a data storage device including a memory having a specific storage area and a common storage area, data in the specific storage area being accessible by way of first authentication information associated therewith, and data in the common storage area being accessible by way of second authentication information associated therewith, and the specific storage area having link data associated with certain of the data stored in the common area such that use of the first authentication information also enables access to the certain data in the common storage area; and an information-processing apparatus operable to (i) communicate with the data storage device by way of presenting authentication information thereto, and (ii) access the certain data stored in the common storage area through the link data of the specific storage area by presenting the first authentication information to the data storage device.

30. A data communication system according to claim 29, wherein the data in the common storage area includes an electronic money application that may be used to purchase goods and services from participating entities.

31. A data communication system according to claim 30, wherein an issuing entity may gain access to the specific storage area by way of the first authentication information, but neither the participating entities nor a user of the data storage device may gain access to the specific storage area.

32. A data communication system according to claim 31, wherein the electronic money application in the common storage area is linked to certain of the data in the specific storage area such that the issuing entity may affect the electronic money application by way of the first authentication information without requiring use of the second authentication information.

* * * * *

UNITED STATES PATENT AND TRADEMARK OFFICE
CERTIFICATE OF CORRECTION

PATENT NO. : 6,789,166 B2
DATED : September 7, 2004
INVENTOR(S) : Yojiro Kamise et al.

It is certified that error appears in the above-identified patent and that said Letters Patent is hereby corrected as shown below:

Column 2,
Line 11, after "more" delete "a".
Line 20, after "is" delete "made".

Column 11,
Line 36, after "When" delete "in".

Column 14,
Line 40, delete "[X".

Column 18,
Line 31, "another" should read -- and other --.

Column 21,
Line 12, "$K_{\#0008}{}^{h}$" should read -- $K_{\#0008h}$ --.

Column 41,
Line 63, delete "]"

Column 50,
Line 39, "manipulated" should read -- manipulate --.

Column 53,
Line 5, "communication-between" should read -- communication between --.
Line 35, "che" should read -- the --.
Line 52, "respective-authentication" should read -- respective authentication --.

Signed and Sealed this

First Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,789,166 B2
DATED : September 7, 2004
INVENTOR(S) : Yojiro Kamise et al.

It is certified that error appears in the above-identified patent and that said Letters Patent is hereby corrected as shown below:

<u>Title page,</u>
Item [73], Assignee, "Sony Corporation (JP)" should read
-- Sony Corporation (JP)
 Glory Kogyo Kabushiki Kaisha (JP) --.
Item [57], ABSTRACT,
Line 5, before "corresponding" delete "(".

Signed and Sealed this

Sixth Day of September, 2005

JON W. DUDAS
*Director of the United States Patent and Trademark Office*